(12) United States Patent
Babaei et al.

(10) Patent No.: US 11,291,048 B2
(45) Date of Patent: Mar. 29, 2022

(54) LISTEN BEFORE TALK

(71) Applicant: Ofinno, LLC, Reston, VA (US)

(72) Inventors: Alireza Babaei, Fairfax, VA (US); Esmael Dinan, McLean, VA (US); Hua Zhou, Herndon, VA (US); Hyoungsuk Jeon, Centreville, VA (US); Ali Cagatay Cirik, Herndon, VA (US); Kyungmin Park, Vienna, VA (US); Kai Xu, Herndon, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 74 days.

(21) Appl. No.: 16/783,670

(22) Filed: Feb. 6, 2020

(65) Prior Publication Data

US 2020/0260486 A1 Aug. 13, 2020

Related U.S. Application Data

(60) Provisional application No. 62/805,569, filed on Feb. 14, 2019, provisional application No. 62/802,291, filed on Feb. 7, 2019.

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1819* (2013.01); *H04L 1/1835* (2013.01);
(Continued)

(58) Field of Classification Search
CPC ............. H04W 74/0808; H04W 72/14; H04W 72/042; H04W 52/365; H04W 16/14;
(Continued)

(56) References Cited

U.S. PATENT DOCUMENTS

| | | | |
|---|---|---|---|
| 2016/0278049 A1* | 9/2016 | Nory | H04L 1/1812 |
| 2019/0306842 A1* | 10/2019 | Cirik | H04B 7/0617 |
| 2021/0194642 A1* | 6/2021 | Belleschi | H04W 52/365 |

OTHER PUBLICATIONS

3GPP TS 38.211 V15.4.0 (Dec. 2018); Technical Specification; 3rd Generation Partnership Project; Technical Specification Group Radio Access Network; NR; Physical channels and modulation (Release 15).

(Continued)

*Primary Examiner* — Shailendra Kumar
(74) *Attorney, Agent, or Firm* — Kavon Nasabzadeh; Philip Smith; Jacob Manaban

(57) ABSTRACT

A wireless device receives configuration parameters of one or more configured grants of an unlicensed cell. The wireless device receives a downlink control information indicating an uplink grant for a first TB corresponding to a first HARQ process. The wireless device stores, based on a first LBT procedure indicating a busy channel, the first TB in a first HARQ buffer associated with the first HARQ process. The first LBT is for a scheduled transmission of the first TB. The wireless device flushes, based on a second LBT procedure indicating a busy channel, a second HARQ buffer associated with a second HARQ process. The second LBT procedure is for a scheduled transmission of a second TB via a first configured grant of the one or more configured grants.

20 Claims, 45 Drawing Sheets

(51) Int. Cl.
*H04W 16/14* (2009.01)
*H04W 28/02* (2009.01)
*H04W 52/36* (2009.01)
*H04W 72/04* (2009.01)
*H04W 72/14* (2009.01)
*H04W 80/02* (2009.01)

(52) U.S. Cl.
CPC ....... *H04W 16/14* (2013.01); *H04W 28/0278* (2013.01); *H04W 52/365* (2013.01); *H04W 72/042* (2013.01); *H04W 72/14* (2013.01); *H04W 80/02* (2013.01)

(58) Field of Classification Search
CPC .............. H04W 80/02; H04W 28/0278; H04L 1/1819; H04L 1/1835; H04L 1/1893; H04L 1/1877; H04L 1/1887; H04L 1/1864; H04L 1/1822
See application file for complete search history.

(56) References Cited

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding (Release 15).
3GPP TS 38.213 V15.4.0 (Dec. 2018); Technical Specification; 3rd Generation Partnership Project; Technical Specification Group Radio Access Network; NR; Physical layer procedures for control (Release 15).
3GPP TS 38.214 V15.4.0 (Dec. 2018); Technical Specification; 3rd Generation Partnership Project; Technical Specification Group Radio Access Network; NR; Physical layer procedures for data (Release 15).
3GPP TS 38.300 V15.4.0 (Dec. 2018); Technical Specification; 3rd Generation Partnership Project; Technical Specification Group Radio Access Network; NR; NR and NG-RAN Overall Description; Stage 2 (Release 15).
3GPP TS 38.321 V15.4.0 (Dec. 2018); Technical Specification; 3rd Generation Partnership Project; Technical Specification Group Radio Access Network; NR; Medium Access Control (MAC) protocol specification (Release 15).
3GPP TS 38.331 V15.4.0 (Dec. 2018); Technical Specification; 3rd Generation Partnership Project; Technical Specification Group Radio Access Network; NR; Radio Resource Control (RRC) protocol specification (Release 15).
"R1-1812197; 3GPP TSG RAN WG1 Meeting #95; Spokane, USA, Nov. 12-Nov. 16, 2018; Agenda Item:7.2.2.4.4; Source:Huawei, HiSilicon; Title:Transmission with configured grant in NR unlicensed band."
"R1-1812303; 3GPP TSG RAN WG1 Meeting #95; Spokane, US, Nov. 12-16, 2018; Source:vivo; Title: Discussion on the enhancements to configured grants; Agenda Item:7.2.2.4.4."
"R1-1812359; 3GPP TSG RAN WG1 Meeting #95; Spokane, USA, Nov. 12-16, 2018; Agenda Item:7.2.2.4.4; Source: MediaTek Inc.; Title:Discussion on NR-U configured grant."
"R1-1812438; 3GPP TSG RAN WG1 Meeting #95; Spokane, USA, Nov. 12-16, 2018 ; Title: Discussion on configured grant for NR-U; Source: ZTE; Agenda Item:7.2.2.4.4; Document for: Discussion and Decision".
"R1-1812485 Intel NR-U configured grants; 3GPP TSG RAN WG1 Meeting #95; Spokane, USA, Nov. 12-16, 2018; Agenda Item:7.2. 2.4.4; Source:Intel Corporation; Title: Enhancements to configured grants for NR-unlicensed".
"R1-1812563; 3GPP TSG RAN WG1 Meeting #95; Spokane, US, Nov. 12-16, 2018; Agenda Item:7.2.2.4.4; Source: LG Electronics; Title: Discussion on configured grant for NR unlicensed operation".

"R1-1812653; 3GPP TSG RAN WG1 Meeting #95; Spokane, USA, Nov. 12-16, 2018; Agenda item 7.2.2.3.2; Source: NEC".
"R1-1812691_AUL in NR-U; 3GPP TSG RAN WG1 Meeting #95R1-1812691; Spokane, USA, Nov. 12-16, 2018; Agenda item: 7.2 2.4.4; Source: Nokia, Nokia Shanghai Bell; Title: On support of UL transmission with configured grants in NR-U".
"R1-1812717; 3GPP TSG RAN WG1 Meeting #95; Spokane, USA, Nov. 12-16, 2018; ; Agenda item:7.2.2.4.4 (Potential enhancements for configured grants); Title: Discussion on multiplexing configured grants in NR-U; Source: TCL Communications".
"R1-1812741; 3GPP TSG RAN WG1 Meeting #95; Spokane, US, Nov. 12-16, 2018; Agenda Item:7.2.2.4.4; Source:Sony; Title: Considerations on Enhancements to Configured Grants for NR Unlicensed operation."
"R1-1812804; 3GPP TSG RAN WG1 Meeting #95; Spokane, USA, Nov. 12-16, 2018; Source:OPPO; Title: Considerations on configured grant for NR-U; Agenda Item:7.2.2.4.4".
"R1-1812980 ; 3GPP TSG RAN WG1 Meeting #95; Spokane, USA, Nov. 12-16, 2018; Agenda Item:7.2.2.4.4; Source: Samsung; Title:Enhancements on configured grant for NR-U".
"R1-1813080 ; 3GPP TSG RAN WG1 Meeting #95; Spokane, USA, Nov. 12-16, 2018; Agenda Item:7.2.2.4.4; Source: Spreadtrum Communications; Title:Consideration on configured grant transmission in NR-U operation".
"R1-1813208; 3GPP TSG RAN WG1 Meeting #95; Spokane, USA, Nov. 12-16, 2018; ; Source:Sharp; Title:Potential enhancements to configured scheduling tor NR unlicensed operation; Agenda Item:7 2.2 4.4."
"R1-1813223 ; 3GPP TSG RAN WG1 Meeting #95; Spokane, USA, Nov. 12-16, 2018; ; Agenda Item:7.2.2.4.4; Source:InterDigital Inc.; Title:Configured Grant Enhancements in NR-U."
"R1-1813378 UL BWP Management in NR-U; 3GPP TSG RAN WG1 Meeting #95 ; Spokane, Washington, Nov. 12-16, 2018; ; Agenda Item:7.2.2.4.4; Source:Charter Communications; Title UL BWP Management in NR-U."
"R1-1813416 ; 3GPP TSG RAN WG1 Meeting #95; Spokane, USA; Nov. 12-Nov. 16, 2018 ; ; Agenda item:7.2.2.4.4; Source:Qualcomm Incorporated."
"R1-1813461 Configured UL grant for NR-U; 3GPP TSG-RAN WG1 Meeting #95 ; Spokane, USA, Nov. 12-16, 2018; ; Agenda Item:7.2.2.4.4; Source:Ericsson; Title:Configured UL grant for NR-U."
"R1-1813597; 3GPP TSG-RAN WG1 Meeting #95; Spokane, USA, Nov. 12-16, 2018 ; ; Agenda item:7.2.2.4.4; Title:Potential Enhancements to Configured Grants; Source:Convida Wireless."
"R1-1813886 AI7.2.2.4.4 summary_v2; 3GPP TSG RAN WG1 Meeting #95R1-183886 Spokane, USA, Nov. 12-16, 2018; ; Source: Intel Corporation ; Title:Summary of Potential Enhancement to Configured Grants; Agenda item:7.2.2.4 4."
"R1-1814121 nr-u configured grant summary; 3GPP TSG RAN WG1 Meeting #95R1-1814121 Spokane, USA, Nov. 12-16, 2018; ; Source: Intel Corporation ; Title:Summary of offline discussions configured grants for NR-U; Agenda item:7.2.2.4.4."
"R1-1900015 final; 3GPP TSG RAN WG1 AH ; Taipei, Taiwan, Jan. 21-25, 2019; ; Agenda item:7.2.6.1.4 ; Source: Idaho National Laboratory; Title: Underlay Scheduling Request for NR Rel. 16 and Latest Results."
"R1-1900047; 3GPP TSG RAN WG1 Ad-Hoc Meeting 1901; Taipei, Jan. 21-25, 2019; ; Agenda Item:7.2.6.1.4; Source:Huawei, HiSilicon; Title:Enhancements to scheduling/HARQ/CSI processing timeline for URLLC."
"R1-1900072 On scheduling&HARQ processing timeline; 3GPP TSG RAN WG1 Ad-Hoc Meeting 1901; Taipei, Jan. 21-25, 2019; Source:ZTE; Title: On scheduling/HARQ processing timeline for URLLC; Agenda Item:7.2.6.1.4; Document for: Discussion and Decision."
"R1-1900129 Enhancement for SchedulingHARQCSI Processing timeline; 3GPP TSG RAN WG1 Ad-Hoc Meeting 1901; Taipei, Jan. 21-25, 2019; Source:vivo; Title:Enhancement for Scheduling/HARQ/ CSI processing timeline; Agenda Item:7.2.6.1.4."
"R1-1900161 SchedulingHARQCSI Processing Timeline Enhancements for NR URLLC; 3GPP TSG-RAN WG1 Meeting #95 AH; Taipei, Taiwan, Jan. 21-25, 2019; Agenda Item:7.2.6.1.4; Source:Erics-

(56) References Cited

OTHER PUBLICATIONS son; Title:Scheduling/HARQ/CSI Processing Timeline Enhancements for NR URLLC; Document for:Discussion, Decision."
"R1-1900211 Study and evaluation of scheduling, HARQ and CSI processing timeline; 3GPP TSG RAN WG1 Meeting AH-1901 ; Taipei, Taiwan, Jan. 21-25, 2019; ; Agenda Item: 7.2.6.1.4; Source: MediaTek Inc.; Title: Study and evaluation of scheduling, HARQ and CSI processing timeline."
"R1-1900284; 3GPP TSG RAN WG1 Ad-Hoc Meeting 1901; Taipei, Jan. 21-25, 2019; ; Source:OPPO; Title: Enhancements on scheduling and HARQ processing timeline; Agenda Item:7.2.6.1.4."
"R1-1900334; 3GPP TSG RAN WG1 Ad-Hoc Meeting 1901; Taipei, Jan. 21-25, 2019; ; Source:CATT; Title: Scheduling enhancements for URLLC; Agenda Item:7.2.6.1.4."
"R1-1900373—Rel-16 URLLC—Timeline v02; 3GPP TSG RAN WG1 Ad-Hoc Meeting 1901; Taipei, Taiwan, Jan. 21-25, 2019 ; ; Agenda Item:7.2.6.1.4; Source: Sony ; Title:Considerations on UE Processing Timeline."
"R1-1900440 HARQ Enhancements to URLLC; 3GPP TSG RAN WG1 Ad-Hoc Meeting 1901 ; Taipei, Taiwan, Jan. 21-25, 2019 ; Agenda item:7.2.6.1.4; Source: AT&T ; Title: HARQ Enhancements to URLLC."
"R1-1900496 Intel—eURLLC Proc times; 3GPP TSG RAN WG1 Ad-Hoc Meeting 1901 ; Taipei, Taiwan, Jan. 21-25, 2019; Source:Intel Corporation; Title:On enhancements to Scheduling/HARQ/CSI processing; Agenda item:7.2.6.1.4."
"R1-1900594 URLLC processing timeline; 3GPP TSG RAN WG1 Ad-Hoc Meeting 1901 ; Taipei, Taiwan, Jan. 21-25, 2019; Agenda Item:7.2.6.1.4; Source: LG Electronics; Title: Scheduling/HARQ processing timeline enhancements for NR URLLC; Document for:Discussion and decision."
"R1-1900675_Panasonic_NR_URLLC_scheduling_processing_timeline; 3GPP TSG RAN WG1 Ad-Hoc Meeting 1901; Taipei, Taiwan, Jan. 21-25, 2019;; Source:Panasonic; Title: On NR URLLC scheduling and UL cancellation processing timeline; Agenda Item: 7 2.6 1.4."
"R1-1900899 Processing Timeline Enhancements for eURLLC; 3GPP TSG-RAN WG1 AH-1901; Jan. 21-25, 2019; Taipei, Taiwan; ; Agenda item:7.2.6.1.4; Source: Qualcomm Incorporated."
"R1-1900930_URLLC scheduling HARQ enh; 3GPP TSG RAN WG1 Ad Hoc Meeting 1901; Taipei, Taiwan, Jan. 21-25, 2019; ; Agenda item:7.2.6.1.4; Source:Nokia, Nokia Shanghai Bell; Title: Enhancements to scheduling/HARQ/CSI processing timeline for NR URLLC."
"R1-1900940 HARQ enhancement for URLLC; 3GPP TSG RAN WG1 Meeting #AH1901; Taipei, Jan. 21-25, 2019; Agenda item:7.2.6.1.4."
"R1-1900972 Scheduling_HARQ_CSI_processing timeline; 3GPP TSG RAN WG1 Ad-Hoc Meeting 1901 ; Taipei, Jan. 21-25, 2019; ; Source:NTT DOCOMO, Inc.; Title:Enhancements to Scheduling/HARQ/CSI Processing timeline for URLLC; Agenda Item:7.2 6.1 4."
"R1-1900989; 3GPP TSG RAN WG1 Ad-Hoc Meeting 1901; Taipei, Taiwan, Jan. 21-25, 2019; Agenda Item:7.2.6.1.4; Source:ITRI; Title:Enhancement of processing timeline for intra-UE prioritization and multiplexing; Document for:Discussion and Decision."
"R1-1901015 On HARQ scheduling enhancement for URLLC; 3GPP TSG RAN WG1 Ad-Hoc Meeting 1901; Taipei, Taiwan, Jan. 21-25, 2019; ; Agenda item:7.2.6.1.4; Source:Institute for Information Industry (III); Title: On HARQ scheduling enhancement for URLLC."
"R1-1901069 eURLLC processing time; 3GPP TSG RAN WG1 Ad-Hoc Meeting 1901; Taipei, Taiwan, Jan. 21-25, 2019; Agenda Item:7.2.6.1.4; Source:Samsung; Title:Potential enhancements for scheduling&HARQ&CSI processing timeline; Document for:Discussion and decision."
"R1-1901152; 3GPP TSG RAN WG1 Meeting AH-1901; Taipei, Taiwan, Jan. 21-25, 2018 ; ; Agenda item:7.2.6.1.4; Source:Fraunhofer HHI, Fraunhofer IIS ; Title: Scheduling/HARQ Processing Timeline Enhancements for NR URLLC."

"R1-1901288 URLLC processing timeline rev; 3GPP TSG RAN WG1 Ad-Hoc Meeting 1901 ; Taipei, Taiwan, Jan. 21-25, 2019; Agenda Item:7.2.6.1.4; Source: LG Electronics; Title: Scheduling/HARQ processing timeline enhancements for NR URLLC; Document for:Discussion and decision."
"R1-1901313 Summary_7.2.6.1.4_Enhancements_Scheduling_HARQ_CSI_ProcessingTimeline v2; 3GPP TSG-RAN WG1 Meeting AH-1901 R1-19XXXXX Jan. 21-25, 2019; Taipei, Taiwan; ; Agenda item:7.2.6.1.4; Source: Qualcomm Incorporated."
"R1-1901314 Processing Timeline Enhancements for eURLLC; 3GPP TSG-RAN WG1 AH-1901; Jan. 21-25, 2019; Taipei, Taiwan; Agenda item:7.2.6.1.4; Source: Qualcomm Incorporated."
"R1-1901318 HARQ enhancement for URLLC; 3GPP TSG RAN WG1 Meeting #AH1901; Taipei, Jan. 21-25, 2019; Agenda item:7.2.6.1.2."
"R1-1901331; 3GPP TSG RAN WG1 Ad-Hoc Meeting 1901; Taipei, Jan. 21-25, 2019; ; Source:CATT; Title:Scheduling enhancements for URLLC; Agenda Item:7.2.6.1.4."
"R1-1901345; 3GPP TSG RAN WG1 Ad-Hoc Meeting 1901; Taipei, Jan. 21-25, 2019; ; Agenda Item:7.2.6.1.4; Source:Huawei, HiSilicon; Title:Enhancements to scheduling/HARQ/CSI processing timeline for URLLC."
"R1-1901349 SchedulingHARQCSI Processing Timeline Enhancements for NR URLLC; 3GPP TSG-RAN WG1 Meeting #95 AH; Taipei, Taiwan, Jan. 21-25, 2019; Agenda Item:7.2.6.1.4; Source:Ericsson; Title:Scheduling/HARQ/CSI Processing Timeline Enhancements for NR URLLC; Document for:Discussion, Decision."
"R1-1901355; 3GPP TSG RAN WG1 Ad-Hoc Meeting 1901 ; Taipei, Jan. 21-25, 2019; ; Source:NTT DOCOMO, Inc.; Title:Enhancements to Scheduling/HARQ/CSI Processing timeline for URLLC; Agenda Item:7.2 6.1 4."
"R1-1901382 Summary_7 2 6 1 4_Enhancements_Scheduling_HARQ_CSI_ProcessingTimeline; 3GPP TSG-RAN WG1 Meeting AH-1901 ; Jan. 21-25, 2019; Taipei, Taiwan; ; Agenda item:7.2.6.1.4; Source: Qualcomm Incorporated."
"R1-1901451; 3GPP TSG-RAN WG1 Meeting AH-1901 ; Jan. 21-25, 2019; Taipei, Taiwan; ; Agenda item:7.2.6.1.4; Source: Qualcomm Incorporated."
"R2-1816264—Configured uplink transmission for NR-U; 3GPP TSG-RAN WG2 Meeting #104 Spokane, USA, Nov. 12-16, 2018; Agenda Item:11.2.1.2; Source:OPPO; Title:Enhancements of configured grant in NR-U; Document for:Discussion, Decision."
"R2-1816600 consideration on channel access priority class; 3GPP TSG-RAN WG2 Meeting #104R2-1816600 Spokane, US, Nov. 12-16, 2018; ; Agenda Item:11.2.1.2; Souce:Huawei, Hisicion; Title:Consideration on Channel Access Priority Class."
"R2-1816601 Transmission with configured grant for NR-U; 3GPP TSG-RAN WG2 Meeting #104 Spokane, US, Nov. 12-16, 2018; ; Agenda Item:11.2.1.2; Source: Huawei, HiSilicon; Title: Transmission with configured grant for NR-U."
"R2-1816683 Multiple configured grants for NR-U; 3GPP TSG-RAN WG2 Meeting #104; Spokane, US, Nov. 12-16, 2018Revision of R2-1813966; ; Agenda Item:11.2.1.2; Souce:MediaTek Inc.; Title:Multiple configured grants for NR-U."
"R2-1816707 CG enhancement for NR-U; 3GPP TSG-RAN WG2 104; Spokane, USA, Nov. 12-16, 2018; ; Agenda Item:11.2.1.2; Source: Intel Corporation; Title: Configured UL grant enhancement for NR Unlicense."
"R2-1816708 SR enhancement for NR-U; 3GPP TSG-RAN WG2 104; Spokane, USA, Nov. 12-16, 2018; ; Agenda Item:11.2.1.2; Source: Intel Corporation; Title: Scheduling Request enhancement for NR Unlicensed."
"R2-1816828 considerations on BWP for NR-U; 3GPP TSG RAN WG2 NR #104 Meeting; Spokane, US, Nov. 12-16, 2018; Agenda Item:11.2.1.2; Source: ZTE; Title: Considerations on BWP for NR-U; Document for: Discussion and Decision."
"R2-1816830 considerations on configured grant; 3GPP TSG RAN WG2 NR #104 Meeting ; Spokane, US, Nov. 12-16, 2018; Agenda Item:11.2.1.2; Source: ZTE; Title: Considerations on configured grant for NR-U; Document for: Discussion and Decision."
"R2-1817320 Autonomous Uplink Transmission in NR-U; 3GPP TSG-RAN WG2 Meeting #104 ; Spokane, USA, Nov. 12-16,

(56) References Cited

OTHER PUBLICATIONS

2018reversion of R2-1813875; ; ; Agenda item:11.2.1.2; Source:Spreadtrum Communications."

"R2-1817964—Coexistence Between Configured grant and Dynamically Scheduled UL Grants; 3GPP TSG-RAN WG2 #104 TDoc ; Spokane, USA, Nov. 12-16, 2018; ; Agenda Item:11.2.1.2; Source:Ericsson; Title:Coexistence Between Configured and Dynamically Scheduled UL Grants."

"R2-1817965—Discussions on channel access priority in NR-U; 3GPP TSG-RAN WG2 #104 TDoc ; Spokane, WA, USA, Nov. 12-16, 2018Revision of R2-1812373; ; Agenda Item: 11.2.1.3; Source:Ericsson; Title:Discussions on channel access priority in NR-U."

"R2-1817972—On Autonomous UL Transmissions for NR-U; 3GPP TSG-RAN WG2 #104 TDoc ; Spokane, WA, USA, Nov. 12-16, 2018; Agenda Item: 11.2.1.2; Source:Ericsson; Title:On Autonomous UL Transmissions for NR-U; Document for:Discussion, Decision."

"R2-1818106 UL scheduling enhancement in NR-U; 3GPP TSG-RAN WG2 #104 Spokane, USA, Nov. 12-Nov. 16, 2018 (resubmission of R2-1815133); ; ; Agenda item:11.2.1.2 (FS_NR_unlic); Source:LG Electronics Inc."

"R2-1818136; 3GPP TSG-RAN WG2 Meeting #104; Spokane, USA, Nov. 12-16, 2018Revision of R2-1815273; Agenda item: 11.2.1.2; Source:CMCC; Title:UL Scheduling with Multiple TTIs for PUSCH in NR-U; Document for:Discussion."

\* cited by examiner

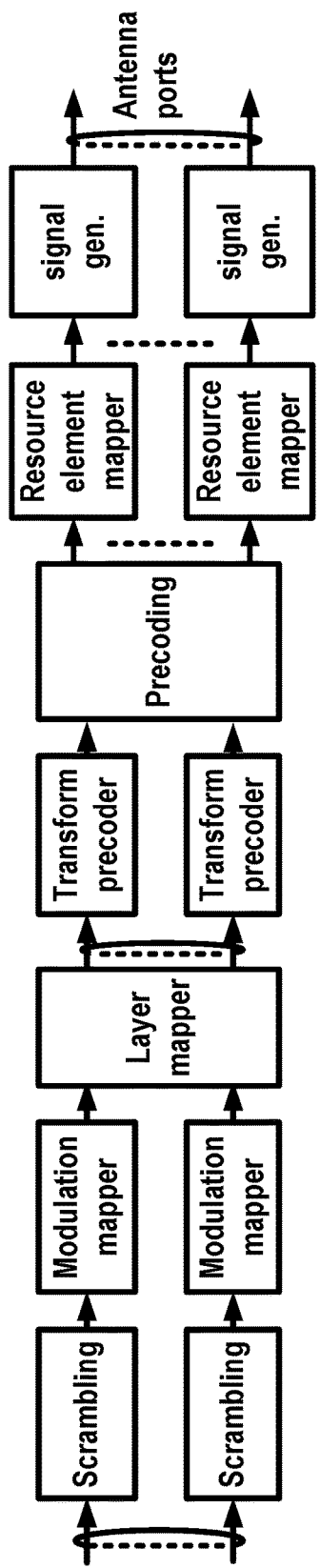
FIG. 4A
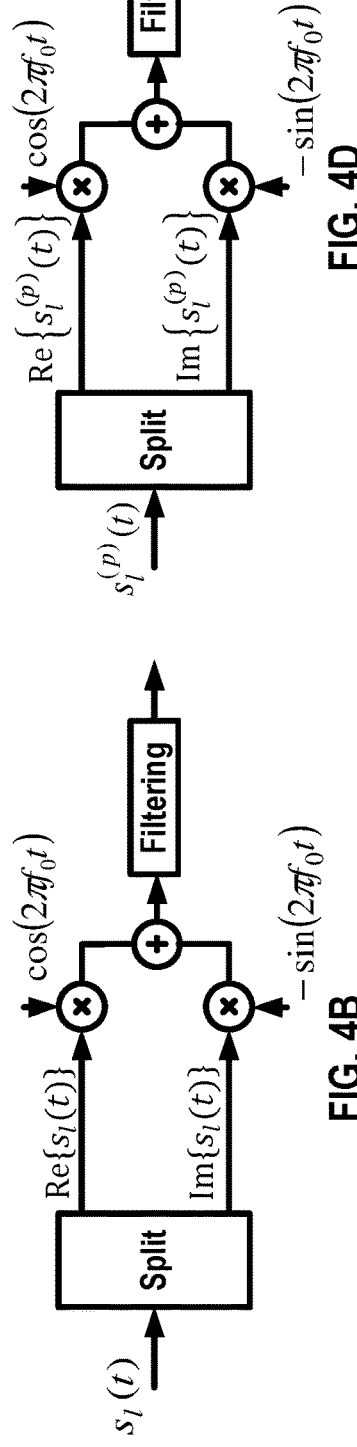
FIG. 4B
FIG. 4D
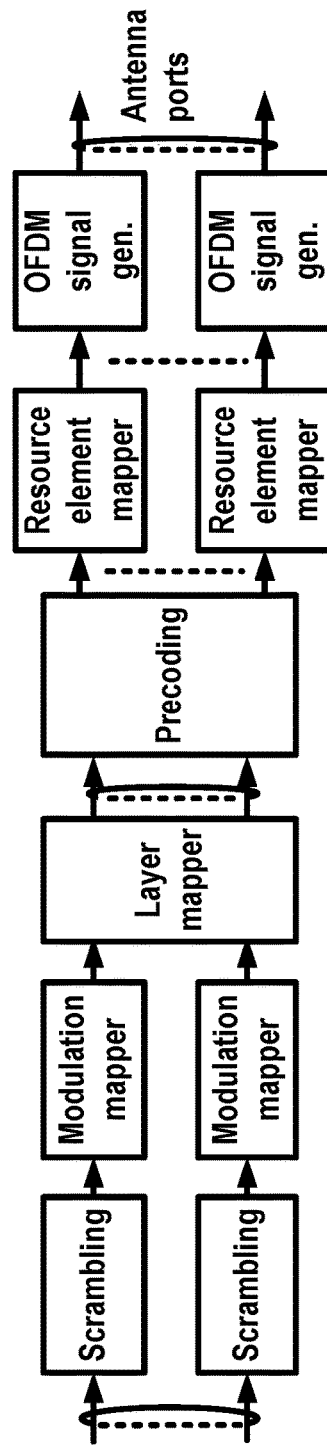
FIG. 4C

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 16

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

FIG. 17

LISTEN BEFORE TALK

CROSS-REFERENCE TO RELATED APPLICATIONS

This application claims the benefit of U.S. Provisional Application No. 62/802,291, filed Feb. 7, 2019, and U.S. Provisional Application No. 62/805,569, filed Feb. 14, 2019, which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 16 is an example mapping of channel access priority class to a QoS parameter.

FIG. 17 is an example of parameters corresponding to different channel access priority classes.

DETAILED DESCRIPTION OF EMBODIMENTS

Figure 1:
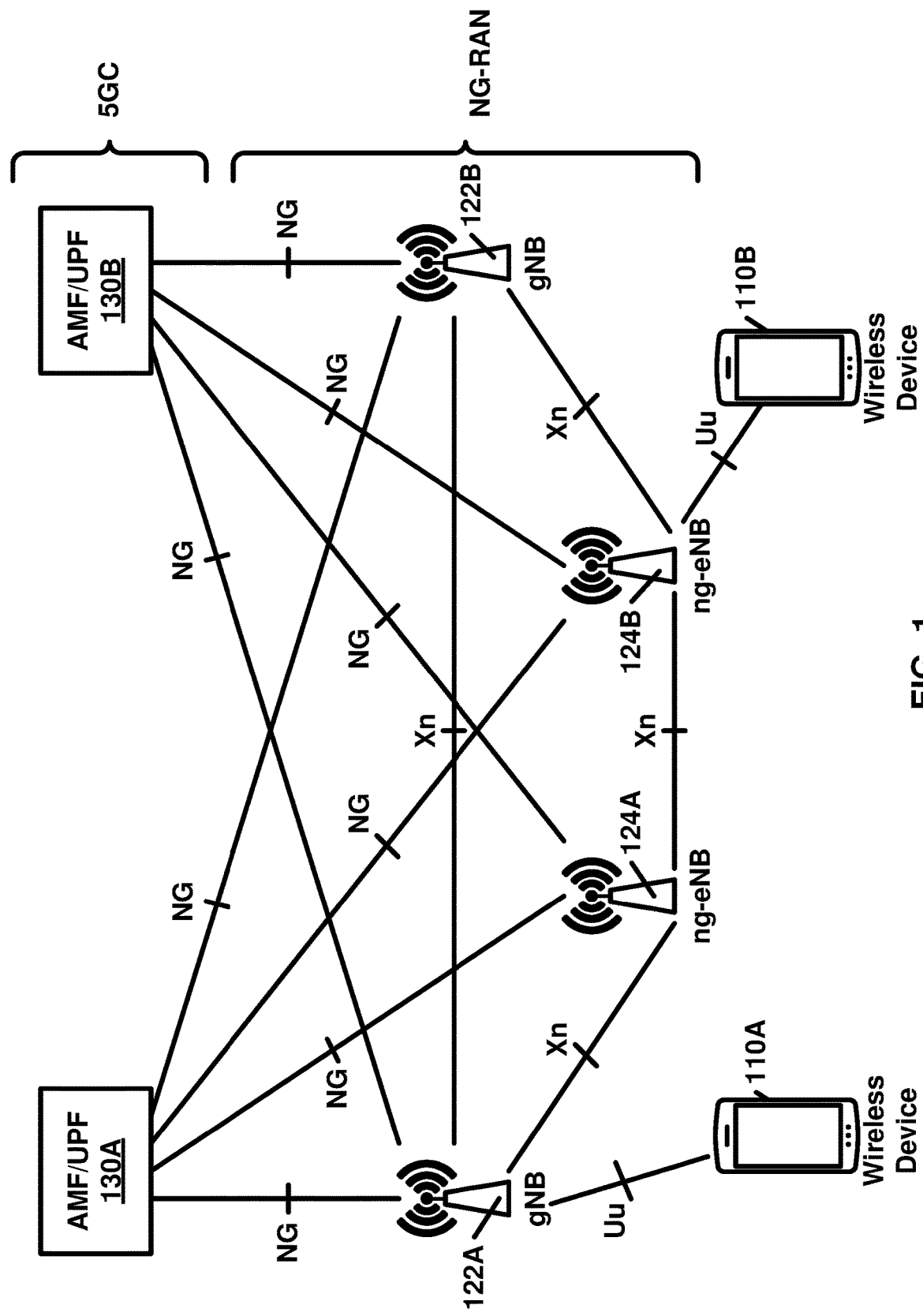
FIG. 1 is a diagram of an example RAN architecture as per an aspect of an embodiment of the present disclosure.

Example embodiments of the present disclosure enable operation of configured grants. Embodiments of the technology disclosed herein may be employed in the technical field of multicarrier communication systems. More particularly, the embodiments of the technology disclosed herein may relate to configured grants for unlicensed cells in multicarrier communication systems.

The following Acronyms are used throughout the present disclosure:
- 3GPP 3rd Generation Partnership Project
- 5GC 5G Core Network
- ACK Acknowledgement
- AMF Access and Mobility Management Function
- ARQ Automatic Repeat Request
- AS Access Stratum
- ASIC Application-Specific Integrated Circuit
- BA Bandwidth Adaptation
- BCCH Broadcast Control Channel
- BCH Broadcast Channel
- BPSK Binary Phase Shift Keying
- BWP Bandwidth Part
- CA Carrier Aggregation
- CC Component Carrier
- CCCH Common Control CHannel
- CDMA Code Division Multiple Access
- CN Core Network
- CP Cyclic Prefix
- CP-OFDM Cyclic Prefix-Orthogonal Frequency Division Multiplex
- C-RNTI Cell-Radio Network Temporary Identifier
- CS Configured Scheduling
- CSI Channel State Information
- CSI-RS Channel State Information-Reference Signal
- CQI Channel Quality Indicator
- CRC Cyclic Redundancy Check
- CSS Common Search Space
- CU Central Unit
- DAI Downlink Assignment Index
- DC Dual Connectivity
- DCCH Dedicated Control Channel
- DCI Downlink Control Information
- DL Downlink
- DL-SCH Downlink Shared CHannel
- DM-RS DeModulation Reference Signal
- DRB Data Radio Bearer
- DRX Discontinuous Reception
- DTCH Dedicated Traffic Channel
- DU Distributed Unit
- EPC Evolved Packet Core
- E-UTRA Evolved UMTS Terrestrial Radio Access
- E-UTRAN Evolved-Universal Terrestrial Radio Access Network
- FDD Frequency Division Duplex
- FPGA Field Programmable Gate Arrays
- F1-C F1-Control plane
- F1-U F1-User plane
- gNB next generation Node B
- HARQ Hybrid Automatic Repeat reQuest
- HDL Hardware Description Languages
- IE Information Element
- IP Internet Protocol
- LCID Logical Channel Identifier
- LTE Long Term Evolution
- MAC Media Access Control
- MCG Master Cell Group
- MCS Modulation and Coding Scheme
- MeNB Master evolved Node B
- MIB Master Information Block
- MME Mobility Management Entity
- MN Master Node
- NACK Negative Acknowledgement
- NAS Non-Access Stratum
- NG CP Next Generation Control Plane
- NGC Next Generation Core
- NG-C NG-Control plane
- ng-eNB next generation evolved Node B
- NG-U NG-User plane
- NR New Radio
- NR MAC New Radio MAC
- NR PDCP New Radio PDCP
- NR PHY New Radio PHYsical
- NR RLC New Radio RLC
- NR RRC New Radio RRC
- NSSAI Network Slice Selection Assistance Information
- O&M Operation and Maintenance
- OFDM orthogonal Frequency Division Multiplexing
- PBCH Physical Broadcast CHannel
- PCC Primary Component Carrier
- PCCH Paging Control CHannel
- PCell Primary Cell
- PCH Paging CHannel
- PDCCH Physical Downlink Control CHannel
- PDCP Packet Data Convergence Protocol
- PDSCH Physical Downlink Shared CHannel
- PDU Protocol Data Unit
- PHICH Physical HARQ Indicator CHannel
- PHY PHYsical
- PLMN Public Land Mobile Network
- PMI Precoding Matrix Indicator
- PRACH Physical Random Access CHannel
- PRB Physical Resource Block
- PSCell Primary Secondary Cell
- PSS Primary Synchronization Signal
- pTAG primary Timing Advance Group
- PT-RS Phase Tracking Reference Signal
- PUCCH Physical Uplink Control CHannel
- PUSCH Physical Uplink Shared CHannel
- QAM Quadrature Amplitude Modulation
- QFI Quality of Service Indicator
- QoS Quality of Service
- QPSK Quadrature Phase Shift Keying
- RA Random Access
- RACH Random Access CHannel
- RAN Radio Access Network
- RAT Radio Access Technology
- RA-RNTI Random Access-Radio Network Temporary Identifier
- RB Resource Blocks
- RBG Resource Block Groups
- RI Rank indicator
- RLC Radio Link Control
- RLM Radio Link Monitoring
- RNTI Radio Network Temporary Identifier
- RRC Radio Resource Control
- RRM Radio Resource Management
- RS Reference Signal
- RSRP Reference Signal Received Power
- SCC Secondary Component Carrier
- SCell Secondary Cell
- SCG Secondary Cell Group
- SC-FDMA Single Carrier-Frequency Division Multiple Access
- SDAP Service Data Adaptation Protocol
- SDU Service Data Unit
- SeNB Secondary evolved Node B
- SFN System Frame Number
- S-GW Serving GateWay
- SI System Information
- SIB System Information Block SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
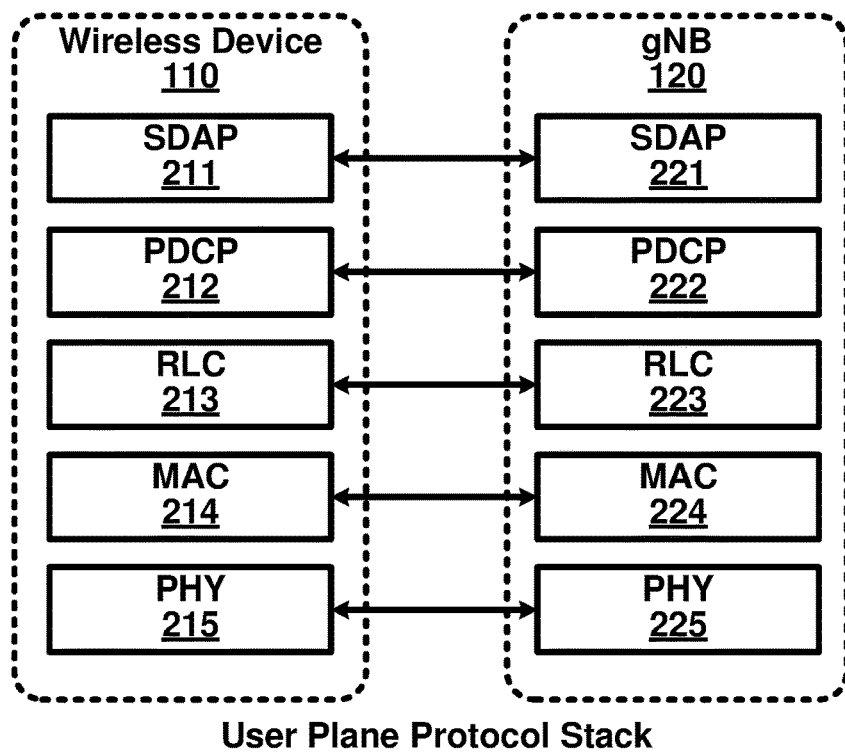
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
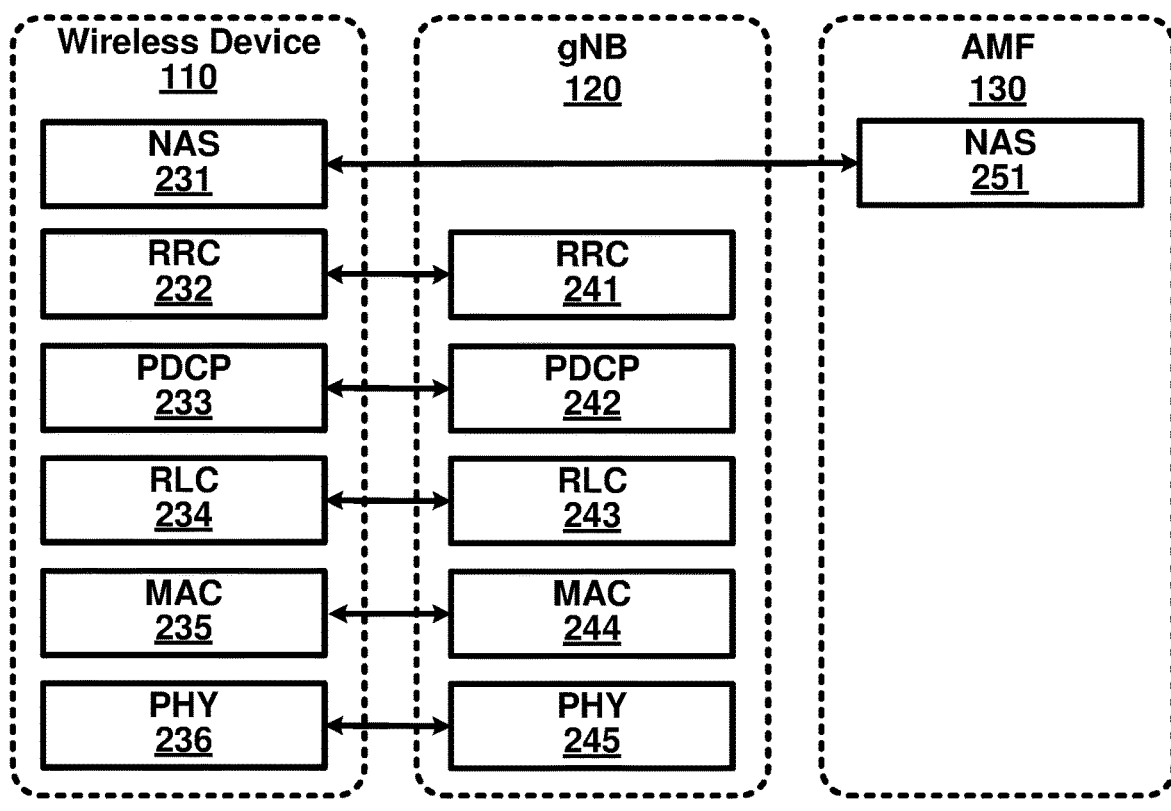
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
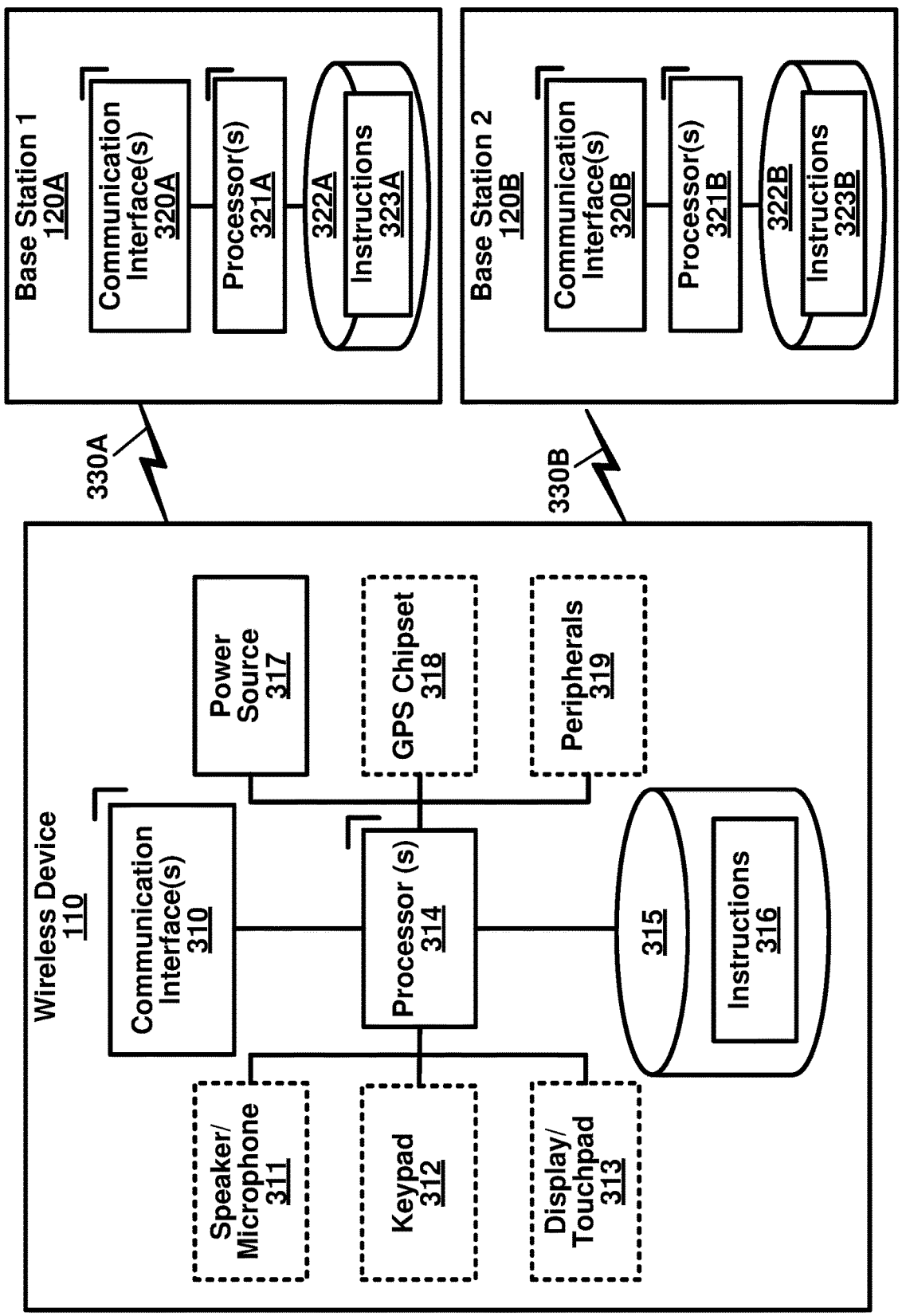
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterinformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure. A wireless device may report its radio access capability information which may be static.

A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated.

In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
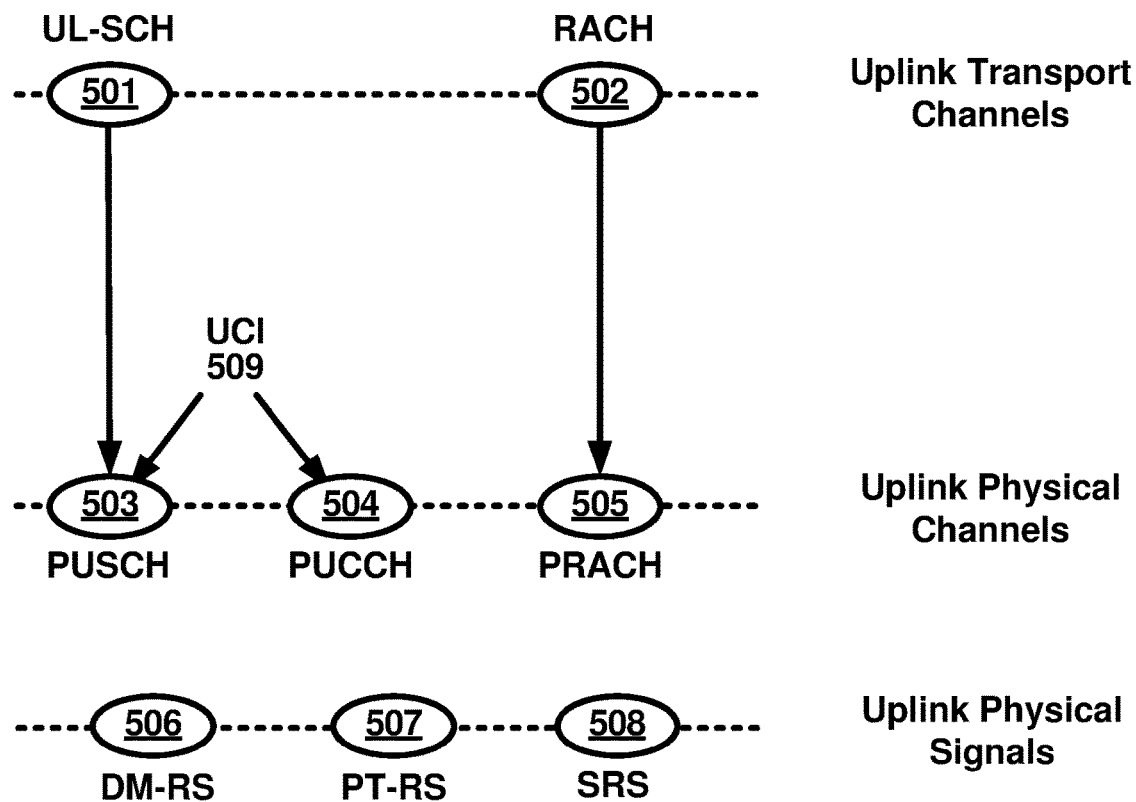
FIG. 5A is a diagram of an example uplink channel mapping and example uplink physical signals as per an aspect of an embodiment of the present disclosure.
Figure 5B:
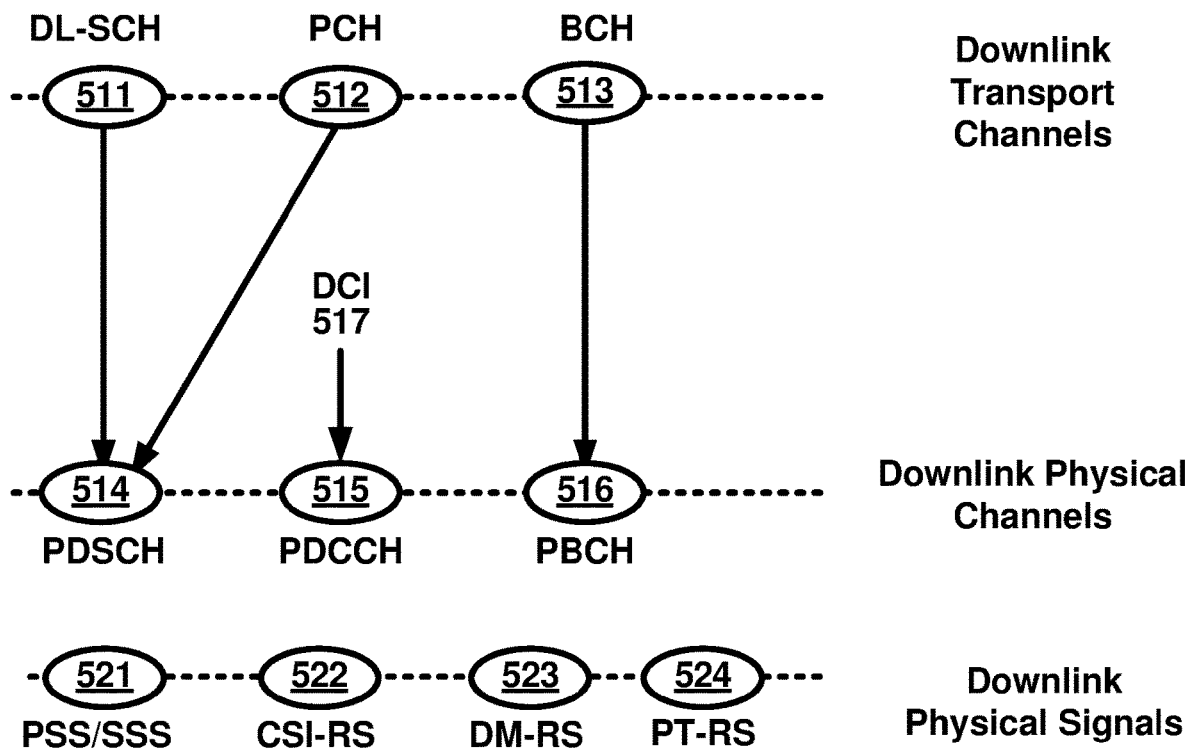
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access Channel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RSstructure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets.

For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
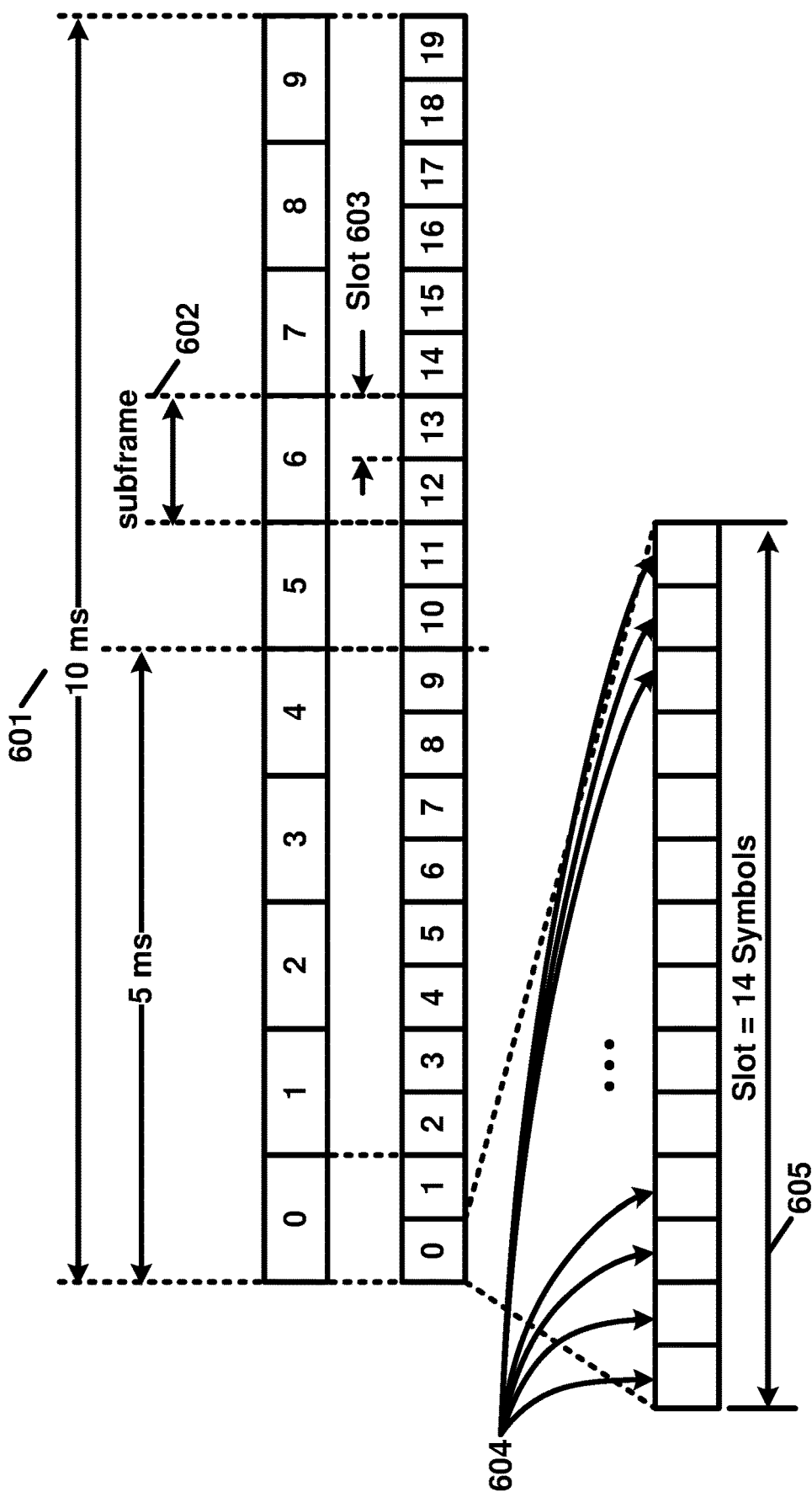
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
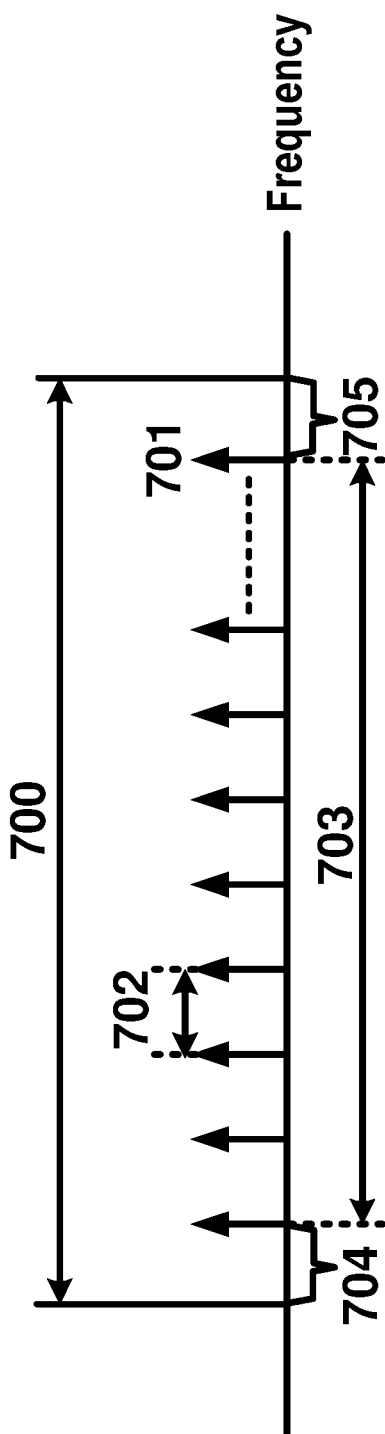
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
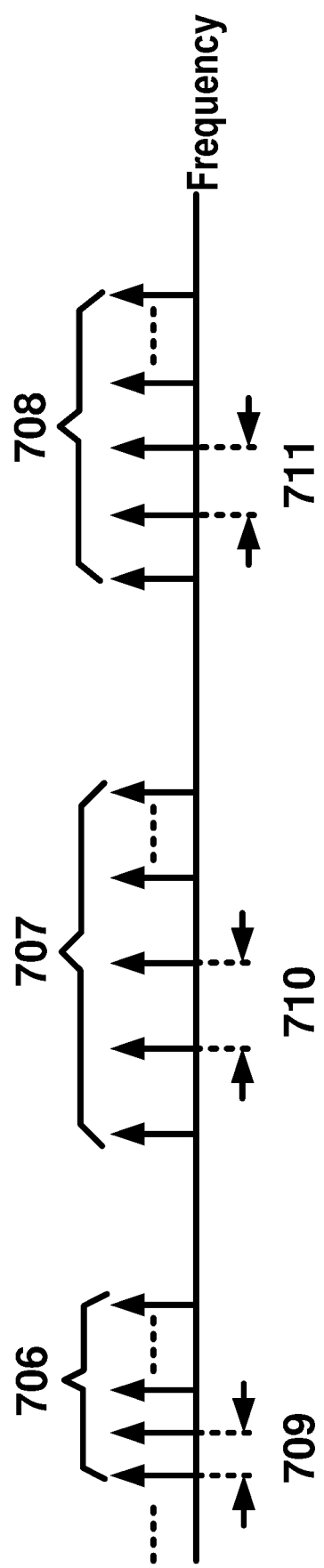

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
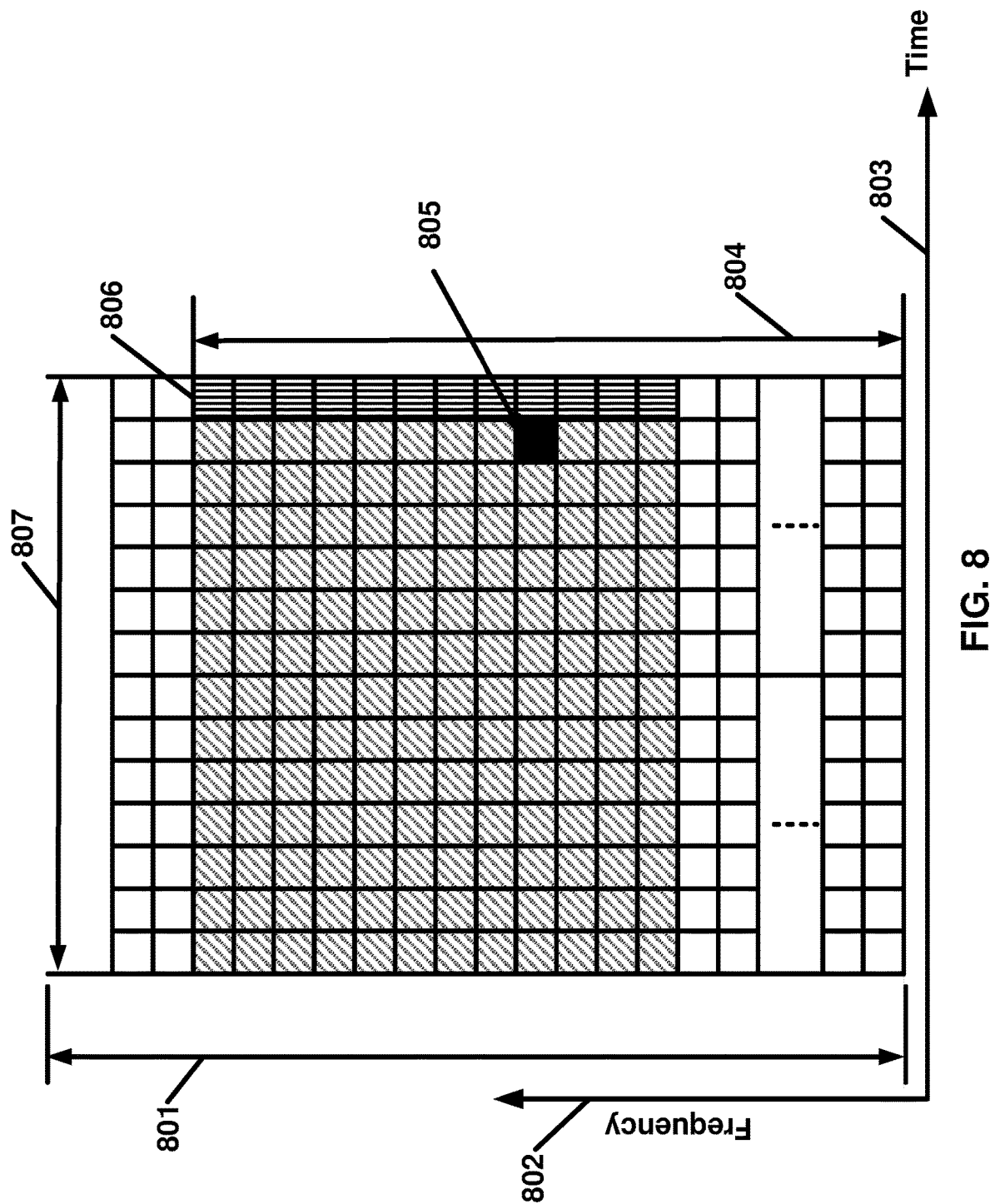
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803.

In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel.

Signaling for beam indication for a PDCCH may be MAC CE signaling, or RRC signaling, or DCI signaling, or specification-transparent and/or implicit method, and combination of these signaling methods. For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
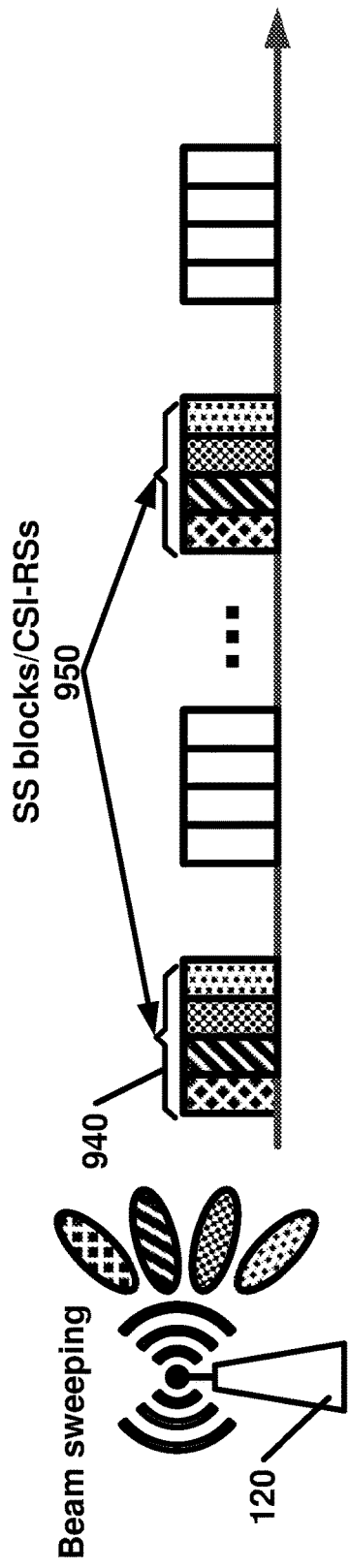
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
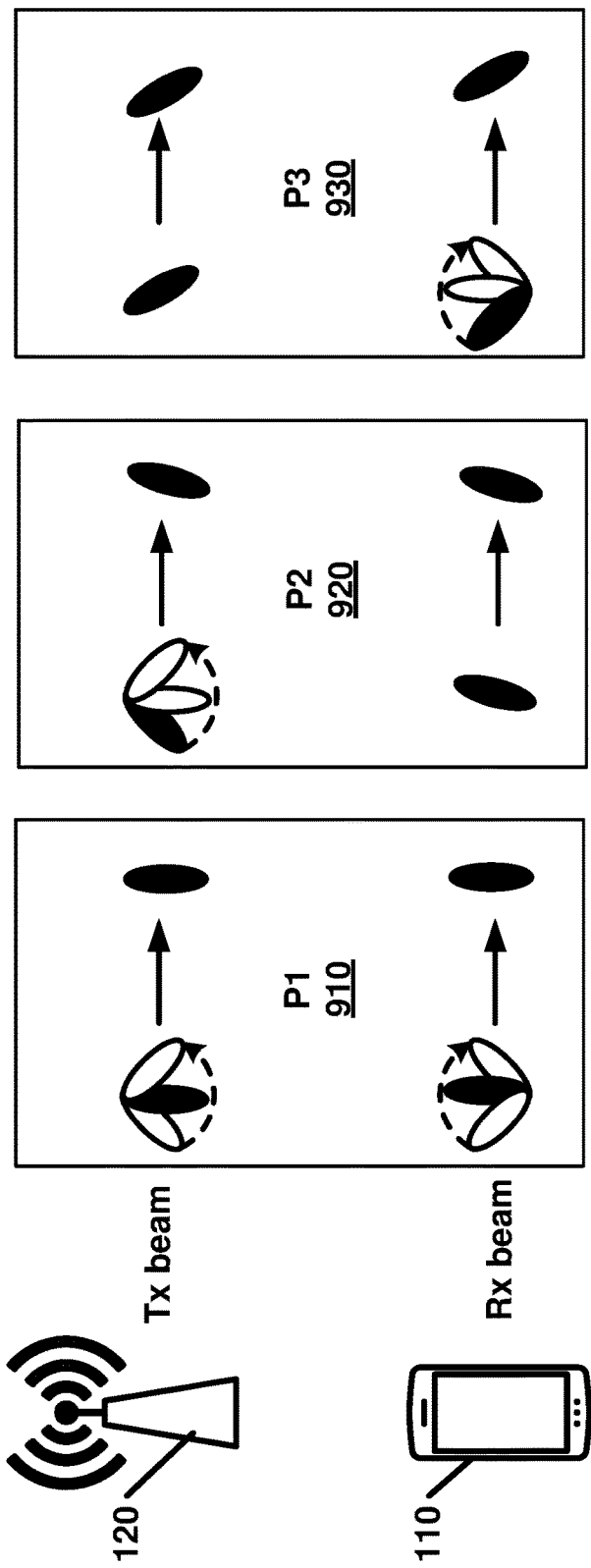
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
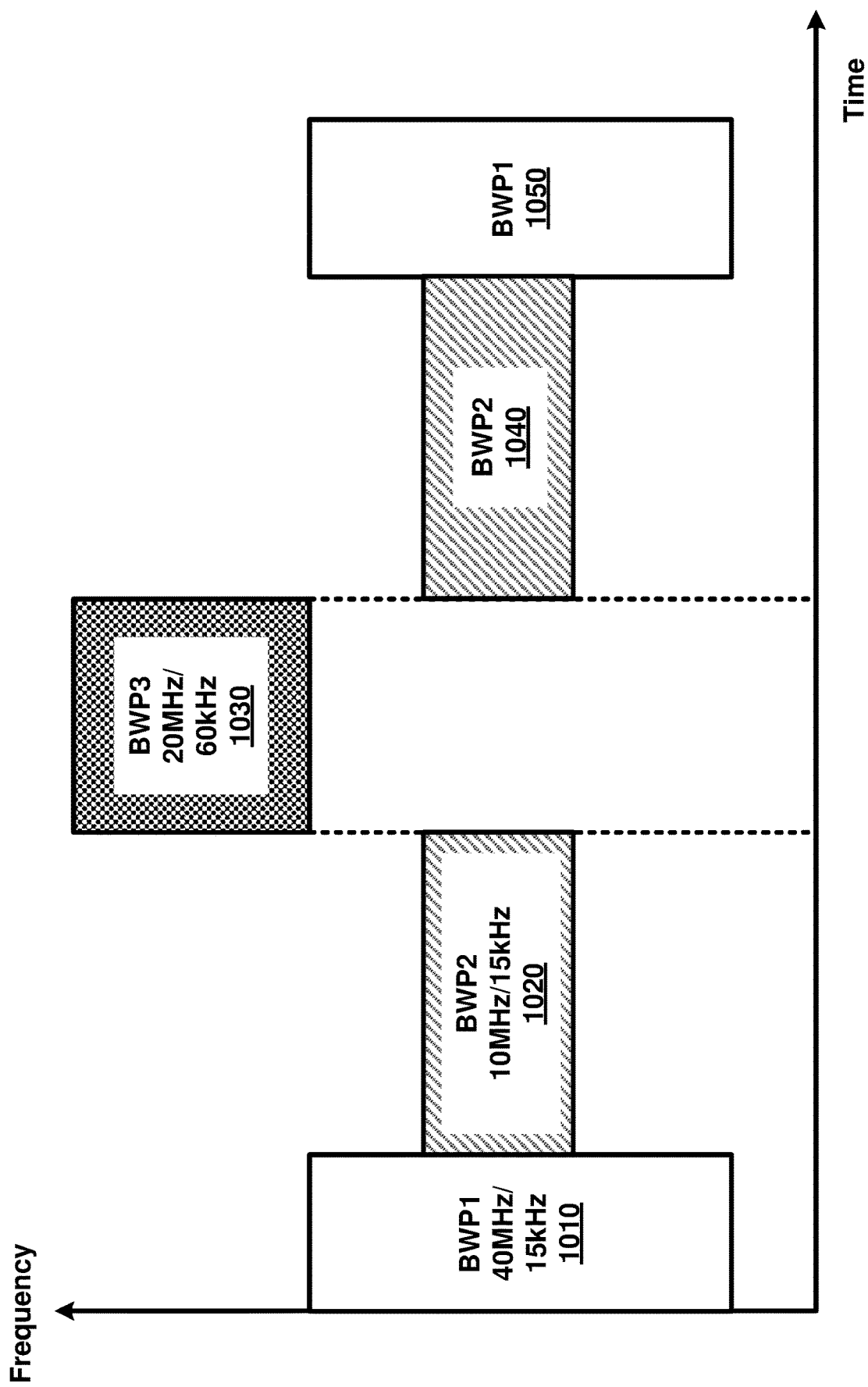
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell. To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier. In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
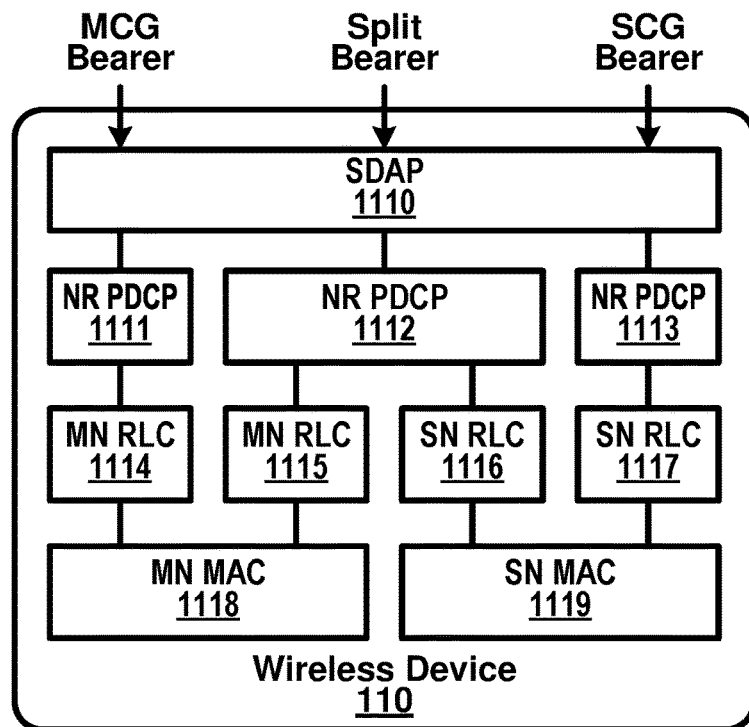
FIG. 11A, and FIG. 11B are diagrams of an example multi connectivity as per an aspect of an embodiment of the present disclosure.
Figure 11B:
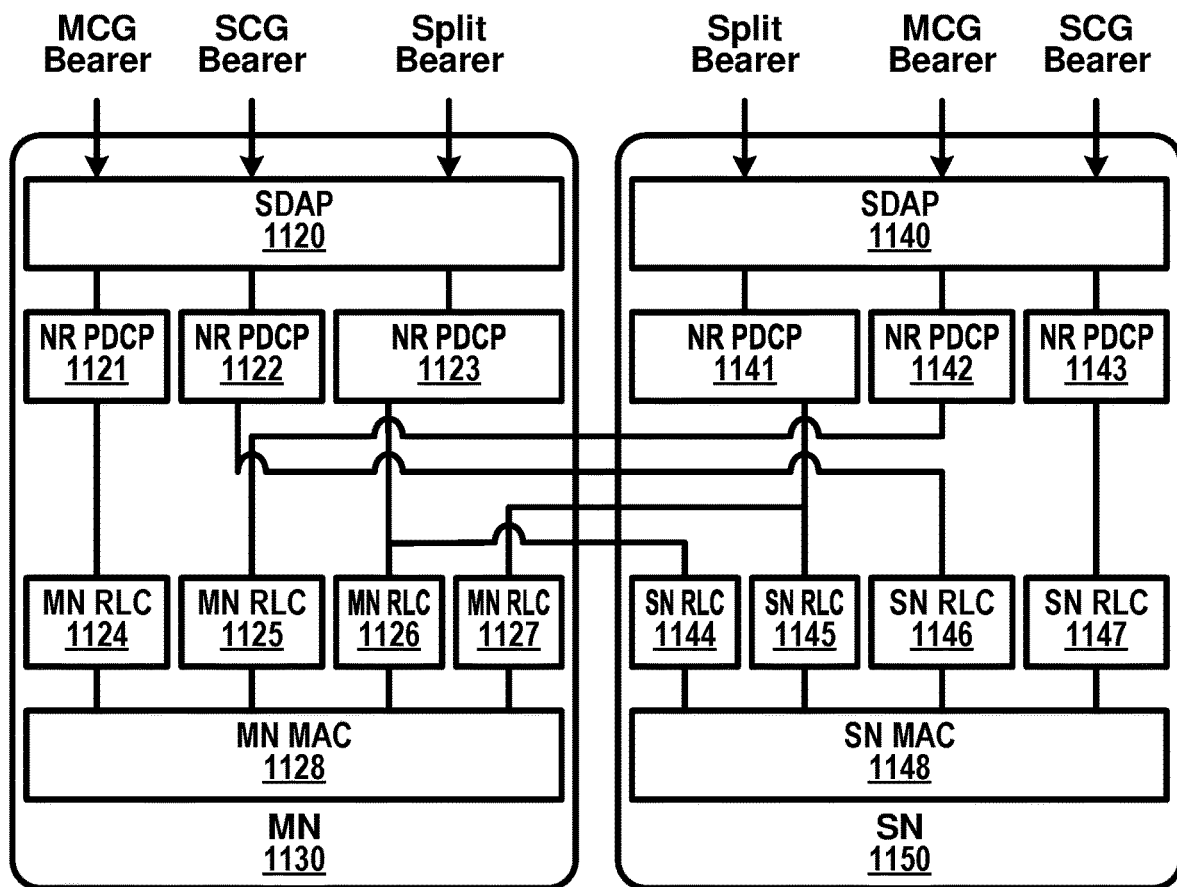

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
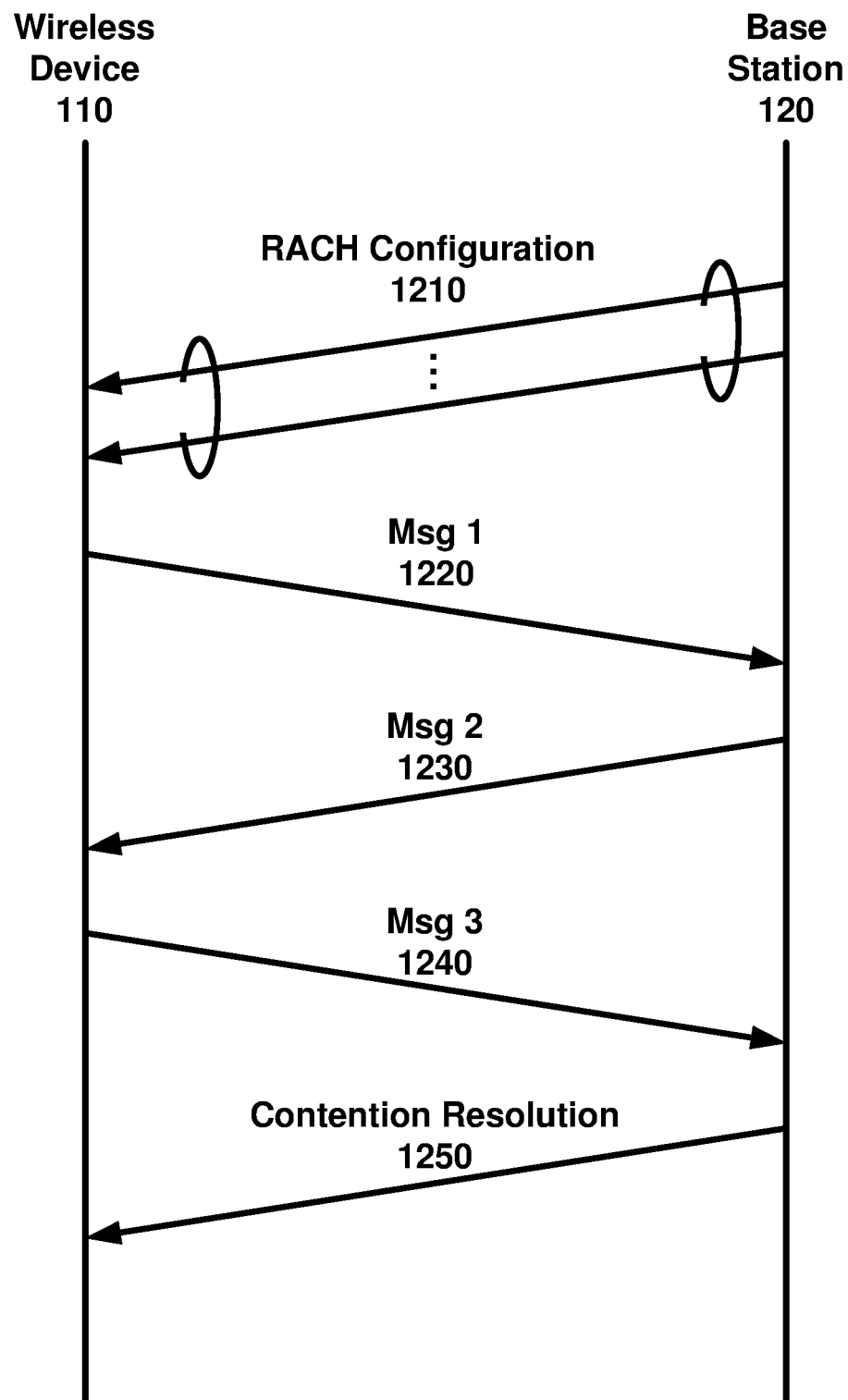
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information.

For example, a PDCCH order, a MAC entity, and/or a beam failure indication may initiate a random access procedure. In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
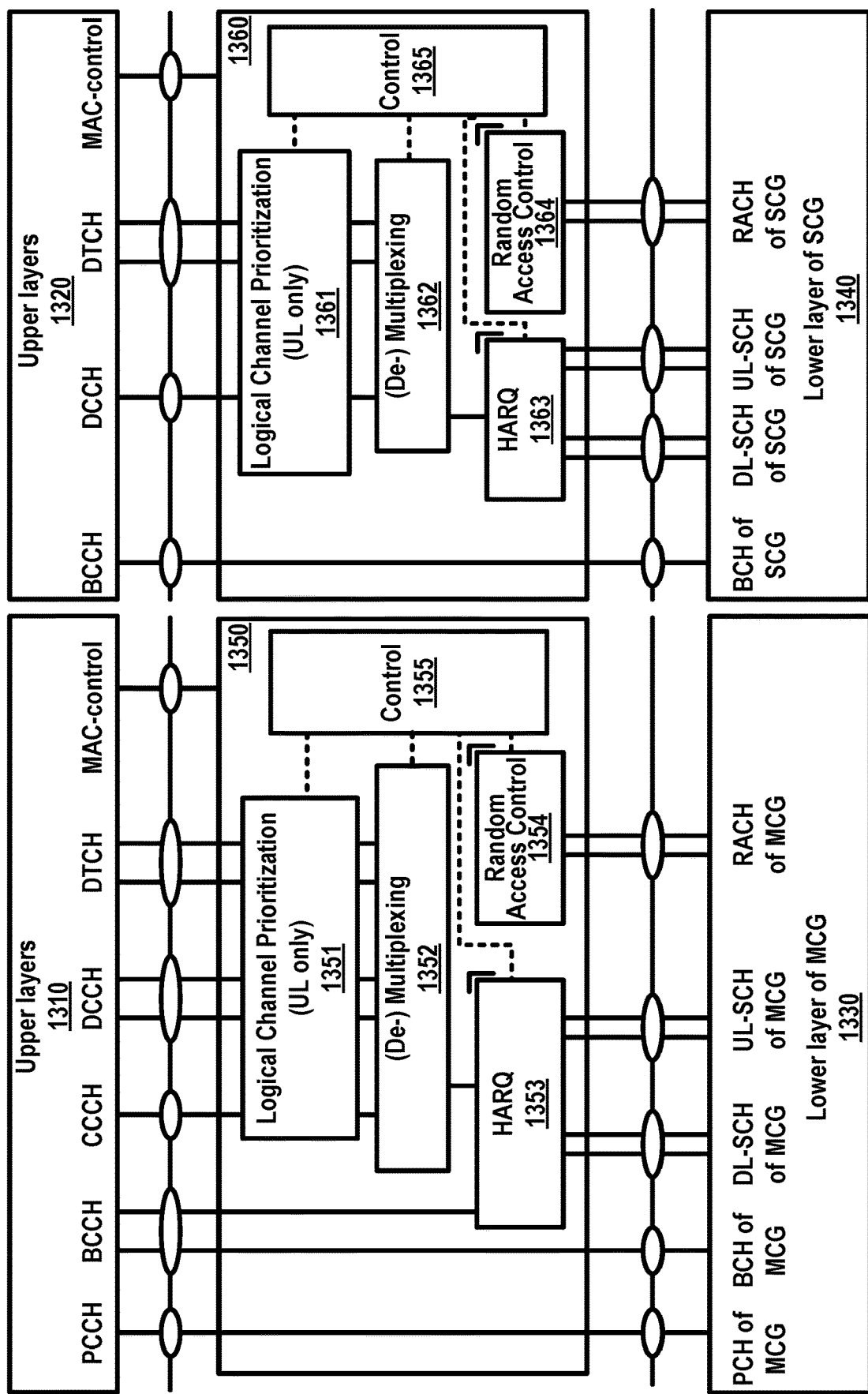
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection reestablishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
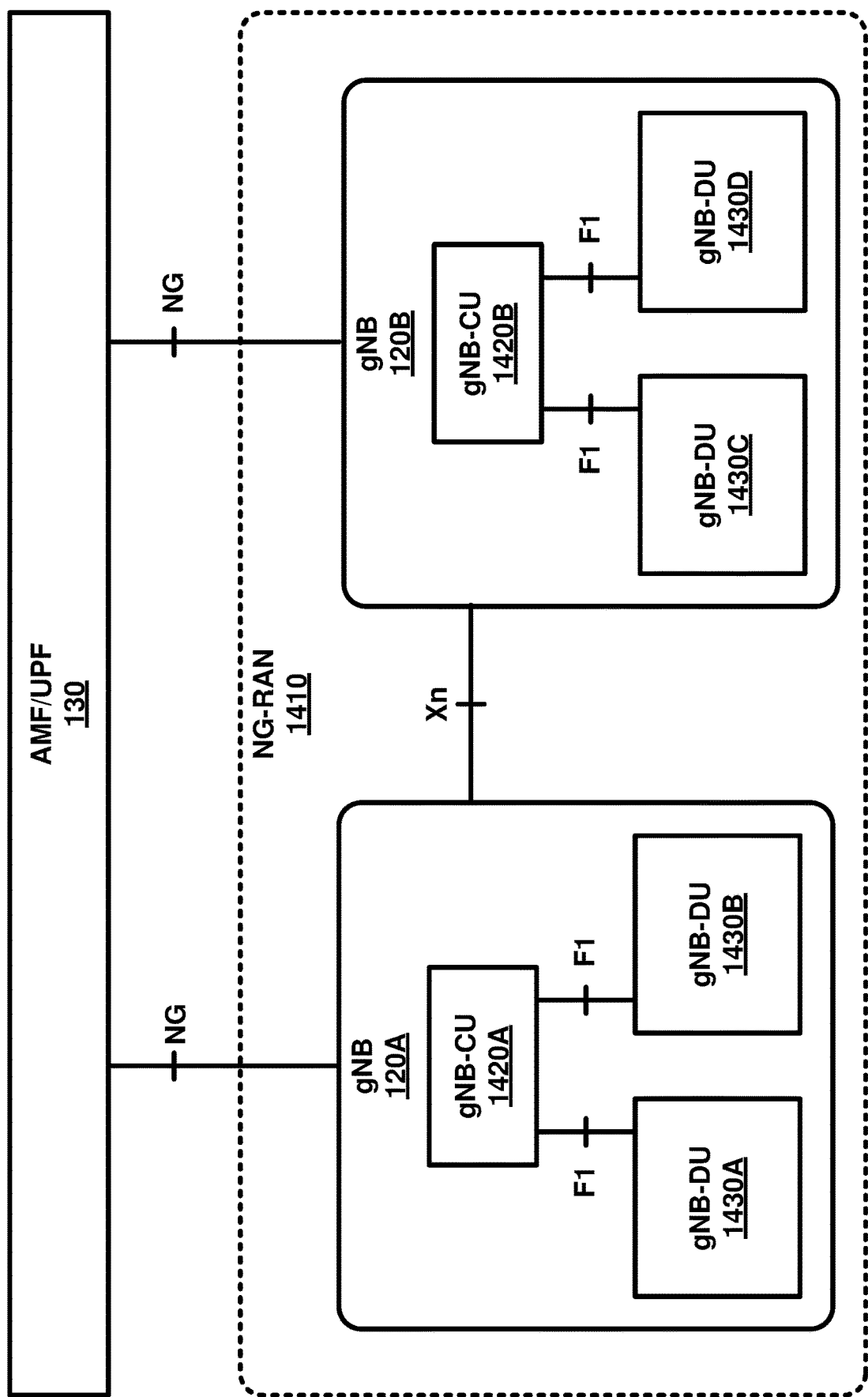
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
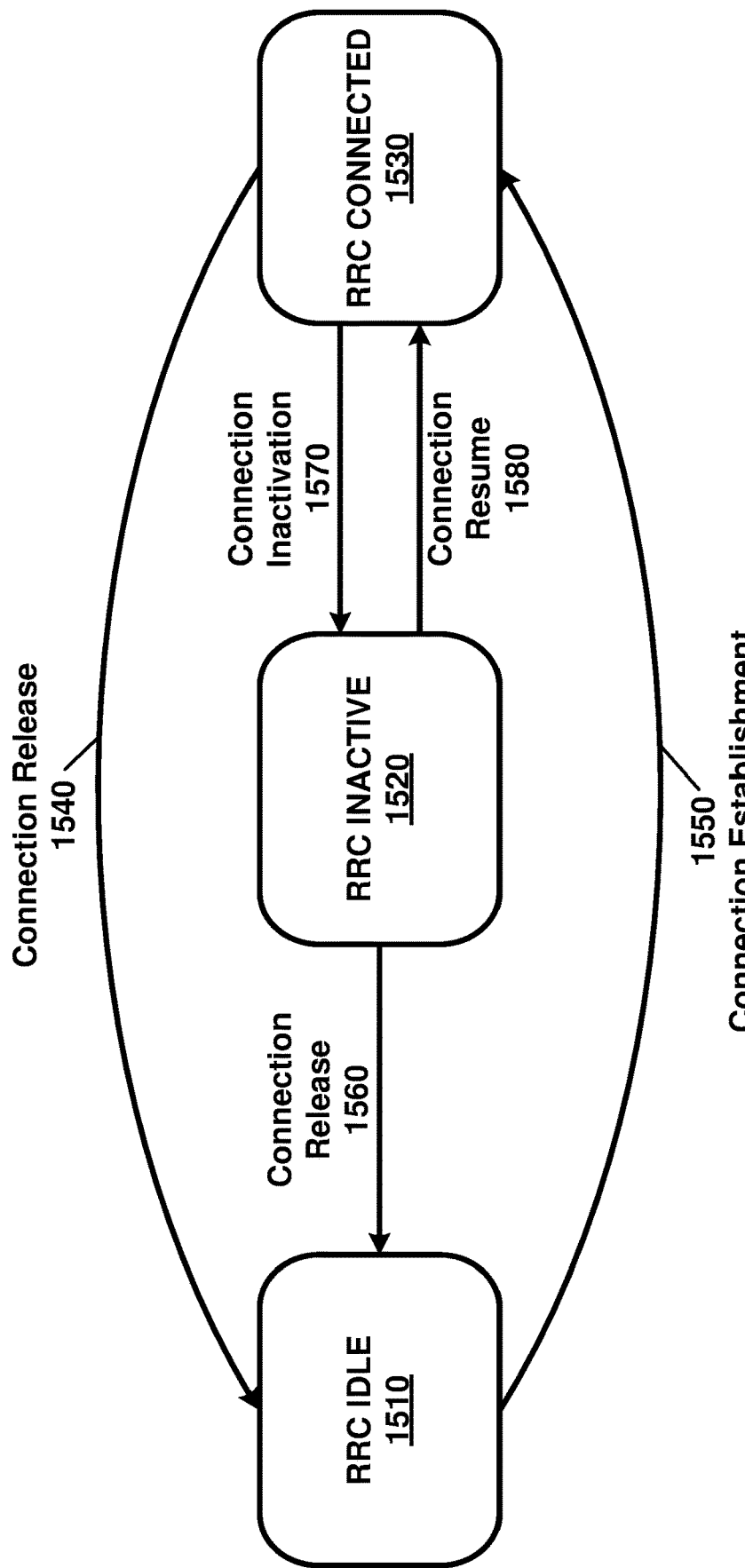
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC_Connected 1530, RRC_Connected), an RRC idle state (e.g. RRC_Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer.

Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, single and multiple DL to UL and UL to DL switching within a shared gNB COT may be supported. Example LBT requirements to support single or multiple switching points, may include: for gap of less than 16 us: no-LBT may be used; for gap of above 16 us but does not exceed 25 us: one-shot LBT may be used; for single switching point, for the gap from DL transmission to UL transmission exceeds 25 us: one-shot LBT may be used; for multiple switching points, for the gap from DL transmission to UL transmission exceeds 25 us, one-shot LBT may be used.

In an example, a signal that facilitates its detection with low complexity may be useful for UE power saving; Improved coexistence; Spatial reuse at least within the same operator network, serving cell transmission burst acquisition, etc.

In an example, operation of new radio on unlicensed bands (NR-U) may employ a signal that contains at least SS/PBCH block burst set transmission. In an example, other channels and signals may be transmitted together as part of the signal. The design of this signal may consider there are no gaps within the time span the signal is transmitted at least within a beam. In an example, gaps may be needed for beam switching. In an example, the occupied channel bandwidth may be satisfied.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, HARQ A/N for the corresponding data may be transmitted in the same shared COT. In some examples, the HARQ A/N may be transmitted in a separate COT from the one the corresponding data was transmitted.

In an example, when UL HARQ feedback is transmitted on unlicensed band, NR-U may consider mechanisms to support flexible triggering and multiplexing of HARQ feedback for one or more DL HARQ processes.

In an example, the dependencies of HARQ process information to the timing may be removed. In an example, UCI on PUSCH may carry HARQ process ID, NDI, RVID. In an example, Downlink Feedback Information (DFI) may be used for transmission of HARQ feedback for configured grant.

In an example, both CBRA and CFRA may be supported on NR-U SpCell and CFRA may be supported on NR-U SCells. In an example, RAR may be transmitted via SpCell. In an example, a predefined HARQ process ID for RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in unlicensed spectrum may be supported. In an example, an NR cell with DL in unlicensed band and UL in licensed band may be supported. In an example, dual connectivity between licensed band NR (PCell) and NR-U (PSCell) may be supported.

In an example, if absence of Wi-Fi cannot be guaranteed (e.g. by regulation) in a band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used. In an example, preamble detection may be used.

In an example, with scheduled PUSCH transmissions on an unlicensed carrier, the network first needs to gain access to the channel to transmit PDCCH and then the UE needs to perform LBT again prior to transmitting on the resource. Such procedure tends to increase latency especially when the channel is loaded. In an example, a mechanism of autonomous uplink transmission may be used. In an example, a UE may be pre-allocated a resource for transmission similar to UL SPS and performs LBT prior to using the resource. In an example, autonomous uplink may be based on the Configured Grant functionality (e.g., Type 1 and/or Type 2).

In an example, the HARQ process identity may be transmitted by the UE (e.g., as UCI). This may enable a UE to use the first available transmission opportunity irrespective of the HARQ process. In an example, UCI on PUSCH may be used to carry HARQ process ID, NDI and RVID.

For unlicensed band, UL dynamic grant scheduled transmission may increase the delay and transmission failure possibility due to at least two LBTs of UE and gNB. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, UE may autonomously select one HARQ process ID which is informed to gNB by UCI.

In an example, a UE may perform non-adaptive retransmission with the configured uplink grant. When dynamic grant for configured grant retransmission is blocked due to LBT, UE may try to transmit in the next available resource with configured grant.

In an example, Downlink Feedback Information (DFI) may be transmitted (e.g., using DCI) may include HARQ feedback for configured grant transmission. The UE may perform transmission/retransmission using configured grant according to DFI including HARQ feedback. In an example, wideband carrier with more than one channels is supported on NR-based unlicensed cell.

In an example, there may be one active BWP in a carrier. In an example, a BWP with multiple channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a UE within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires UE to have the capability to support multiple narrow RF or a wide RF which includes these multiple activated BWPs.

In an example, a single wideband BWP may be activated for a UE within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the UE a new active BWP to use for an upcoming, and any subsequent, data transmission/reception. In an example, a UE may monitor multiple, configured BWPs to determine which has been acquired for DL transmissions by the gNB. For example, a UE may be configured with monitoring occasion periodicity and offset for each configured BWP. The UE may attempt to determine if a BWP has been acquired by the gNB during those monitoring occasions. In an example, upon successfully determining that the channel is acquired, the UE may continue with that BWP as its active BWP, at least until indicated otherwise or MCOT has been reached. In an example, when a UE has determined that a BWP is active, it may attempt blind detection of PDCCH in configured CORESETs and it might also perform measurements on aperiodic or SPS resources.

In an example, for UL transmissions, a UE may be configured with multiple UL resources, possibly in different BWPs. The UE may have multiple LBT configurations, each tied to a BWP and possibly a beam pair link. The UE may be granted UL resources tied to one or more LBT configurations. Similarly, the UE may be provided with multiple AUL/grant-free resources each requiring the use of different LBT configurations. Providing a UE with multiple AUL resources over multiple BWPs may ensure that if LBT fails using a first LBT configuration for one AUL resource in one BWP a UE can attempt transmission in another AUL resource in another BWP. This may reduce the channel access latency and make better use of the over-all unlicensed carrier.

The carrier aggregation with at least one SCell operating in the unlicensed spectrum may be referred to as Licensed-Assisted Access (LAA). In LAA, the configured set of serving cells for a UE may include at least one SCell operating in the unlicensed spectrum according to a first frame structure (e.g., frame structure Type 3). The SCell may be called LAA SCell.

In an example, if the absence of IEEE802.11n/11ac devices sharing the carrier cannot be guaranteed on a long term basis (e.g., by level of regulation), and for if the maximum number of unlicensed channels that network may simultaneously transmit on is equal to or less than 4, the maximum frequency separation between any two carrier center frequencies on which LAA SCell transmissions are performed may be less than or equal to 62 MHz. In an example, the UE may be required to support frequency separation.

In an example, base station and UE may apply Listen-Before-Talk (LBT) before performing a transmission on LAA SCell. When LBT is applied, the transmitter may listen to/sense the channel to determine whether the channel is free or busy. If the channel is determined to be free/clear, the transmitter may perform the transmission; otherwise, it may not perform the transmission. In an example, if base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the UE applies may be signaled via uplink grant for uplink PUSCH transmission on LAA SCells. In an example, for Autonomous Uplink (AUL) transmissions the LBT may not be signaled in the uplink grant.

In an example, for type 1 uplink channel access on AUL, base station may signal the Channel Access Priority Class for a logical channel and UE may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the UE may select logical channels corresponding to any Channel Access Priority Class for UL transmission in the subframes signaled by base station in common downlink control signaling.

In an example, for uplink LAA operation, the base station may not schedule the UE more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the UE if type 1 uplink channel access procedure is signaled to the UE; and/or Channel Access Priority Class used by the base station based on the downlink traffic, the latest BSR and received UL traffic from the UE if type 2 uplink channel access procedure is signaled to the UE.

In an example, a first number (e.g., four) Channel Access Priority Classes may be used when performing uplink and downlink transmissions in LAA carriers. In an example, FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by considering the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)>P may be included in the DL transmission burst once no more data corresponding to Channel Access Priority Class≤P is available for transmission. In such cases, base station may maximize occupancy of the remaining transmission resources in the DL transmission burst with this additional traffic.

In an example, when the PDCCH of an LAA SCell is configured, if cross-carrier scheduling applies to uplink transmission, it may be scheduled for downlink transmission via its PDCCH and for uplink transmission via the PDCCH of one other serving cell. In an example, when the PDCCH of an LAA SCell is configured, if self-scheduling applies to both uplink transmission and downlink transmission, it may be scheduled for uplink transmission and downlink transmission via its PDCCH.

In an example, Autonomous uplink may be supported on the SCells. In an example, one or more autonomous uplink configuration may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the UE implementation from the HARQ process IDs that are configured for autonomous UL HARQ operation by upper layers for example, in aul-harq-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmission-Timer which may prohibit new transmission or retransmission for the same HARQ process when the timer is running.

In an example, when the HARQ feedback is received for a TB, the HARQ process may set HARQ_FEEDBACK to the received value; and may stop the aul-retransmission-Timer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEED-BACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the UE detects on the scheduling cell for UL transmissions on an LAA SCell a transmission of DCI (e.g., Format 0A/4A) with the CRC scrambled by AUL C-RNTI carrying AUL-DFI, the UE may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the UE may expect HARQ-ACK feedback in the AUL-DFI at earliest in subframe n+4; If the UE receives AUL-DFI in a subframe indicating ACK for a HARQ process, the UE may not be expected to receive AUL-DFI indicating ACK for the same HARQ process prior to 4 ms after the UE transmits another uplink transmission associated with that HARQ process. In an example, a UE may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, a base station may configure consecutive configured grant resources in time. There may be no gaps between the consecutive configured grant resources. In an example, the base station may configure non-consecutive configured grant resources. In an example, the non-consecutive configured grant resources may have a periodicity. In an example, the non-consecutive configured grant resources may be non-periodic. In an example, a first pattern of configured grant resources may be repeated in time wherein the resources of the first configured resources are non-periodic.

In an example, a wireless device may select an HARQ process ID from an RRC configured set of HARQ IDs for transmission of packet via a configured grant resource on an unlicensed cell.

In an example, a downlink control information may comprise downlink feedback information (DFI), wherein the DFI includes pending HARQ ACK feedback for prior configured grant transmissions from the same UE. In an example, DFI may include HARQ feedback for dynamically scheduled UL transmissions using HARQ IDs configured for NR-unlicensed configured grant transmission.

In an example, a packet/transport block corresponding to a HARQ process that was initially transmitted via a configured grant resource may be retransmitted via a configured grant resource. In an example, a packet/transport block corresponding to a HARQ process that was initially transmitted via a configured grant resource may be retransmitted via resources dynamically scheduled by an UL grant. In an example, a wireless device may autonomously initiate retransmission for a HARQ process that was initially transmitted via configured grant mechanism for NR-unlicensed when a NACK is received (e.g., via DFI) for the corresponding HARQ process. In an example, a wireless device may autonomously initiate retransmission for a HARQ process that was initially transmitted via configured grant mechanism for NR-unlicensed when no feedback is received gNB before a timer is expired.

In an example, UE multiplexing and collision avoidance mechanisms between configured grant transmissions and between configured grant and scheduled grant transmissions may be used.

In an implementation, NR-unlicensed configured grant transmission may not be allowed during the time when it overlaps with occasions configured for potential NR-U DRS of the serving cell.

In an example, an RRC configured bitmap may be used to the allowed time resource for configured grant transmission on subframe/slot/symbol level. For example, in FeLAA, an RRC configured bitmap of 40 bits may be used. Such a mechanism may provide flexibility to assign or exclude certain subframes/slots/symbols for configured UL.

In an example, RRC signaling may indicate (e.g., for Type 1 configured grants) the time domain resource allocation e.g., periodicity, offset in the frame, start symbol and length of PUSCH and K-repetition of the configured grant resource. In an example for Type 2 configured grant, RRC may indicate periodicity and K-repetition in time domain. The other time domain related parameters may be given through DCI activation scrambled with a corresponding RNTI for configured grants (e.g., CS-RNTI). In an example, some enhancements may be used in different application scenario such as URLLC. For example, the granularity of time domain allocation may be based on slot instead of OFDM symbol. In an example, the K-repetition may be reinterpreted as number of configured resource within a period. In an example, UE may start configured grant transmission from any configured resource boundary and occupy any number of the configured resource.

In an example, resource allocation in NR-U may based on frequency interlaces. In an example, to comply with the regulatory requirements in the unlicensed spectrum such as the minimum OCB and maximum PSD requirements, the resource configuration may include the frequency interlace(s) to be used within the configured frequency resources.

In an example, a wireless device may be configured with a wideband carrier and/or a wideband UL BWP that spans multiple subbands. In an example a subband may be a 20 MHz unlicensed channel. In order to increase the resiliency to LBT failure, a wireless device may be configured with a frequency-domain resource, e.g., one or more frequency interlaces, across multiple subbands. In an example, a wireless device may perform multiple subband LBT procedures. Based on the results of the subband LBT procedures, the wireless device may transmit on one or more subbands for which the LBT procedure(s) are successful. In an example, the wireless device may select the number of subbands to use based on the traffic type or the TB size.

In an example, for the uplink transmission with configured grant in NR-U, configuration of frequency-domain resources may include one or more frequency interlaces. In an example, frequency-domain resources may be configured across multiple subbands of a wideband UL BWP configured to the UE for transmission with configured grant in NR-U.

In an example, a wireless device operating in unlicensed bands may be transmitting uplink packets from different traffic classes (e.g., QCIs) with different latency and/or bit rate requirements for which a single resource configuration, e.g., periodicity and TBS, may not be adequate. In an example, a wireless device may be configured with multiple active UL configured grants in a BWP of a cell. A wireless device may be configured with multiple resource configurations per UE for the uplink transmission with configured grant to satisfy the diverse QoS requirements anticipated in NR-U.

In an example, to improve the resource utilization with pre-configured resources one or more wireless devices may be configured with same time-domain resources, and either orthogonal or same frequency interlaces on the same unlicensed channel. In an example, the transmission starting points of the one or more wireless devices may be aligned to avoid mutual blocking during the LBT. In an example, if a collision occurs, the receiving base station may identify the UEs using other pre-configured resources, such as DMRS, and resolve the collision in the spatial or code domains.

Due to the uncertainty of the unlicensed channel availability in NR-U, a UE with data ready to transmit may not gain access to the pre-configured resources as a result of LBT failure. The missing of the pre-configured transmission opportunity may lead to underutilized resources and/or excessive latencies. In an example, the wireless device that missed a pre-configured periodic transmission opportunity may defer its channel access for the remaining time span of the configured period until the following transmission opportunity.

In an example, a wireless device may be configured with multiple transmission occasions over the pre-configured time-domain resource within a CG period. In an example, before the beginning of the pre-configured period, the wireless device may perform the LBT procedure towards accessing the first transmission occasion/burst starting position. If the LBT is successful, the UE may start transmitting one or more PUSCHs up to the end of the CG resource within the pre-configured period. In an example, if the LBT fails, the UE may not defer the channel access for the remaining period. The wireless device may resume its channel access attempt by performing LBT towards accessing the second transmission occasion, and so on.

In an example, a base station may dynamically allow a group of wireless devices to transmit on additional resources in accordance with a configured grant (for example except for periodicity and time offset) by sending a DL common alignment signal such as a DCI. In an example, the DCI may be scrambled by a group ID.

In an example, transmission start time of multiple UEs configured with the same time-domain resources and either same or orthogonal frequency interlaces on a given unlicensed channel may be aligned. In an example, base station may align uplink transmission with configured grant using an Alignment Signal (e.g., a group common DCI).

In an example, a retransmission may be scheduled with an uplink grant for a HARQ process that was initially transmitted with configured grant.

In an example, UCI multiplexed with data and transmitted via PUSCH may carry HARQ process ID, NDI, RVID and other information related to the transmitted data. UCI multiplexed with data and carrying information related to data may need to be encoded and decoded separately before the data to enable the soft combining of the packet at the base station.

In an example, the HARQ process ID may be determined based on the frequency interlace and/or the DMRS cyclic shift (such that initial and retransmission of a UE TB may be identified).

In an example, the base station may provide pending HARQ feedback for one or more PUSCH transmitted with configured grant within previous UL bursts using a GC-DCI scrambled with a group RNTI.

In an example, a base station may perform a CAT4 LBT and acquire an MCOT. The base station may transmit a DL Alignment signal to trigger a transmission from one or more UEs based on the configured grant. The UEs with data to transmit may share the base station acquired MCOT and either access the channel immediately, if the PUSCH transmission can start after gap that is less than 16 μsec or using CAT2 LBT otherwise. In such case, the UEs transmitting in response to the DL Alignment signal limit their COT by the gNB-acquired MCOT.

In an example, the base station may provide HARQ feedback for one or more PUSCH transmitted with CG within the UE-acquired MCOT in either a GC-DCI or frequency multiplexed UE-specific DCIs. The base station share one or more UE-acquired MCOT(s) and access the channel with CAT2 LBT.

In an example, a wireless device may update its configured-grant transmission parameters such as MCS, RI and PMI, and indicate the changes to the base station within the uplink burst. In an example, a pre-configured pool of pilot signals may indicate the change, e.g., DMRS and cyclic shifts. In an example, UCI multiplexed with PUSCH may indicate the UE updated transmission parameters.

In an example, the base station may update the configured grant transmission parameters, e.g., based on received signal quality such as SINR or BLER, and indicate the new parameters in a DCI. In an example, the base station may use a GC-DCI. In an example, a UE-specific DCI may be used.

In an example, multiple candidate transmission occasions within a period may be configured. In an example, the candidate transmission occasions within a period can be configured by network or derived by UE according to the configuration. In an example, for NR-U UL configured grant, a wireless device may determine multiple candidate transmission occasions within a period. In an example, the multiple transmission occasions may be based on the first candidate transmission occasion, duration of PUSCH and period P.

In an example, a wireless device may perform multiple LBTs when it is configured with a BWP with frequency bandwidth larger than 20 MHz for UL configured grant transmission. In an example, if a subband is sensed to be busy, UE may not transmit an UL signal in the active BWP on the unlicensed spectrum. In an example, UE may transmit the UL signal unless all the subbands of the frequency bandwidth are sensed to be idle.

In an example, a wireless device may have multiple frequency resource allocations per BWP. In an example, a UE may be configured with multiple configured grant resource configurations in a BWP by RRC. Multiple configured grant configurations may be activated and different configured grant configurations may have different combinations of subbands. In an example, a configuration may be indexed, and the index may be carried by the activation/deactivation DCI to indicate the target configuration. In an example, for NR-U UL configured grant, multiple resource configurations may be supported per BWP. Different resource configurations may correspond to different subband combinations.

In an example, for a HARQ process that was initially transmitted via configured grant resource, retransmission may be via a configured grant resource or resource scheduled by UL grant.

In an example, NR-U UCI for configured grant may be mapped to the REs after the symbols carrying DMRS in PUSCH on the allocated subbands. In an example, UCI may be mapped from the symbol of the PUSCH before which the channel is sensed to be idle.

In an example, for NR-U UL configured grant, UCI may be mapped on the resource of the actual transmission occasion. In an example, NR-U UCI for configured grant is mapped to the REs after the symbols carrying DMRS in the transmitted PUSCH.

In an example, multiple UEs in NR unlicensed spectrum may be configured with configured grant resources with aligned starting timing in time domain. The UEs may perform LBT simultaneously when there are packets in their buffers before the transmission occasion of configured grant resource. In an example, each UE may sense the channel is idle and may start PUSCH transmission. This would lead to collision of UL transmissions among multiple UEs.

In an example, DMRS may be used for UE identification since DMRS configuration(s)/parameter(s) are UE-specifically configured. In an example, when collision happens, base station may identify colliding UEs via DMRS detection. If multiple UEs transmit UL data simultaneously using the same starting position in time domain, base station may identify the UEs transmitting UL data via DMRS detection. In an example, base station may schedule retransmission or feedback NACK for the corresponding UE.

For NR grant-free uplink (GUL) transmission in unlicensed band, due to the uncertainty of channel availability, a UE may be configured/scheduled with multiple transmission opportunities in time/frequency domain.

In an example in time domain, a UE can be configured with multiple consecutive transmission occasions within a periodic window for GUL transmission. The UE may perform multiple LBT attempts until it succeeds. To enable more LBT attempts at a finer channel access granularity for the UE, the UE may be configured with mini-slot level time domain resources for the periodic window. The consecutive time domain resources for the periodic window may be configured through either a bitmap or a tuple of parameters including start position, temporal length, and periodicity. In an example, a bitmap may be used to indicate slots/symbols/subframes that are configured with configured grant within a time duration. The bitmap may indicate a pattern and the pattern may be repeated for consecutive time durations.

In an example in NR-U, a UE with capability of subband LBT may be configured to operate multiple 20 MHz unlicensed channels. The base station may configure a set of candidate resources distributed across the multiple unlicensed channels for GUL transmission. The UE may perform subband LBTs for each unlicensed channel. The UE may select the available candidate resource(s) to transmit the data. These candidate resources may be shared with multiple UEs by managing the transmission starting positions to avoid the inefficient resource utilization. In an example, the base station may blindly detect the actual transmission(s) on the configured multiple candidate resources. In an example, a UE may be configured with multiple candidate resources across multiple unlicensed channels for grant-free UL transmission, and the UE may transmit data on one or more candidate resources based on subband LBT results.

In an example, for NR-U configured grant, downlink signals and/or channels such as PDCCH/PDSCH may be shared in a UE-initiated COT.

In an example, configured grant UCI (CG-UCI) on GUL transmission may carry HARQ process ID, NDI, RVID, etc. and may remove the timing dependency of HARQ process. In an example, a UE may select the HARQ process ID from an RRC configured set of HARQ process IDs. In an example, if the configured resource(s) for GUL transmission is shared with multiple UEs, the CG-UCI may comprise the UE ID.

In an example, to support UE-initiated COT sharing for PDCCH and/or PDSCH transmission, the CG-UCI may carry COT sharing information. In an example, besides HARQ related information, CG-UCI may include at least UE ID, COT-sharing related information, CSI report for DL transmission in a same UE-initiated COT, etc.

In an example, Downlink Feedback Information (DFI) may be transmitted via a downlink control information (DCI) and may include HARQ feedback for configured grant transmission. In an example, time domain resource allocation for the configured grant transmissions may provide flexibility.

In an example, a base station may configure a UE with a periodicity and repetition times by RRC. In an example, repetition times may be considered as pre-configured transmission occasions within the periodicity. The UE may transmit PUSCH after a successful LBT before any of the candidate transmission opportunities scheduled by the configured grant, and gNB can perform blind detection on uplink data according to the configuration.

In an example, in order to increase UL transmission opportunities, multiple frequency domain opportunities may be considered for NR-U. Multiple BWPs may be configured to UE. In an example, when data is available for transmission, the UE may attempt to perform LBT in multiple BWPs according to the resource configuration for configured grant. If any LBT on these BWPs succeeds, the UE may transmit on either multiple BWPs or a selected one.

In an example, transmission at the configured grants may be code block group (CBG) based. In an example, the HARQ feedback information in DFI or UCI may be considered CBG based. For example, DFI may provide CBG level HARQ feedback (e.g., ACK/NACK information per CBG of a TB). For example, UCI may indicate the CBGs of the TB that are transmitted via a configured grant resource. The UE may select the configured grant UL CBG and the transmitted CBGs information may be carried in the UCI. Or the DFI may provide CBG level feedback indication while UE can retransmit the failed CBGs based on the DFI indication.

In an example, UE initiated MCOT sharing between configured grant UL and DL may be used in NR-U. In an example, a UE performing grant-free transmission indicates in the grant-free UCI at least the following information: HARQ process ID, UE-ID, NDI, PUSCH duration and COT sharing information. In an example, the grant-free UCI is scrambled with a cell-specific RNTI. In an example, COT acquired by a UE may be shared for configured grant transmission.

In an example, DFI may carry HARQ feedback for configured grant transmission. HARQ-ACK information corresponding to HARQ processes at least configured for CGU (configured grant for NR-U) may be included also in CGU-DFI.

In an example, a UE may transmit the UCI corresponding to a PUSCH transmission via a configured grant resource via the PUSCH and the UCI may comprise at least HARQ process ID, NDI, RVID, etc. In an example, the mapping position of UCI may be from the second symbol to the second last symbol to minimize the effect of multiple starting/ending symbol positions of PUSCH. If the PUSCH for configured grant has multiple starting/ending positions, UCI mapping may avoid puncturing due to the LBT failure. In an example, the position of DM-RS for the PUSCH may be considered in the UCI mapping. In an example, the UCI can be mapped close to DM-RS symbol to guarantee its reliability. In an example, UCI mapping on PUSCH may consider multiple starting/ending positions and the position of DM-RS for PUSCH and multiplexing with NR-UCI (e.g., HARQ-ACK, CSI part 1, and CSI part 2).

In an example, the time-domain resource allocation for configured grant may be given by the combination of offset value from SFN=0 and symbol-level periodicity. To increase flexibility for time-domain resource allocation, the time-domain resource may be allocated using a bitmap for a fixed period time. In an example, various numerologies for bitmap based time domain resource allocation may be considered. For example, the bitmap with fixed size may be interpreted as a scalable manner with respect to numerology (e.g., one slot allocation for each bit in case of 15 kHz SCS and two slot allocation for each bit in case of 30 kHz SCS), or different bitmap size can be configured for each SCS (e.g., 40-bit bitmap for 15 kHz SCS and 80-bit bitmap for 30 kHz SCS).

In an example, a wireless device or base station may employ CBG based transmission. A UE may provide HARQ-ACK feedback for each CBG and base station may retransmit the NACKed CBGs rather than the whole TB. The CBG-based transmission may be useful for large TB scenario and especially when some CBGs are punctured by URLLC or time-selective interference.

In an example, CBG-based transmission may be realized by CBGTI (CBG transmission indication) in scheduling DCI, for a retransmission of a TB, the bit value '0' means that the corresponding CBG is not transmitted/not to be transmitted and '1' indicates that it is transmitted/to be transmitted for DL/UL.

In an example in NR-U, CBG based transmission may be used for PDSCH/PUSCH. In an example, CBG-based transmission may be used for PUSCH transmission via configured grant resources. In an example, some symbols may not be transmitted due to LBT failure (e.g., puncturing) if multiple starting positions for CGU PUSCH are allowed in NR-U. In an example, the UE may retransmit CBG(s) only belonging to the not-transmitted symbols. In order to support efficient CBG based transmission for CGU, we may need to consider how to configure control information (e.g., DFI, UCI). For example, CBGTI bits in the UCI may be included for UE to inform the base station which CBGs are/were transmitted. In an example, CBG-level HARQ feedback via DFI may be adopted for UE to retransmit the NACKed CBGs based on the DFI. In an example, if CBG-level HARQ-ACK feedback by DFI is adopted, it is necessary to devise the way to reduce the signaling overhead (e.g., CBG-level HARQ-ACK for a limited number of HARQ process IDs or TB-level HARQ-ACK for granted UL transmission).

In an example, a base station may indicate which slots configured grant UL transmission are allowed using a bitmap, comprising a plurality of bits, via RRC signaling In an example, to improve the efficiency of configured grant transmission in NR-U, one potential enhancement is defining a periodic transmission window instead of only one periodic transmission occasion.

In an example, configured grant UL transmission may be allowed within the gNB acquired COT. In an example, the collisions between configured grant UL transmission and scheduled transmission may be managed by the transmission starting positions. In an example, UE-selected starting offset and RRC configured starting offset may be used to coordinate UE multiplexing for NR-U configured grant operation.

In an example, a timer may be used for autonomous configured grant retransmission for NR-U. The timer may be RRC configured with e.g. a slot granularity.

In an example, CBG operation for configured grant may overcome bursty interference. With CBG based operation, the retransmission efficiency may be increased. In an example, a UE may start configured grant UL transmission after successful LBT. Some symbols or partial symbol may be discarded based on when the UE finishes the LBT. In case the gNB received the rest of the CBGs correctly, the UE may need to retransmit CBG(s) belonging to the not-transmitted symbols instead of the full TB.

In an example, a HARQ process corresponding to a configured grant may not have a dependency to the timing of the configured grant. In an example, UCI on PUSCH may carry HARQ process ID, NDI, RVID, etc. In an example, downlink feedback information (DFI) may be transmitted via downlink control signaling. The DFI may comprise HARQ feedback for configured grant transmission. In an example, time domain resource allocation of configured grant transmissions may have flexibility. In an example, a retransmission may be based on a configured grant resource.

In an example, Type 1 and Type 2 configured grant mechanism may be used for operation of NR in unlicensed spectrum.

In an example, consecutive configured grant resources in time without any gaps in between the resources may be configured. In an example, non-consecutive configured grant resources (periodic or non-periodic) with gaps in between the resources may be configured.

In an example, a wireless device may select a HARQ process ID from an RRC configured set of HARQ IDs for NR-unlicensed configured grant transmission.

In an example, DFI may include pending HARQ ACK feedback for prior configured grant transmissions from the same wireless device. In an example, DFI may include HARQ ACK feedback for scheduled UL transmissions using HARQ IDs configured for NR-unlicensed configured grant transmission.

In an example, a HARQ process may be initially transmitted via configured grant resource. The retransmission of the HARQ process may be via a configured grant resource. In an example, a HARQ process that was initially transmitted via configured grant resource may be retransmitted via resource scheduled by UL grant.

In an example, a wireless device may autonomously initiate retransmission for a HARQ process that was initially transmitted via configured grant mechanism for NR-unlicensed, for example when one or more of the following conditions is met: reception of NACK feedback via DFI for the corresponding HARQ process, no reception of feedback from gNB upon a timer expiration, etc.

In an example, NR-unlicensed configured grant transmission may not be allowed during the time when it overlaps with occasions configured for potential NR-U DRS of the serving cell irrespective of the configured time domain resource for configured grant transmission.

In an example, to provide flexibility on time domain resource allocation of configured grants, a bitmap-based approach and configured parameters comprising, for example, periodicity, offset in the frame, start symbol, length of PUSCH and K-repetition signaling, etc. may be used.

In an example, CBG based retransmissions for configured grant based transmissions may be used. CBG related control information may be transmitted as part of DFI and UCI In an example, collision between configured grant and scheduled grant based transmission may be avoided by management of starting point of the transmission for configured grant and scheduled grant based transmission.

In an example, the resources utilized by the UCI, and multiplexing of UCI and data information of PUSCH require consideration of DMRS placement and starting and ending symbols of the configured grant based transmissions.

In an example, UCI corresponding to a configured grant transmission may comprise UE-ID, COT sharing information, PUSCH duration, etc.

In an example, it may be problematic for the UE to assume ACK in absence of reception of feedback, which may include explicit feedback or feedback in the form of uplink grants. In an example, assuming NACK upon a timer expiration may be a candidate solution to avoid LBT impact on reception of feedback.

In an example, sharing resources with gNB within COT(s) that is acquired by UE(s) as part of configured grant based transmissions may be supported. In an example, allowing configured grant based transmissions within a gNB acquired COT may be supported. In an example, a wireless device may be configured with a codeBlockGroupTransmisison parameter. The parameter indicates whether a PUSCH-CodeBlockGroupTransmisison IE is configured or not. The PUSCH-CodeBlockGroupTransmisison IE comprises a maxCodeBlockGroupsPerTransportBlock parameter indicating a maximum number of code block groups (CBGs) per TB In an example, a DCI (e.g., DCI format 0_1) may comprise a CBG transmission information (CBGTI) field. A size of the CBGTI field may be based on the maxCodeBlockGroupsPerTransportBlock parameter. The CBGTI field may be a bitmap comprising a plurality of bits. A value of a bit in the plurality of bits may indicate whether a CBG of the TB is scheduled.

In an example, a wireless device may use a procedure for grouping of code blocks to code block groups. In an example, if a UE is configured to receive code block group (CBG) based transmissions by receiving the higher layer parameter codeBlockGroupTransmission in PUSCH-ServingCellConfig, the UE may determine the number of CBGs for a PUSCH transmission as $M=\min(N, C)$, where N is the maximum number of CBGs per transport block as configured by maxCodeBlockGroupsPerTransportBlock in PUSCH-ServingCellConfig, and C is the number of code blocks in the PUSCH. Defining $M_1=\mod(C, M)$, $K_1=\lceil C/M \rceil$, and $K_2=\lfloor C/M \rfloor$. If $M_1>0$, CBG m, $m=0,1, \ldots, M_1-1$, may consist of code blocks with indices $m \cdot K_1+k$, $k=0,1, \ldots, K_1-1$. CBG m, $m=M_1, M_1+1, \ldots, M-1$, may consist of code blocks with indices $M_1 \cdot K_1+(m-M_1) \cdot K_2+k$, $k=0, 1, \ldots, K_2-1$.

In an example, a UE may be configured to transmit code block group based transmissions by receiving the higher layer parameter codeBlockGroupTransmission in PUSCH-ServingCellConfig. For an initial transmission of a TB as indicated by the New Data Indicator field of the scheduling DCI, the UE may expect that the CBGTI field indicates all the CBGs of the TB are to be transmitted, and the UE may include all the code block groups of the TB. For a retransmission of a TB as indicated by the New Data Indicator field of the scheduling DCI, the UE may include only the CBGs indicated by the CBGTI field of the scheduling DCI. A bit value of 0' in the CBGTI field may indicate that the corresponding CBG is not to be transmitted and 1' may indicate that it is to be transmitted. The order of CBGTI field bits may be such that the CBGs are mapped in order from CBG #0 onwards starting from the MSB.

In an example, HARQ process IDs may be configured for configured grant operation. In case tm1 is configured, a number of configured HARQ processes may equal to field value. In case tm2 is configured, the number of configured HARQ processes may equal to double of the field value. The largest value of the HARQ process ID may be equal to the number of configured HARQ processes.

In an example, for configured uplink grants, if UL HARQ operation is autonomous, the HARQ Process ID associated with a TTI for transmission on a Serving Cell may be selected by the UE implementation from the HARQ process IDs that are configured for configured grant UL HARQ operation by upper layers.

In an example, CBG based transmission may been introduced in NR. A UE may provide individual ACK/NACK for a CBG. The gNB may retransmit the failed CBGs instead of the entire TB. In an example, the UL grant may indicate the CBG bitmap for retransmission. The CBG based transmission may be useful when some CBGs suffer from bursty interference.

In an example, an initial transmission from UE may be based on TB level and gNB may always use grant-based retransmission where the grant indicates the failed CBGs for retransmission. In this case, the DFI may provide TB level feedback. In an example, DFI may provide CBG level feedback indication, if a limited number of HARQ processes are configured to the UE, while UE may retransmit the failed CBGs based on the DFI indication.

In an example, if a base station schedules an UL transmission for an incorrectly decoded configured grant transmission, the base station may indicate a CBG based retransmission in the DCI. In an example, if a number of configured HARQ processes for configured grants is small enough to fit CBG based ACK/NACK feedback in the DCI, the UE may perform CBG level retransmission, else the gNB provides only TB level feedback and the UE retransmits the entire TB. In an example, if the wireless device did not receive DFI, then the wireless device may attempt a TB based retransmission once again.

In an example, a UE may provide HARQ-ACK feedback for a CBG and the base station may retransmit the NACKed CBGs. In an example, a scheduling DCI may comprise a CBGTI (CBG transmission indication) for a retransmission of a TB. The bit value '0' may indicate that a corresponding CBG is not transmitted/not to be transmitted and '1' may indicate that the corresponding CBG is transmitted/to be transmitted for DL/UL.

In an example, Downlink Feedback Information (DFI) including HARQ-ACK feedback for configured grant PUSCH data may be transmitted to UE after demodulation of PUSCH data. If the HARQ-ACK feedback of one HARQ process is NACK, the base station may schedule a grant-based retransmission for the same HARQ process, or the base station may indicate the NACK information to UE so that UE may start the retransmission for the same HARQ process via a configured grant resource.

In an example, CBG-based HARQ feedback may lead to a large feedback payload and may impact the performance of PDCCH. In an example, to reduce the large HARQ feedback payload for PDCCH, the base station may determine HARQ feedback codebook semi-statically corresponding to configured grant resources within a pre-configured time window. In an example, a wireless device may transmit uplink assignment index (UAI) information to a base station to help the base station determine the corresponding HARQ feedback codebook.

In configured grants configured on unlicensed cells, a wireless device may transmit a subset of CBGs of a TB (for example for retransmission of the subset of CBGs). A size of a configured grant resource may be sufficient to transmit other TBs or other CBGs of other TBs. Legacy processes lead to inefficient use of configured grant resources. Example embodiment enhance the resource utilization of configured grants on unlicensed cells.

Figure 19:
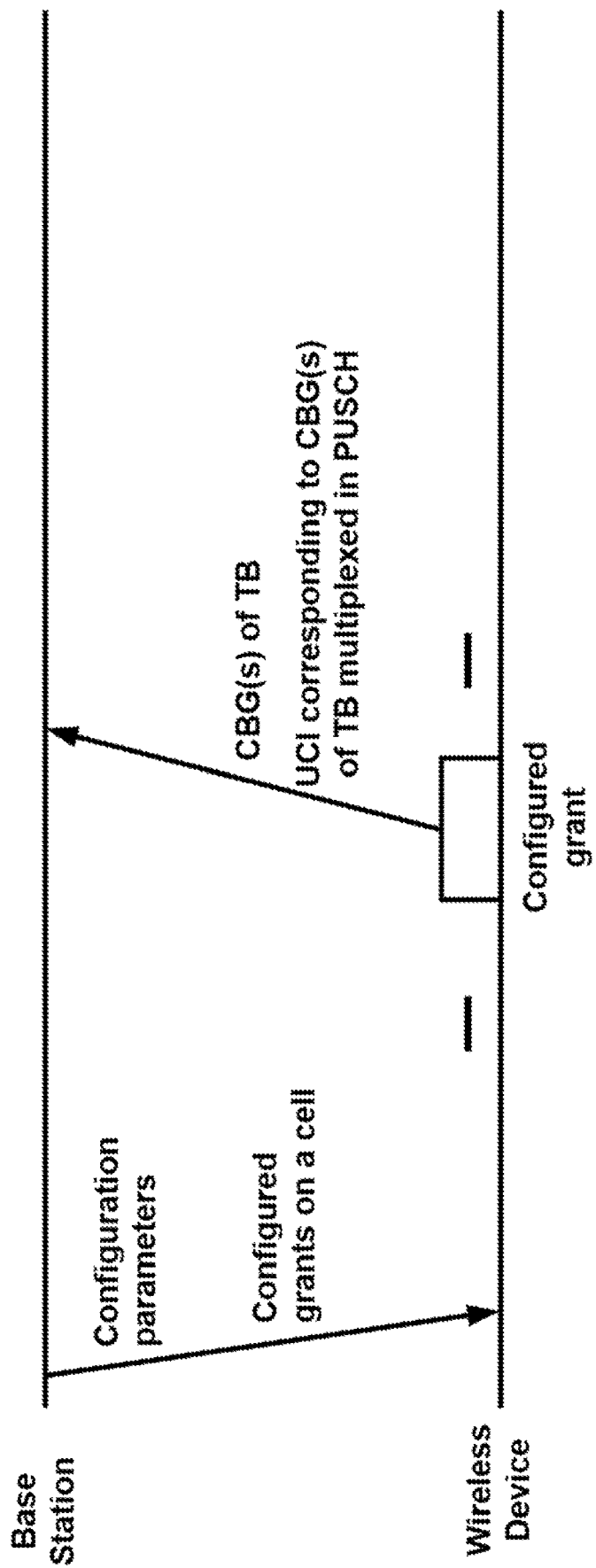
FIG. 19 is an example procedure as per an aspect of an embodiment of the present invention.

In an example embodiment as shown in FIG. 19, a wireless device may receive one or more messages comprising configuration parameters. The one or more messages may comprise one or more RRC messages. The one or more messages may comprise configuration parameters of one or more cells. In an example, the one or more cells may comprise a primary cell. In an example, the one or more cells may comprise a primary cell and one or more secondary cells. In an example, the one or more messages may comprise configuration parameters of uplink control channels on one or more first cells of the one or more cells. In an example, the one or more first cells may comprise a primary cell. In an example, the one or more cells may comprise a primary cell and one or more secondary cells configured with uplink control channel (e.g., PUCCH SCell). In an example, the one or more cells may comprise configuration parameters of configured grants on a cell of the one or more cells. In an example, the cell may be an unlicensed cell. In an example, the cell may be a licensed assisted access (LAA) cell.

In an example, the configuration parameters of the configured grant on the cell may indicate radio resources of one or more configured grants on the cell. In an example, the one or more configured grants of the cell may be activated in response to the receiving the one or more messages comprising the configuration parameters of the configured grant on the cell (e.g., Type 1 configured grants). The configuration parameters of the configured grant on the cell may indicate the radio resources of the one or more configured grants on the cell. The configuration parameters of the configured grant may indicate time domain and frequency domain resources of the one or more configured grants. The wireless device may determine the time domain occasions of the one or more configured grants based on one or more parameters of the configuration parameters (e.g., an offset to a SFN, etc.).

In an example, the one or more configured grants of the cell may be activated in response to the receiving the one or more messages comprising the configuration parameters of the configured grant on the cell and receiving a physical layer activation (e.g., activation DCI) of the one or more configured grants. In an example, the wireless device may validate an activation DCI based on an RNTI corresponding to the activation DCI and one or more values of one or more fields of the activation DCI.

In an example, the configuration parameters if the configured grants on the cell may indicate a plurality of HARQ processes for the configured grants. In an example, the wireless device may select a HARQ process of the plurality of HARQ processes for transmission of a packet via a radio resources of a configured grant of the plurality of configured grants.

In an example, a transport bock (TB) may comprise one or more code block groups (CBGs). A wireless device may determine a number of the one or more CBGs when creating the transport block. The number of the one or more CBGs may be based on a maximum number of CBGs per TB. The maximum number of CBGs per TB may be configured by RRC.

In an example, the wireless device may transmit one or more CBGs of a transport block via radio resources of a configured grant of the one or more configured grants. In an example, the one or more CBGs may be all of CBGs of the TB (e.g., CBGs constituting the TB). In an example, the transmission of the one or more CBGs may be for initial transmission of the TB. In an example, the wireless device may utilize the radio resources of the configured grant for retransmission of the one or more CBGs of the TB.

In an example, the wireless device may transmit/multiplex one or more uplink control information corresponding to the one or more CBGs of the TB with the one or more CBGs. The one or more uplink control information may be multiplexed with the one or more CBGs via a multiplexing mechanism. In an example, the multiplexing mechanism may be a puncturing mechanism. In an example, the multiplexing mechanism may be a rate matching mechanism. In an example, the base station may indicate the multiplexing mechanism (e.g., via RRC or physical/MAC layer signaling).

Figure 20:
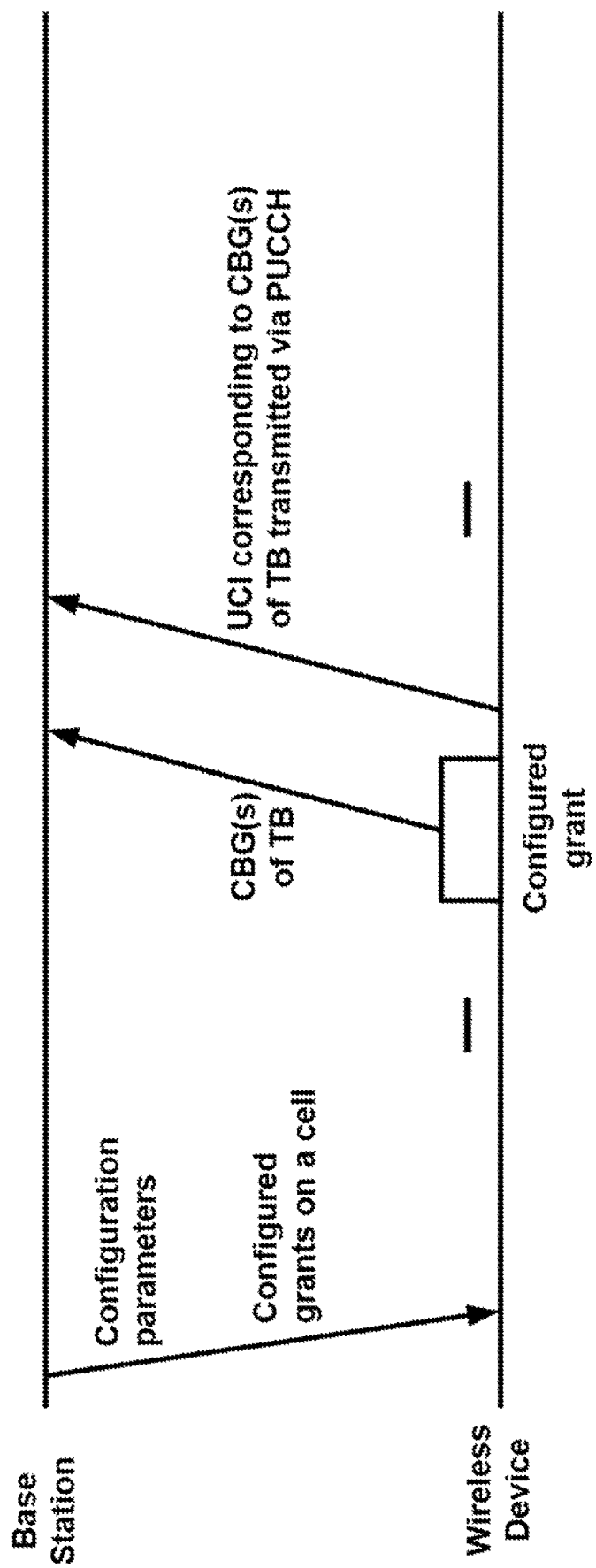
FIG. 20 is an example procedure as per an aspect of an embodiment of the present invention.

In an example embodiment as shown in FIG. 20, the one or more uplink control information corresponding to the one or more CBGs of the TB may be transmitted via an uplink control channel (e.g., PUCCH). The uplink control channel may be transmitted in a same transmission time/TTI as a transmission time of the one or more CBGs (e.g., a time occasion of the configured grant). In an example, the uplink control channel may be transmitted at a later time than the transmission time of the one or more CBGs (e.g., a time occasion of the configured grant).

Figure 21:
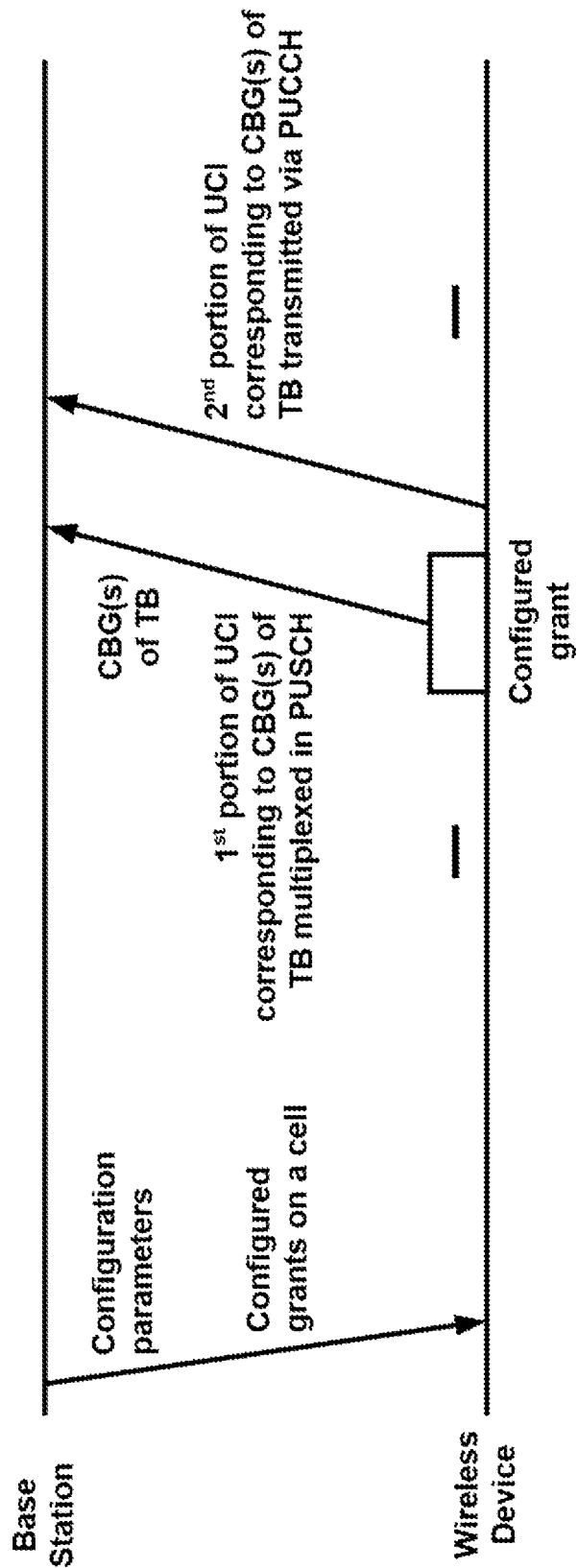
FIG. 21 is an example procedure as per an aspect of an embodiment of the present invention.

In an example embodiment as shown in FIG. 21, at least a first portion of the one or more uplink control information corresponding to the one or more CBGs of the TB may be transmitted/multiplexed with the one or more CBGs of the TB and transmitted via an uplink data channel (e.g., PUSCH). In an example, at least a second portion of the one or more uplink control information corresponding to the one or more CBGs of the TB may be via an uplink control channel (e.g., PUCCH). The uplink control channel may be transmitted in a same transmission time/TTI as a transmission time of the one or more CBGs (e.g., a time occasion of the configured grant). In an example, the uplink control channel may be transmitted at a later time than the transmission time of the one or more CBGs (e.g., a time occasion of the configured grant).

In an example, a UE and a base station scheduling UL transmission(s) for the UE may perform channel access procedures for the UE to access the channel(s) on which the unlicensed Scell(s) transmission(s) are performed.

In an example, the UE may access a carrier on which unlicensed Scell(s) UL transmission(s) are performed according to one of a plurality of channel access procedures. In an example, the plurality of channel access procedures may comprise a first Type or a second Type UL channel access procedures.

In an example, if an UL grant scheduling a PUSCH transmission indicates a first Type channel access procedure, the UE may use the first Type channel access procedure for transmitting transmissions including the PUSCH transmission.

In an example, a UE may use a first Type channel access procedure for transmitting transmissions including the PUSCH transmission on autonomous UL resources.

In an example, if an UL grant scheduling a PUSCH transmission indicates a second Type channel access procedure, the UE may use the second Type channel access procedure for transmitting transmissions including the PUSCH transmission.

Figure 18:
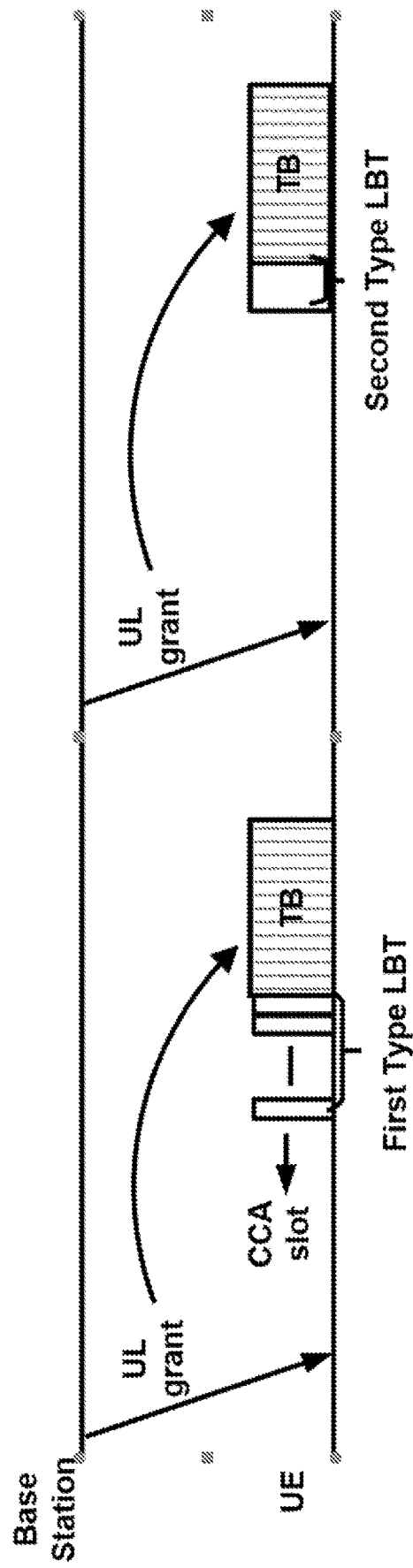
FIG. 18 is an example procedure as per an aspect of an embodiment of the present invention.

In an example and as shown in FIG. 18, channel access procedure for transmission of a first PUSCH may be based on a first Type channel access. The first Type channel access may be based on sensing the channel for a first number of durations (e.g., CCA slots). The first duration may have a first fixed value. The first number may be based on a random number drawn from an interval based on the priority class. In an example, channel access procedure for transmission of a second PUSCH may be based on a second Type channel access. The second Type channel access procedure may be based on sensing the channel based on a second fixed duration.

In an example, the UE may use the first Type channel access procedure for transmitting SRS transmissions not including a PUSCH transmission. In an example, UL channel access priority class p=1 may be used for SRS transmissions not including a PUSCH.

In an example, if the UE is scheduled to transmit PUSCH and SRS in subframe/slot/mini-slot/TTI n, and if the UE cannot access the channel for PUSCH transmission in subframe/slot/mini-slot/TTI n, the UE may attempt to make SRS transmission in subframe/slot/mini-slot/TTI n according to uplink channel access procedures specified for SRS transmission.

In an example, channel access priority classes and its associated parameters are shown in FIG. 17. In an example, for p=3, 4, Tulm cot, p may be 10 ms if a higher layer parameter (e.g., absenceOfAnyOtherTechnology) indicates TRUE, otherwise, Tulm cot, p may be 6 ms.

In an example, when Tulm cot, p is 6 ms it may be increased to 8 ms by inserting one or more gaps. The minimum duration of a gap may be 100 μs. The maximum duration before including any such gap may be 6 ms.

In an example, if a first field (e.g., an UL duration and offset field) configures an UL offset 1 and an UL duration d for subframe/slot/mini-slot/TTI n, the scheduled UE may use the second Type channel access for transmissions in subframes/slots/mini-slots/TTIs n+1+i where i=0, 1, . . . d−1, irrespective of the channel access Type signaled in the UL grant for those subframes/slots/mini-slots/TTIs, if the end of UE transmission occurs in or before subframe/slot/mini-slot/TTI n+1+d−1.

In an example, if one or more first fields (e.g., an UL duration and offset field) configure an UL offset 1 and an UL duration d for subframe/slot/mini-slot/TTI n and one or more second fields (e.g., COT sharing indication for AUL field) are set to true, a UE configured with autonomous UL may use the second Type channel access for autonomous UL transmissions corresponding to any priority class in subframes/slots/mini-slots/TTIs n+1+i where i=0, 1, . . . d−1, if the end of UE autonomous UL transmission occurs in or before subframe/slot/mini-slot/TTI n+1+d−1 and the autonomous UL transmission between n+1 and n+1+d−1 may be contiguous.

In an example, if one or more first fields (e.g., an UL duration and offset field) configures an UL offset 1 and an UL duration d for subframe/slot/mini-slot/TTI n and one or more second fields (e.g., a COT sharing indication for AUL field) is set to false, a UE configured with autonomous UL may not transmit autonomous UL in subframes/slots/mini-slots/TTIs n+1+i where i=0, 1, . . . d−1.

In an example, if the UE scheduled to transmit transmissions including PUSCH in a set subframes/slots/mini-slots/TTIs no, n1, . . . , nw−1 using one or more PDCCH DCI Formats and if the UE cannot access the channel for a transmission in subframe/slot/mini-slot/TTI nk, the UE may attempt to make a transmission in subframe/slot/mini-slot/TTI nk+1 according to a channel access type indicated in the DCI, where k E {0, 1, . . . w−2}, and w is the number of scheduled subframes/slots/mini-slots/TTIs indicated in the DCI.

In an example, if the UE is scheduled to transmit transmissions without gaps including PUSCH in a set of subframes/slots/mini-slots/TTIs no, n1, . . . , nw−1 using one or more PDCCH DCI Formats and the UE performs a transmission in subframe/slot/mini-slot/TTI nk after accessing the carrier according to one of first Type or second Type UL channel access procedures, the UE may continue transmission in subframes/slots/mini-slots/TTIs after nk where k E {0, 1, . . . w−1}.

In an example, if the beginning of UE transmission in subframe/slot/mini-slot/TTI n+1 immediately follows the end of UE transmission in subframe/slot/mini-slot/TTI n, the UE may not be expected to be indicated with different channel access types for the transmissions in those subframes/slots/mini-slots/TTIs.

In an example, if a UE is scheduled to transmit transmissions including a first mode PUSCH in a set subframes/slots/mini-slots/TTIs no, n1, . . . , nw−1 using one or more PDCCH DCI Formats and a first Type channel access procedure, and if the UE cannot access the channel for a transmission in subframe/slot/mini-slot/TTI nk according to the PUSCH starting position indicated in the DCI, the UE may attempt to make a transmission in subframe/slot/mini-slot/TTI nk with an offset of oi OFDM symbol and according to the channel access type indicated in the DCI, where k∈{0, 1, . . . w−1} and i∈{0, 7}, for i=0 the attempt is made at the PUSCH starting position indicated in the DCI, and w is the number of scheduled subframes/slots/mini-slots/TTIs indicated in the DCI. In an example, there may be no limit on the number of attempts the UE should make for the transmission.

In an example, if the UE is scheduled to transmit transmissions including a first mode PUSCH in a set subframes/slots/mini-slots/TTI sno, n1, . . . , nw−1 using one or more PDCCH DCIs and a second Type channel access procedure, and if the UE cannot access the channel for a transmission in subframe/slot/mini-slot/TTI nk according to the PUSCH starting position indicated in the DCI, the UE may attempt to make a transmission in subframe/slot/mini-slot/TTI nk with an offset of oi OFDM symbol and according to the channel access type indicated in the DCI, where k∈{0, 1, . . . w−1} and i∈{0, 7}, for i=0 the attempt is made at the PUSCH starting position indicated in the DCI, and w is the number of scheduled subframes/slots/mini-slots/TTIs indicated in the DCI. In an example, the number of attempts the UE may make for the transmission may be limited to w+1, where w is the number of scheduled subframes/slots/mini-slots/TTIs indicated in the DCI.

In an example, if a UE is scheduled to transmit without gaps in subframes/slots/mini-slots/TTIs no, n1, . . . , nw−1 using one or more PDCCH DCI Formats, and if the UE has stopped transmitting during or before subframe/slot/mini-slot/TTI nk1, k1∈{0, 1, . . . w−2}, and if the channel is sensed by the UE to be continuously idle after the UE has stopped transmitting, the UE may transmit in a later subframe/slot/mini-slot/TTI nk2, k2∈{1, . . . w−1} using a second Type channel access procedure. If the channel sensed by the UE is not continuously idle after the UE has stopped transmitting, the UE may transmit in a later subframe/slot/mini-slot/TTI nk2, k2∈{1, . . . w−1} using a first Type channel access procedure with the UL channel access priority class indicated in the DCI corresponding to subframe/slot/mini-slot/TTI nk2.

In an example, if the UE receives an UL grant and the DCI indicates a PUSCH transmission starting in subframe/slot/mini-slot/TTI n using s first Type channel access procedure, and if the UE has an ongoing first Type channel access procedure before subframe/slot/mini-slot/TTI n: if a UL channel access priority class value p1 used for the ongoing first Type channel access procedure is same or larger than the UL channel access priority class value p2 indicated in the DCI, the UE may transmit the PUSCH transmission in response to the UL grant by accessing the carrier by using the ongoing first Type channel access procedure.

In an example, if the UE receives an UL grant and the DCI indicates a PUSCH transmission starting in subframe/slot/mini-slot/TTI n using s first Type channel access procedure, and if the UE has an ongoing first Type channel access procedure before subframe/slot/mini-slot/TTI n: if the UL channel access priority class value p1 used for the ongoing first Type channel access procedure is smaller than the UL channel access priority class value p2 indicated in the DCI, the UE may terminate the ongoing channel access procedure.

In an example, if the UE is scheduled to transmit on a set of carriers C in subframe/slot/mini-slot/TTI n, and if the UL grants scheduling PUSCH transmissions on the set of carriers C indicate a first Type channel access procedure, and if the same PUSCH starting position is indicated for all carriers in the set of carriers C, or if the UE intends to perform an autonomous uplink transmission on the set of carriers C in subframe/slot/mini-slot/TTI n with first Type channel access procedure, and if the same $N_{Start}^{FS3}$ is used for all carriers in the set of carriers C: the UE may transmit on carrier $C_i \in$ C using a second Type channel access procedure, if the second Type channel access procedure is performed on carrier $c_1$ immediately before the UE transmission on carrier $g_j \in C$, i≠j, and if the UE has accessed carrier $c_j$ using first Type channel access procedure, where carrier $c_j$ is selected by the UE uniformly randomly from the set of carriers C before performing the first Type channel access procedure on any carrier in the set of carriers C.

In an example, if the UE is scheduled to transmit on carrier ci by a UL grant received on carrier cj, i≠j, and if the UE is transmitting using autonomous UL on carrier ci, the UE may terminate the ongoing PUSCH transmissions using the autonomous UL at least one subframe/slot/mini-slot/TTI before the UL transmission according to the received UL grant.

In an example, if the UE is scheduled by a UL grant received on a carrier to transmit a PUSCH transmission(s) starting from subframe/slot/mini-slot/TTI n on the same carrier using first Type channel access procedure and if at least for the first scheduled subframe/slot/mini-sloth occupies $N^{UL}RB$ resource blocks and the indicated 'PUSCH starting position is OFDM symbol zero, and if the UE starts autonomous UL transmissions before subframe/slot/mini-slot/TTI n using first Type channel access procedure on the same carrier, the UE may transmit UL transmission(s)

according to the received UL grant from subframe/slot/mini-slot/TTI n without a gap, if the priority class value of the performed channel access procedure is larger than or equal to priority class value indicated in the UL grant, and the autonomous UL transmission in the subframe/slot/mini-slot/TTI preceding subframe/slot/mini-slot/TTI n may end at the last OFDM symbol of the subframe/slot/mini-slot/TTI regardless of the higher layer parameter AulEndingPosition. The sum of the lengths of the autonomous UL transmission(s) and the scheduled UL transmission(s) may not exceed the maximum channel occupancy time corresponding to the priority class value used to perform the autonomous uplink channel access procedure. Otherwise, the UE may terminate the ongoing autonomous UL transmission at least one subframe/slot/mini-slot/TTI before the start of the UL transmission according to the received UL grant on the same carrier.

In an example, a base station may indicate a second Type channel access procedure in the DCI of an UL grant scheduling transmission(s) including PUSCH on a carrier in subframe/slot/mini-slot/TTI n when the base station has transmitted on the carrier according to a channel access procedure, or when a base station may indicate using the 'UL duration and offset' field that the UE may perform a second Type channel access procedure for transmissions(s) including PUSCH on a carrier in subframe/slot/mini-slot/TTI n when the base station has transmitted on the carrier according to a channel access procedure, or when a base station may indicate using the 'UL duration and offset' field and 'COT sharing indication for AUL' field that a UE configured with autonomous UL may perform a second Type channel access procedure for autonomous UL transmissions(s) including PUSCH on a carrier in subframe/slot/mini-slot/TTI n when the base station has transmitted on the carrier according to a channel access procedure and acquired the channel using the largest priority class value and the base station transmission includes PDSCH, or when or when a base station may schedule transmissions including PUSCH on a carrier in subframe/slot/mini-slot/TTI n, that follows a transmission by the base station on that carrier with a duration of Tshort_ul=25 us, if subframe/slot/mini-slot/TTI n occurs within the time interval starting at to and ending at to+TCo, where TCo=Tm cot, p+Tg, where to may be the time instant when the base station has started transmission, Tm cot, p value may be determined by the base station, Tg may be total duration of all gaps of duration greater than 25 us that occur between the DL transmission of the base station and UL transmissions scheduled by the base station, and between any two UL transmissions scheduled by the base station starting from to.

In an example, the base station may schedule UL transmissions between to and to+TCoin contiguous subframes/slots/mini-slots/TTIs if they can be scheduled contiguously.

In an example, for an UL transmission on a carrier that follows a transmission by the base station on that carrier within a duration of Tshort_ul=25 us, the UE may use a second Type channel access procedure for the UL transmission.

In an example, if the base station indicates second Type channel access procedure for the UE in the DCI, the base station may indicate the channel access priority class used to obtain access to the channel in the DCI.

In an example, the UE may transmit the transmission using first Type channel access procedure after first sensing the channel to be idle during the slot durations of a defer duration Td; and after the counter N is zero in step 4. In an example, the counter N may be adjusted by sensing the channel for additional slot duration(s) according to a procedure.

In an example, if the UE has not transmitted a transmission including PUSCH or SRS on a carrier on which unlicensed Scell(s) transmission(s) are performed, the UE may transmit a transmission including PUSCH or SRS on the carrier, if the channel is sensed to be idle at least in a slot duration Tsl when the UE is ready to transmit the transmission including PUSCH or SRS, and if the channel has been sensed to be idle during all the slot durations of a defer duration Td immediately before the transmission including PUSCH or SRS. If the channel has not been sensed to be idle in a slot duration Tsl when the UE first senses the channel after it is ready to transmit, or if the channel has not been sensed to be idle during any of the slot durations of a defer duration Td immediately before the intended transmission including PUSCH or SRS, the UE may proceeds to step 1 after sensing the channel to be idle during the slot durations of a defer duration Td.

In an example, the defer duration Td may consist of duration Tf=16 us immediately followed by mpconsecutive slot durations where each slot duration is Tsl=9 us, and Tf may include an idle slot duration Tslat start of Tf.

In an example, a slot duration Tsl may be considered to be idle if the UE senses the channel during the slot duration, and the power detected by the UE for at least 4 us within the slot duration is less than energy detection threshold XThresh. Otherwise, the slot duration Tsl may be considered to be busy.

In an example, CWmin, p≤CWp≤CWmax, p may be the contention window. In an example, CWmin, p and CWmax, p may be chosen before the channel access procedure. In an example, mp, CWmin, p, and CWmax, p may be based on channel access priority class signaled to the UE, as shown in FIG. 17.

In an example, if the UL UE uses second Type channel access procedure for a transmission including PUSCH, the UE may transmit the transmission including PUSCH immediately after sensing the channel to be idle for at least a sensing interval Tshort_ul=25 us. In an example, Tshort_ul may consists of a duration Tf=16 us immediately followed by one slot duration Tsl=9 us and Tf may include an idle slot duration Tslat start of Tf. The channel may be considered to be idle for Tshort_ul if it is sensed to be idle during the slot durations of Tshort_ul.

In an example, if the UE transmits transmissions using a first Type channel access procedure that are associated with channel access priority class p on a carrier, the UE may maintain the contention window value CWp and may adjust CWp for those transmissions before the channel access procedure.

In an example, if the UE receives an UL grant or an AUL-DFI, the contention window size for the priority classes may be adjusted as following: if the NDI value for at least one HARQ process associated with HARQ_ID ref is toggled, or if the HARQ-ACK value(s) for at least one of the HARQ processes associated with HARQ_ID ref received in the earliest AUL-DFI after nref+3 indicates ACK: for every priority class p∈{1, 2, 3, 4} set CWp=CWmin, p. Otherwise, CWp may be increased for every priority class p∈{1, 2, 3, 4} to the next higher allowed value.

In an example, if there exist one or more previous transmissions {To, ... , Tn} using the first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, Ti burst length+1) if X>0 and N=0 otherwise, for each transmission Ti, CWp is adjusted as following: increase CWp for every priority class p∈{1, 2, 3, 4} to the next higher allowed value; The CWp is adjusted once. Otherwise if the UE transmits transmissions using first Type channel access procedure before N subframes/slots/mini-slots/TTIs have elapsed from the start of previous UL transmission burst using first Type channel access procedure and neither UL grant nor AUL-DFI is received, the CWp is unchanged.

In an example, if the UE receives an UL grant or an AUL-DFI indicates feedback for one or more previous transmissions {To, . . . , Tn} using first Type channel access procedure, from the start subframe(s)/slot(s)/mini-slot(s)/TTI(s) of the previous transmission(s) of which, N or more subframes/slots/mini-slots/TTIs have elapsed and neither UL grant nor AUL-DFI was received, where N=max (Contention Window Size adjustment timer X, Ti burst length+1) if X>0 and N=0 otherwise, the UE may recompute CWp as follows: the UE reverts CWp to the value used to transmit at nTo using first Type channel access procedure; the UE updates CWp sequentially in the order of the transmission {To, . . . , Tn}. If the NDI value for at least one HARQ process associated with HARQ_ID ref is toggled, or if the HARQ-ACK value(s) for at least one of the HARQ processes associated with HARQ_ID ref received in the earliest AUL-DFI after nTi+3 indicates ACK. For every priority class p∈{1, 2, 3, 4} set CWp=CWmin, p. Otherwise, increase CWp for every priority class p∈{1, 2, 3, 4} to the next higher allowed value. If the UE transmits transmissions using first Type channel access procedure before N subframes/slots/mini-slots/TTIs have elapsed from the start of previous UL transmission burst using first Type channel access procedure and neither UL grant nor AUL-DFI is received, the CWp may be unchanged.

In an example, the HARQ_ID ref may be the HARQ process ID of UL-SCH in reference subframe/slot/mini-slot/TTI nref. The reference subframe/slot/mini-slot/TTI nref may be determined as follows: If the UE receives an UL grant or an AUL-DFI in subframe/slot/mini-slot/TTI ng, subframe/slot/mini-slot/TTI nw may be the most recent subframe/slot/mini-slot/TTI before subframe/slot/mini-slot/TTI ng−3 in which the UE has transmitted UL-SCH using first Type channel access procedure. In an example, if the UE transmits transmissions including UL-SCH without gaps starting with subframe/slot/mini-slot/TTI no and in subframes/slots/mini-slots/TTIs no, n1, . . . , nw and the UL-SCH in subframe/slot/mini-slot/TTI no is not PUSCH Mode 1 that starts in the second slot of the subframe/slot/mini-slot/TTI, reference subframe/slot/mini-slot/TTI nref may be subframe/slot/mini-slot/TTI no. In an example, if the UE transmits transmissions including a first PUSCH Mode without gaps starting with second slot of subframe/slot/mini-slot/TTI no and in subframe/slot/mini-slot/TTI no, n1, . . . , nw and the, reference subframe/slot/mini-slot/TTI nref is subframe/slot/mini-slot/TTI no and n1, otherwise, reference subframe/slot/mini-slot/TTI nref may be subframe/slot/mini-slot/TTI nw.

In an example, HARQ_ID ref may be the HARQ process ID of UL-SCH in reference subframe/slot/mini-slot/TTI nTi. The reference subframe/slot/mini-slot/TTI nTi may be determined as the start subframe/slot/mini-slot/TTI of a transmission Ti using a first Type channel access procedure and of which, N subframes/slots/mini-slots/TTIs have elapsed and neither UL grant nor AUL-DFI was received.

In an example, if the AUL-DFI with a first DCI format is indicated to a UE that is activated with AUL transmission and a second transmission mode is configured for the UE for grant-based uplink transmissions, the spatial HARQ-ACK bundling may be performed by logical OR operation across multiple codewords for the HARQ process not configured for autonomous UL transmission.

In an example, if CWp changes during an ongoing channel access procedure, the UE may draw a counter Ninit and applies it to the ongoing channel access procedure.

In an example, the UE may keep the value of CWp unchanged for every priority class p∈{1, 2, 3, 4}, if the UE scheduled to transmit transmissions without gaps including PUSCH in a set of subframes/slots/mini-slots/TTIs no, n1, . . . , nw−1 using a first Type channel access procedure, and if the UE is not able to transmit any transmission including PUSCH in the set of subframes/slots/mini-slots/TTIs.

In an example, the UE may keep the value of CWp for every priority class p∈{1, 2, 3, 4} the same as that for the last scheduled transmission including PUSCH using first Type channel access procedure, if the reference subframe/slot/mini-slot/TTI for the last scheduled transmission is also nref.

In an example, if CWp=CWmax, p, the next higher allowed value for adjusting CWp is CWmax, p.

In an example, if the CWp=CWmax, p is consecutively used K times for generation of Ninit, CWp may be reset to CWmin, p for that priority class p for which CWp=CWmax, p is consecutively used K times for generation of Ninit. In an example, K may be selected by UE from the set of values {1, 2, . . . , 8} for a priority class p∈{1, 2, 3, 4}.

In an example, a UE accessing a carrier on which LAA Scell(s) transmission(s) are performed, may set the energy detection threshold (XThresh) to be less than or equal to the maximum energy detection threshold XThresh_max.

In an example, if the UE is configured with higher layer parameter maxEnergyDetectionThreshold, XThresh_max may be set equal to the value signaled by the higher layer parameter. Otherwise, the UE may determine X'Thresh_max according to a first procedure for determining energy detection threshold. In an example, if the UE is configured with higher layer parameter energyDetectionThresholdOffset, XThresh_max may be set by adjusting X'Thresh_max according to the offset value signaled by the higher layer parameter. Otherwise, the UE may set XThresh_max=X'Thresh_max.

In an example, an LB T operation may follow a back-off algorithm based on CWS (contention window size) management. In an example, CWS update for DL/UL may be based on the decoding results of TB(s) in reference subframe(s). In an example, separate HARQ operation. may be possible for different cpde blocks (CBs) for a same TB. In an example, CWS management may be based on CBG operation.

In an example, CWS update for DL/UL may be based on the decoding results of TB(s) in reference subframe(s) and the minimum (/maximum) timing gap between a reference subframe and the corresponding CWS update timing may be defined. In an example, base station scheduler may adapt timing relationship between PDSCH and UL HARQ feedback, between PUSCH transmission and retransmission, and so on. In an example, UEs may report different capabilities on those timing relationships. In an example, flexible DL/UL scheduling timing and the related UE capabilities may impact CWS management.

In an example, UCI multiplexing in PUSCH may be performed. In an example, UCI multiplexing in PUSCH may be performed when UCI and PUSCH transmissions coincide in time. In an example, UCI multiplexing in PUSCH may be due to transmission of a UL-SCH transport block or due to triggering of A-CSI transmission without UL-SCH transport block. In an example, UCI (e.g. UCI carrying HARQ-ACK feedback with small payload, e.g., 1 or 2 bits) may be multiplexed by puncturing PUSCH. In an example, UCI may be multiplexed by rate matching PUSCH. In an example for puncturing, a TB may be mapped to radio resources and one or more resources elements may be punctured for transmission of the UCI. In an example, for rate matching, the UCI and data may be jointly coded and mapped to the radio resources.

In an example, autonomous uplink (AUL) may be supported on one or more SCells. In an example, one autonomous uplink configuration may be supported per SCell. In an example, multiple autonomous uplink configurations may be activated and be active simultaneously when there is more than one SCell. In an example, autonomous uplink and uplink semi-persistent Scheduling/configured grants may not be active simultaneously on the same SCell.

In an example, a wireless device may be configured by RRC with an IE (e.g., AUL-Config) configuring AUL parameters. The AUL configuration parameters may comprise an AUL C-RNTI, HARQ process IDs aul-HARQ-Processes that may be configured for autonomous UL HARQ operation, a time period aul-RetransmissionTimer before triggering a new transmission or a retransmission of the same HARQ process using autonomous uplink; the bitmap aul-Subframes that indicates the subframes that are configured for autonomous UL HARQ operation.

In an example, when the autonomous uplink configuration is released by RRC, the corresponding configured grant may be cleared. In an example, if AUL-Config is configured, the MAC entity may consider that a configured uplink grant occurs in those subframes for which aul-Subframes is set to 1.

In an example, if AUL confirmation has been triggered and not cancelled, if the MAC entity has UL resources allocated for new transmission for a TTI, the MAC entity may instruct the Multiplexing and Assembly procedure to generate an AUL confirmation MAC Control Element. The wireless device may cancel the triggered AUL confirmation.

In an example, the MAC entity may clear the configured uplink grant for the SCell after first transmission of AUL confirmation MAC Control Element triggered by the AUL release for this SCell. In an example, retransmissions for uplink transmissions using autonomous uplink may continue after clearing the corresponding configured uplink grant.

In an example, a base station may allocate a semi-persistent uplink resource or autonomous uplink resource for the first HARQ transmissions and potentially retransmissions to UEs. In an example, RRC may define the periodicity of the semi-persistent uplink grant or the bitmap of the autonomous uplink grant.

In an example, an IE (e.g., ConfiguredGrantConfig) may be used to configure uplink transmission without dynamic grant according to a plurality of possible schemes. In an example, an uplink grant may be configured via RRC (e.g., type1) or provided via the PDCCH (e.g., addressed to CS-RNTI) (e.g., type2).

In an example, a configuration parameter antennaPort may indicate the antenna port(s) to be used for a configuration. In an example, a configuration parameter cg-DMRS-Configuration indicates the DMRS configuration. In an example, a configuration parameter configuredGrantTimer indicates an initial value of a configured grant timer. In an example, a configuration parameter dmrs-SeqInitialization may be configured if transformPrecoder is disabled. Otherwise the field is absent. In an example, a configuration parameter frequenctDomainAllocation may indicate frequency domain resource allocation. In an example, a intraSlot value of a configuration parameter frequencyHopping enables 'Intra-slot frequency hopping' and a value interSlot enables 'Inter-slot frequency hopping'. If the field is absent, frequency hopping is not configured. In an example, a configuration parameter frequencyHoppingOggset enables intra-slot frequency hopping with the given frequency hopping offset. Frequency hopping offset may be used when frequency hopping is enabled.

In an example, a configuration parameter mcs-Table may indicate the MCS table the UE may use for PUSCH with transform precoding. If the field is absent the UE may apply the value 64QAM. In an example, a configuration parameter mcs-TableTransformPrecoder indicates the MCS table the UE may use for PUSCH with transform precoding. If the field is absent the UE applies the value 64QAM. In an example, the configuration parameter mcsAndTBS may indicate a modulation order, target code rate and TB size. In an example, a configuration parameter p0-PUSCH-Alpha indicates index of the P0-PUSCH-AlphaSet to be used for this configuration. In an example, a configuration parameter Periodicity may indicate a periodicity for UL transmission without UL grant. In an example, a configuration parameter powerControlLoopToUse indicates closed control loop to apply. In an example, a configuration parameter rbg-Size indicates selection between configuration 1 and configuration 2 for RBG size for PUSCH. The UE does not apply this field if resourceAllocation is set to resourceAllocation-Type1. Otherwise, the UE applies the value config1 when the field is absent. In an example, rbg-Size is used when the transformPrecoder parameter is disabled. In an example, a configuration parameter repK-RV may indicate the redundancy version (RV) sequence to use The network may configure this field if repetitions are used, i.e., if repK is set to n2, n4 or n8. Otherwise, the field is absent.

In an example, a configuration parameter repK indicates the number of repetitions of K. In an example, a configuration parameter resourceAllocation indicates configuration of resource allocation type 0 and resource allocation type 1. For Type 1 UL data transmission without grant, "resourceAllocation" may be resourceAllocationType0 or resourceAllocationType1. In an example, a configuration parameter rrc-ConfiguredUplinkGrant may indicate configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.

In an example, a configuration parameter srs-ResourceIndicator indicates the SRS resource to be used. In an example, a configuration parameter timeDomainAllocation indicates a combination of start symbol and length and PUSCH mapping type. In an example, timeDomainOffset indicates offset related to SFN=0. In an example, transformPrecoder enables or disables transform precoding for type1 and type2. If the field is absent, the UE enables or disables transform precoding in accordance with the field msg3-transformPrecoder in RACH-ConfigCommon. In an example, uci-OnPUSCH indicates selection between and configuration of dynamic and semi-static beta-offset. For Type 1 UL data transmission without grant, uci-OnPUSCH should be set to semiStatic.

In an example, a wireless device, by implementing existing technologies, for configured grant on unlicensed cells, select a corresponding HARQ information for a TB and indicate to the base station via UCI multiplexed with the TB. The transmission may be failed in response to a LBT procedure indicating a busy channel. The base station does not know which HARQ process has failed due to the LBT procedure. The base station may transmit a dynamic grant using the same HARQ process. The wireless device may have difficulty in determining whether the TB associated with the HARQ process of the configured grant is to be retransmitted or flushed. Existing technologies may lead to misalignment between the base station and the wireless device. There is a need to improve HARQ process in unlicensed cells. Example embodiments may improve the HARQ process in unlicensed cells. Example embodiments may comprise flushing the HARQ buffer and using a different HARQ process for the transport block, in response to LBT failure for a transmission via a configured grant on an unlicensed cell.

Figure 22:
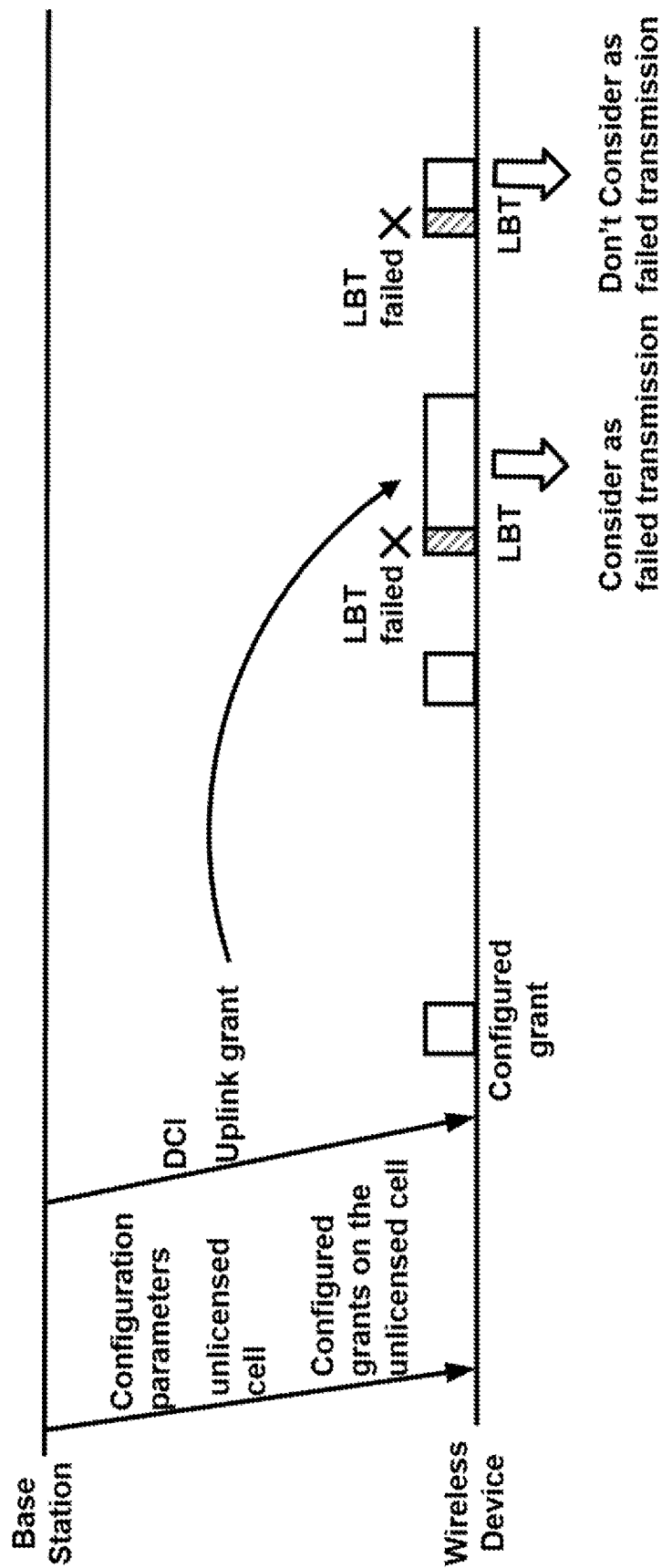
FIG. 22 is an example procedure as per an aspect of an embodiment of the present invention.

In an example embodiment as shown in FIG. 22, a wireless device may receive one or more messages comprising configuration parameters. The one or more messages may comprise one or more radio resource control (RRC) messages. The one or more messages may comprise first configuration parameters of a plurality of cells. In an example, the plurality of cells may comprise a primary cell. In an example, the plurality of cells may comprise a primary cell and one or more secondary cells. In an example, the plurality of cells may comprise one or more licensed cells. In an example, the plurality of cells may comprise one or more unlicensed cells comprising an unlicensed cell. In an example, the first configuration parameters may comprise bandwidth part configuration parameters. The bandwidth part configuration parameters may indicate a plurality of bandwidth parts of the unlicensed cell. In an example, configuration parameters of a bandwidth part of a cell may indicate a numerology corresponding to the bandwidth part. In an example, configuration parameters of a bandwidth part of a cell may indicate frequency domain location and bandwidth of the bandwidth part. In an example, configuration parameters of a bandwidth part of a cell may indicate a numerology and/or frequency domain location and bandwidth and/or subcarrier spacing of the bandwidth part and/or a cyclic prefix (e.g., normal or extended cyclic prefix).

The one or more messages may comprise second configuration parameters of one or more configured grants on the unlicensed cell. The second configuration parameters may be for type 1 configured grants or type 2 configured grants or other types of configured grants. The type 1 configured grants may be activated/available in response to receiving the second configuration parameters. The type 2 configured grants may be activated/available in response to receiving the second configuration parameters and a downlink control information indicating activation of the configured grants. In an example, the second configuration parameters may be for autonomous uplink (AUL) grants. In an example, the AUL grants may be available/activated in response to receiving the second configuration parameters and a DCI indicating activation of the AUL grants.

The second configuration parameters may indicate a plurality of HARQ processes for configured grants. The wireless device may select a HARQ process from the plurality of HARQ process for transmission of one or more transport via resources of a configured grant of the configured grants. The second configuration parameters may indicate (e.g., the second configuration parameters or the second configuration parameters along with an activation DCI) radio resources of the configured grants on the unlicensed cell. The second configuration parameters may indicate one or more power control parameters and/or time domain resource allocation (e.g., periodicity and/or offset (e.g., with respect to a first SFN) and/or a bitmap indicating slots/symbols/subframes of the configured grants) and/or one or more repetition parameters (e.g., a number of repetitions), etc.

The wireless device may receive a downlink control information indicating an uplink grant for a first transmission of a first transport block. In an example, the uplink grant may be for the first transmission of the first transport block via the unlicensed cell. In an example, the uplink grant may be for the first transmission of the first transport block via a second unlicensed cell. The second unlicensed cell may be different from the unlicensed cell.

The uplink grant may comprise transmission parameters of the first transmission of the first transport block. The transmission parameters may indicate radio resources, HARQ parameters (e.g., HARQ_ID, NDI, RV, etc.), power control parameters, etc. In an example, the downlink control information may indicate a bandwidth part of a plurality of bandwidth parts of the unlicensed cell. In an example, the DCI may comprise an identifier of the bandwidth part. In an example, the DCI may indicate bandwidth part switching in response to the identifier of the bandwidth indicated by the DCI being different from an identifier of a current active bandwidth part. The wireless device may create the first transport block based on the uplink grant. The wireless device may create the first transport block employing the parameters indicated by the uplink grant. A HARQ process of the first transport block may be indicated to the wireless device by the downlink control information.

In an example, the configured grants may be available/activated on the unlicensed cell in response to receiving the second configuration parameters. In an example, the configured grants may be available/activated on the unlicensed cell in response to receiving the second configuration parameters and receiving a second DCI indicating activation of the configured grants on the unlicensed cell. The second DCI may be associated with an RNTI corresponding to the configured grants. The second configuration parameters may comprise the RNTI. The second DCI may comprise one or more parameters indicating radio resources of the configured grants.

The wireless device may create a second transport block for a second transmission via a first configured grant of the one or more configured grants. In an example, the wireless device may create the second transport block based on the second configuration parameters of the configured grants. In an example, the wireless device may create the second transport block based on the second configuration parameters and a downlink control information indicating activation of the configured grants. In an example, the second configuration parameters and/or the downlink control information indicating activation of the configured grants may indicate the radio resources for transmission of the second transport block. The second transport block may be associated with a second HARQ processes, wherein the second HARQ process is from a pool of HARQ processes configured by the second configuration parameters. In an example, the wireless device may select the second HARQ process from the pool of HARQ processes or the wireless device may determine the second HARQ process from the pool of HARQ processes based on radio resources of the first configured grant of the one or more configured grants.

The wireless device may perform a first listen-before-talk procedure before transmission of the first transport block. The first listen-before-talk procedure may comprise sensing the channel/bandwidth part that the second transport block is scheduled to be transmitted and comparing an energy level of the channel/bandwidth part with a threshold. The first listen-before talk procedure may indicate a clear channel in response to the energy sensed in the channel/bandwidth part being lower than the threshold. The first listen-before talk procedure may indicate a busy/occupied channel in response to the energy sensed in the channel/bandwidth part being higher than the threshold. In an example, the threshold may be configured for the wireless device. In an example an offset to a pre-configured threshold may be configured by RRC. In an example, one or more parameters of the first LBT procedure (e.g., LBT type, priority class, etc.) may be indicated by the downlink control information scheduling the first transport block.

The wireless device may perform a second listen-before-talk procedure before transmission of the second transport block. The second listen-before-talk procedure may comprise sensing the channel/bandwidth part that the second transport block is to be transmitted and comparing an energy level of the channel/bandwidth part with a threshold. The second listen-before talk procedure may indicate a clear channel in response to the energy sensed in the channel/bandwidth part being lower than the threshold. The second listen-before talk procedure may indicate a busy/occupied channel in response to the energy sensed in the channel/bandwidth part being higher than the threshold. In an example, the threshold may be configured for the wireless device. In an example, an offset to a pre-configured threshold may be configured by RRC. In an example, one or more parameters of the second LBT procedure (e.g., LBT type, priority class, etc.) may be indicated by a downlink control information indicating activation of the configured grants. In an example, the one or more parameters of the second LBT procedure (e.g., LBT type, priority class, etc.) may be configured by RRC.

The first listen-before-talk procedure may indicate an occupied/busy channel. In response to the first listen-before-talk procedure indicating an occupied/busy channel, the wireless device (e.g., a MAC layer of the wireless device) may consider the first transmission as a performed transmission.

The second listen-before-talk procedure may indicate an occupied/busy channel. In response to the second listen-before-talk procedure indicating an occupied/busy channel, the wireless device (e.g., a MAC layer of the wireless device) may not consider the second transmission as a performed transmission.

By implementing examples of FIG. 22, in response to LBT failure(s), the wireless device may treat failed transmission of dynamic grant as has been performed and treat failed transmission of configured grant as not has been performed. Example embodiment may reduce data loss for configured grant due to LBT failure.

Figure 25:
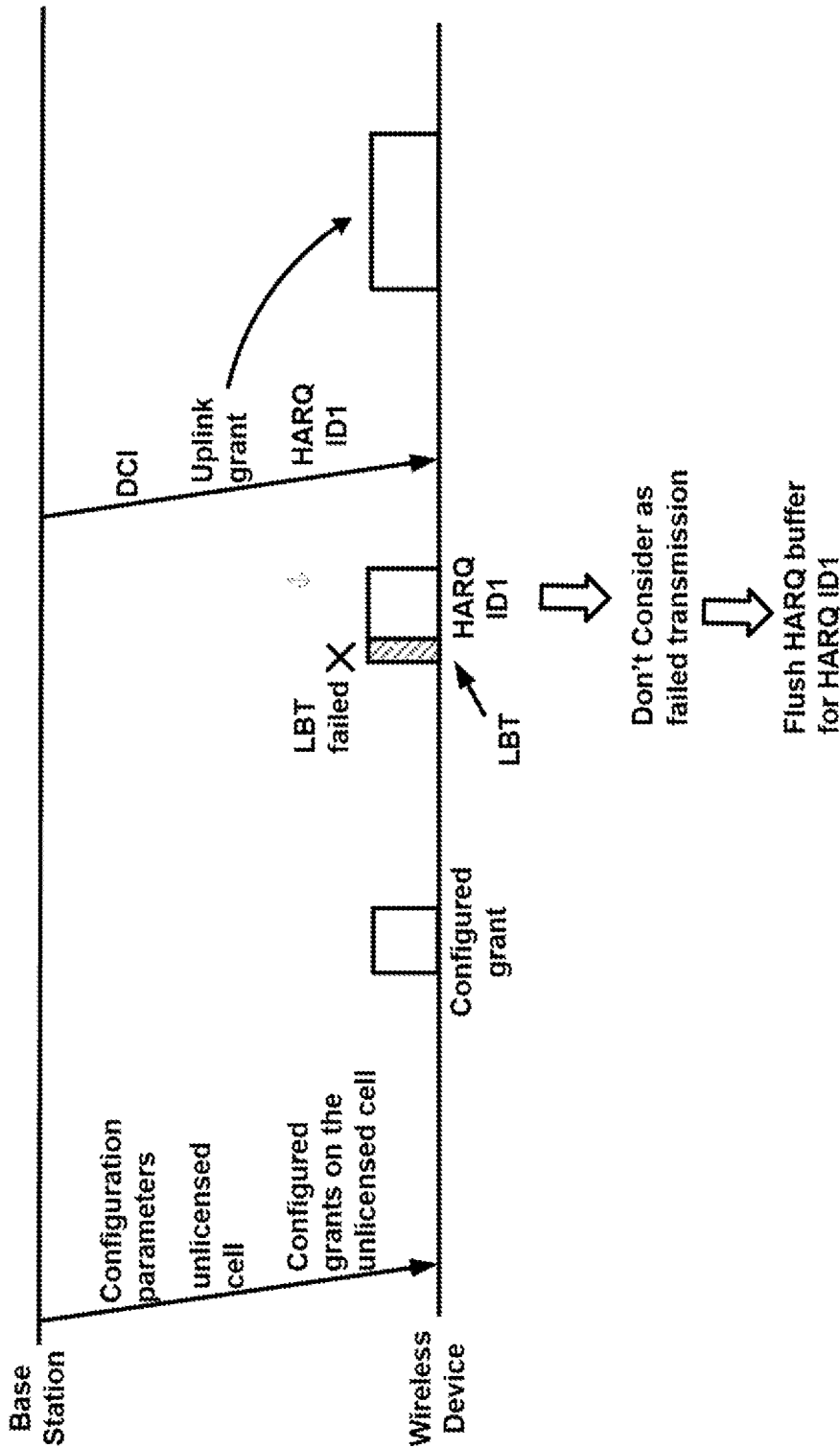
FIG. 25 is an example procedure as per an aspect of an embodiment of the present invention.

In an example as shown in FIG. 25, the wireless device may receive a second downlink control information comprising an uplink grant indicating transmission of a third transport block corresponding to the second HARQ process wherein the second transport block is associated with the second HARQ process. The parameters of the uplink grant in the second downlink control information may be different from the parameters of the first configured grant of the one or more configured grants wherein the second transport block is created based on the first configured grant.

In an example, the wireless device may transmit a third transport block via a second configured grant of the one or more configured grants. The third transport block may correspond to the second HARQ process wherein the second transport block is associated with the second HARQ process.

In an example, the wireless device may retransmit the second transport block, via a second configured grant of the one or more configured grants.

Figure 23:
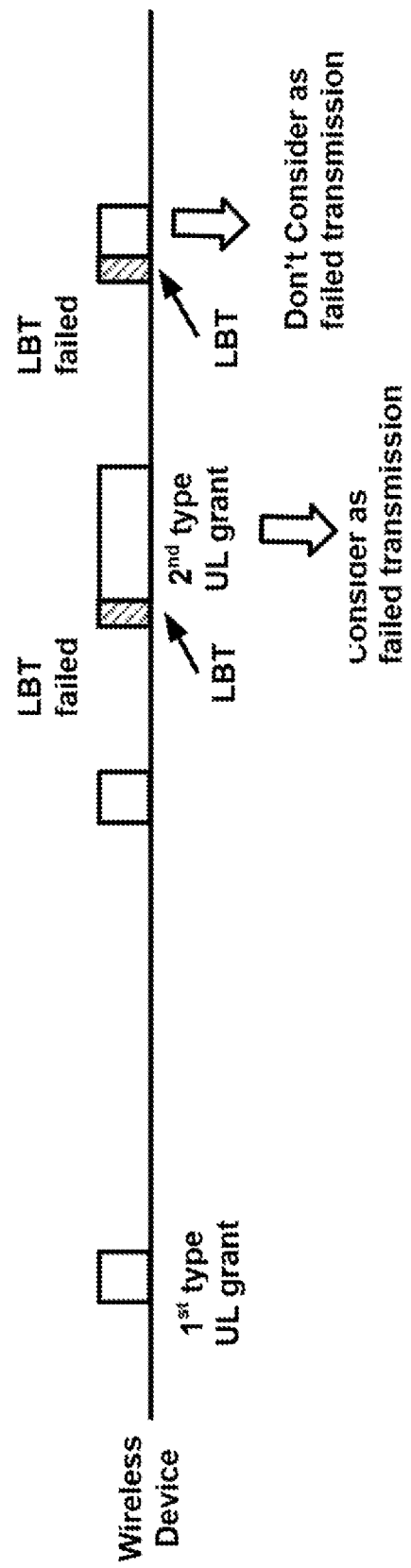
FIG. 23 is an example procedure as per an aspect of an embodiment of the present invention.

In an example embodiment as shown in FIG. 23, a wireless device may be configured (e.g., via RRC, via physical/MAC layer signaling and/or via a combination of RRC and physical/MAC layer signaling) with a plurality of grants. The plurality of grants may be of a plurality of grant types. In an example, the plurality of grant types may comprise dynamic grants and/or configured grants and/or grants for different radio resource types (e.g., licensed vs unlicensed, different numerology types, etc.). In an example, the plurality of grants may be for a plurality of cells. In an example, a first plurality of the plurality of grants may be for a first cell and a second plurality of cells may be for a second cell. In an example, the first cell and the cell may be unlicensed cell.

The wireless device may create a first transport block based on a first grant of the plurality of grants. The first grant may be of a first type. The wireless device may create the first transport block based on transmission parameters (e.g., radio resources, HARQ parameters, power control related parameters, etc.) of the first grant. The transmission parameters may be indicated to the wireless device based on physical layer signaling and/or RRC.

The wireless device may create a second transport block based on a second grant of the plurality of grants. The second grant may be of a second type. The wireless device may create the second transport block based on transmission parameters (e.g., radio resources, HARQ parameters, power control related parameters, etc.) of the second grant. The transmission parameters may be indicated to the wireless device based on physical layer signaling and/or RRC.

The wireless device may perform a first listen-before-talk procedure before transmission of the first transport block. The first listen-before-talk procedure may comprise sensing the channel/bandwidth part that the second transport block is scheduled to be transmitted and comparing an energy level of the channel/bandwidth part with a threshold. The first listen-before talk procedure may indicate a clear channel in response to the energy sensed in the channel/bandwidth part being lower than the threshold. The first listen-before talk procedure may indicate a busy/occupied channel in response to the energy sensed in the channel/bandwidth part being higher than the threshold. In an example, the threshold may be configured for the wireless device. In an example an offset to a pre-configured threshold may be configured by RRC. In an example, one or more parameters of the first LBT procedure (e.g., LBT type, priority class, etc.) may be indicated by the downlink control information scheduling the first transport block.

The wireless device may perform a second listen-before-talk procedure before transmission of the second transport block. The second listen-before-talk procedure may comprise sensing the channel/bandwidth part that the second transport block is to be transmitted and comparing an energy level of the channel/bandwidth part with a threshold. The second listen-before talk procedure may indicate a clear channel in response to the energy sensed in the channel/ bandwidth part being lower than the threshold. The second listen-before talk procedure may indicate a busy/occupied channel in response to the energy sensed in the channel/bandwidth part being higher than the threshold. In an example, the threshold may be configured for the wireless device. In an example, an offset to a pre-configured threshold may be configured by RRC. In an example, one or more parameters of the second LBT procedure (e.g., LBT type, priority class, etc.) may be indicated by a downlink control information indicating activation of the configured grants. In an example, the one or more parameters of the second LBT procedure (e.g., LBT type, priority class, etc.) may be configured by RRC.

The first listen-before-talk procedure may indicate an occupied/busy channel. In response to the first listen-before-talk procedure indicating an occupied/busy channel, the wireless device (e.g., a MAC layer of the wireless device) may consider the first transmission as a performed transmission.

The second listen-before-talk procedure may indicate an occupied/busy channel. In response to the second listen-before-talk procedure indicating an occupied/busy channel, the wireless device (e.g., a MAC layer of the wireless device) may not consider the second transmission as a performed transmission.

Figure 24:
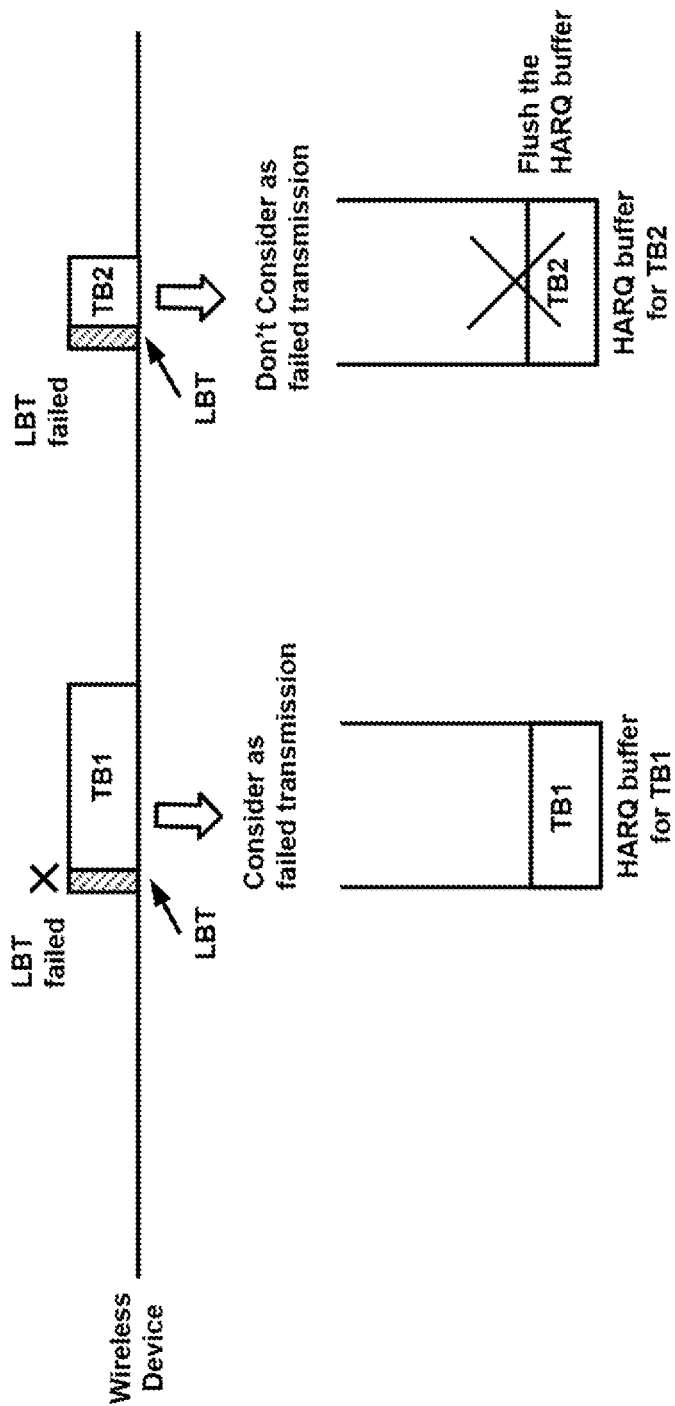
FIG. 24 is an example procedure as per an aspect of an embodiment of the present invention.

In an example as shown in FIG. 24, the considering the first transmission as a performed transmission may comprise storing/maintaining the first transport block in a HARQ buffer associated with the first transport block. In an example, the considering the first transmission as a performed transmission may comprise considering a first HARQ process corresponding to the first transport block as a pending HARQ process (e.g., to be acknowledged). In an example, the considering the first transmission as a performed transmission may comprise storing/maintaining the first transport block in a HARQ buffer associated with the first transport block and retransmitting the first transport block based on receiving a DCI scheduling retransmission of the first transport block. In an example, the considering the first transmission as a performed transmission may comprise retransmitting the first transport block based on a configured grant. In an example, the first transport block may be associated with a first HARQ process and the HARQ buffer may be associated with the first HARQ process. In an example, the wireless device may receive a second downlink control information indicating retransmission of the first transport block.

In an example as shown in FIG. 24, not considering the second transmission as a performed transmission may comprise flushing a HARQ buffer associated with the second transport block. The flushing the HARQ buffer associated with the second transport block may comprising considering the second transport block as a lost transport block. In an example, not considering the second transmission as a performed transmission may comprise considering a second HARQ process corresponding to the second transport block as an available HARQ process (e.g., not pending) with an empty corresponding HARQ buffer. In an example, the second transport block may be associated with a second HARQ process and the HARQ buffer may be associated with the second HARQ process. In an example, not considering the second transmission as a performed transmission may comprise receiving a DCI indicating a new transmission (e.g., with toggled NDI) corresponding to the second HARQ process.

In an example, in response to not considering the second transport block as a performed transmission and/or flushing the HARQ buffer associated with the second transport block, the wireless device may trigger one or more MAC CEs. The one or more MAC CEs may comprise buffer status report and/or power headroom report and/or other MAC CEs. The wireless device may have canceled one or more triggers of the one or more MAC CEs in response to the creating the second transport block and/or in response to the second transport block comprising the one or more MAC CEs.

In an example embodiment, a wireless device may receive from a base station, one or more messages comprising first configuration parameters of a plurality of cells comprising an unlicensed cell; and second configuration parameters of one or more configured grants on the unlicensed cell. The wireless device may receive a downlink control information indicating an uplink grant for a first transmission of a first transport block via the unlicensed cell. The wireless device may create the first transport block based on the uplink grant. The wireless device may create a second transport block for a second transmission via a first configured grant of the one or more configured grant. In response to a first listen-before talk for the first transmission of the first transport block indicating an occupied channel, the wireless device may consider the first transmission as a performed transmission. In response to a second listen-before talk for the second transmission of the second transport block indicating an occupied channel, not considering the second transmission as a performed transmission.

In an example, the wireless device may further receive a second downlink control information indicating activation of the one or more configured grants on the unlicensed cell. In an example, the wireless device may further consider the first transmission as a performed transmission comprising storing/maintaining the first transport block in a HARQ buffer associated with the first transport block. In an example, the first transport block is associated with a first HARQ process. The HARQ buffer is associated with the first HARQ process. In an example, not considering the second transmission as a performed transmission may comprise flushing the second transport block in a HARQ buffer associated with the second transport block. In an example, the second transport block is associated with a second HARQ process. The HARQ buffer may be associated with the second HARQ process. In an example, the wireless device may further receive a second downlink control information indicating transmission of a third transport block corresponding to a second HARQ process wherein the second transport block is associated with the second HARQ process. In an example, the wireless device may further transmit, via a second configured grant of the one or more configured grants, a third transport block corresponding to a second HARQ process wherein the second transport block is associated with the second HARQ process. In an example, the wireless device may further retransmit, via a second configured grant of the one or more configured grants, the second transport block. In an example, the wireless device may receive a second downlink control information indicating retransmission of the first transport block.

In an example embodiment, a wireless device may receive from a base station, one or more messages comprising first configuration parameters of a plurality of cells comprising a first unlicensed cell and a second unlicensed cell and second configuration parameters of one or more configured grants on the second unlicensed cell. The wireless device may receive a downlink control information indicating an uplink grant for a first transmission of a first transport block via the first unlicensed cell. The wireless device may create the first transport block based on the uplink grant. The wireless device may create a second transport block for a second transmission via a first configured grant of the one or more configured grant. In response to a first listen-before talk for the first transmission of the first transport block indicating an occupied channel, considering the first transmission as a performed transmission. In response to a second listen-before talk for the second transmission of the second transport block indicating an occupied channel, not considering the second transmission as a performed transmission.

In an example embodiment, a wireless device may create a first transport block based on a first uplink grant, wherein the first uplink grant is of a first type. The wireless device may create a second transport block based on a second uplink grant, wherein the second uplink grant is of a second type. In response to a first listen-before talk for a first transmission of the first transport block indicating an occupied channel and the first uplink grant being of the first type, the wireless device may consider the first transmission as a performed transmission. In response to a second listen-before talk for a second transmission of the second transport block indicating an occupied channel and the second uplink grant being of the second type, not considering the second transmission as a performed transmission. In an example, the first type may comprise a dynamic grant. In an example, the second type may comprise a configured grant. In an example, the first uplink grant is for an unlicensed cell. In an example, the first uplink grant is for an unlicensed cell and the second uplink grant is for the unlicensed cell.

In New Radio (NR) Release 15 the basic support for URLLC was introduced with TTI structures for low latency as well as methods for improved reliability. Tighter URLLC requirements require enhancing the Release 15 features. Example use cases for improved URLLC use cases include AR/VR (Entertainment industry), Factory automation, Transport Industry, including the remote driving use case, Electrical Power Distribution, etc. Example tighter URLLC requirements include higher reliability (up to 1E-6 level), higher availability, short latency in the order of 0.5 to 1 ms, depending on the use cases (factory automation, transport industry and Electrical power distribution). Example features that require enhancement for enhanced URLLC include PDCCH enhancements (e.g., Compact DCI, PDCCH repetition, increased PDCCH monitoring capability), UCI enhancements (Enhanced HARQ feedback methods (increased number of HARQ transmission possibilities within a slot), CSI feedback enhancements, PUSCH enhancements (e.g., mini-slot level hopping & retransmission/repetition enhancements), scheduling/HARQ/CSI processing timeline (wireless device and base station), enhanced multiplexing considering different latency and reliability requirements (e.g., UL inter UE Tx prioritization/multiplexing), enhanced UL configured grant (grant free) transmissions, with study focusing on improved configured grant operation (e.g., explicit HARQ-ACK, ensuring K repetitions and mini-slot repetitions within a slot), etc.

Figure 26:
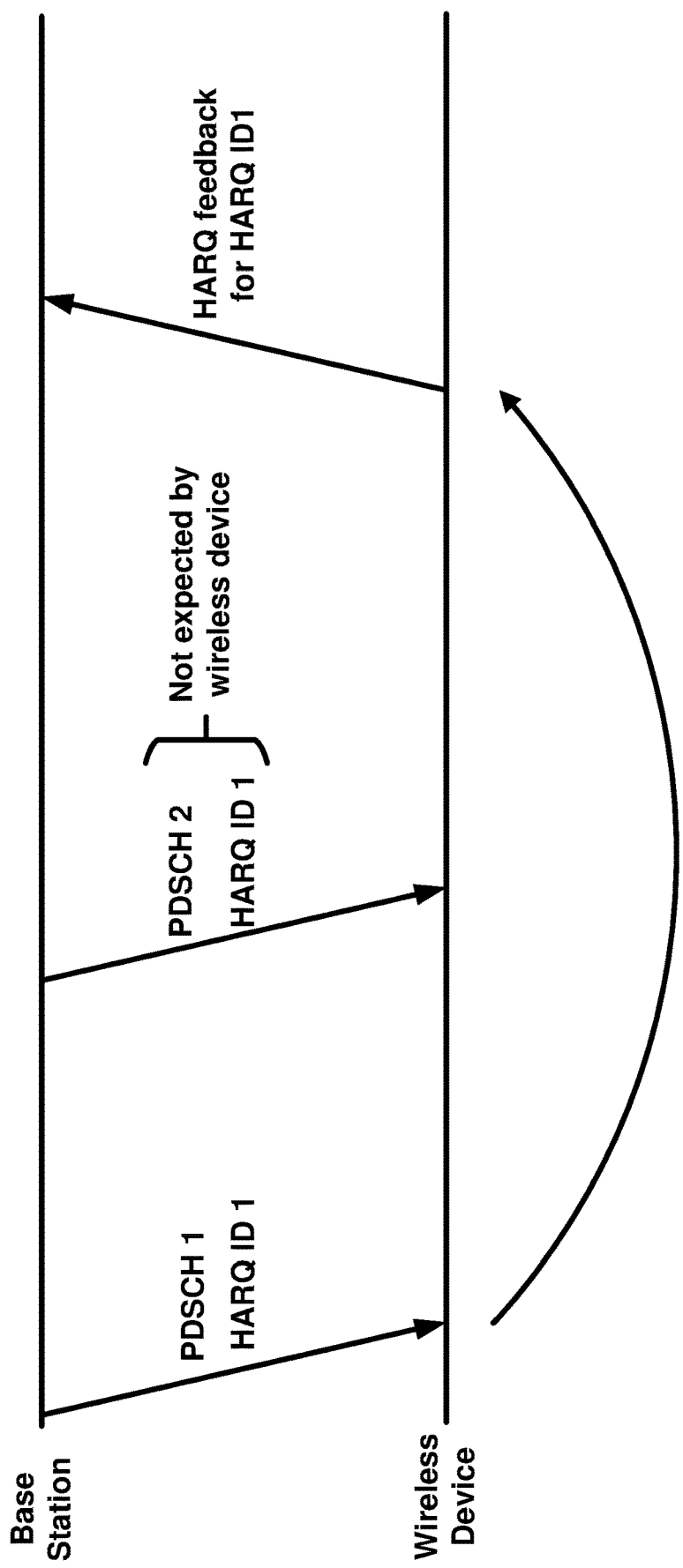
FIG. 26 is an example legacy scheduling timeline as per an aspect of an embodiment of the present disclosure.

In an example as shown in FIG. 26, in legacy processes, for a HARQ process, a wireless device is not expected to receive a scheduled unicast PDSCH transmission with the same HARQ process ID until a time after the end of the expected transmission of the HARQ-feedback for an earlier transmission on the same HARQ process ID. In an example, for the same DL HARQ process ID, the wireless device is not expected to receive a new scheduling before the HARQ-ACK for the current PDSCH has been sent, e.g., the network is not allowed to use the HARQ timing shown in FIG. 26. In an example, the wireless device is not expected to receive another PDSCH for a given HARQ process until after the end of the expected transmission of HARQ feedback for that HARQ process. The downlink resource efficiency may be low if the wireless device is not allowed to receive a new scheduled unicast PDSCH transmission with the same HARQ process ID before the HARQ-ACK for an earlier transmission on the same HARQ process ID. For URLLC service type, the above HARQ timeline leads to inefficient downlink efficiency as the URLLC traffic need to be scheduled quickly to meet the low latency budget. The legacy processes lead to inefficiency of downlink scheduling specially for URLLC traffic. In an example, to enhance the downlink efficiency, legacy processes may be enhanced so that for a HARQ process ID, the wireless device may receive a scheduled unicast PDSCH transmission with the same HARQ process ID before the HARQ-ACK for an earlier transmission on the same HARQ process ID.

Figure 27:
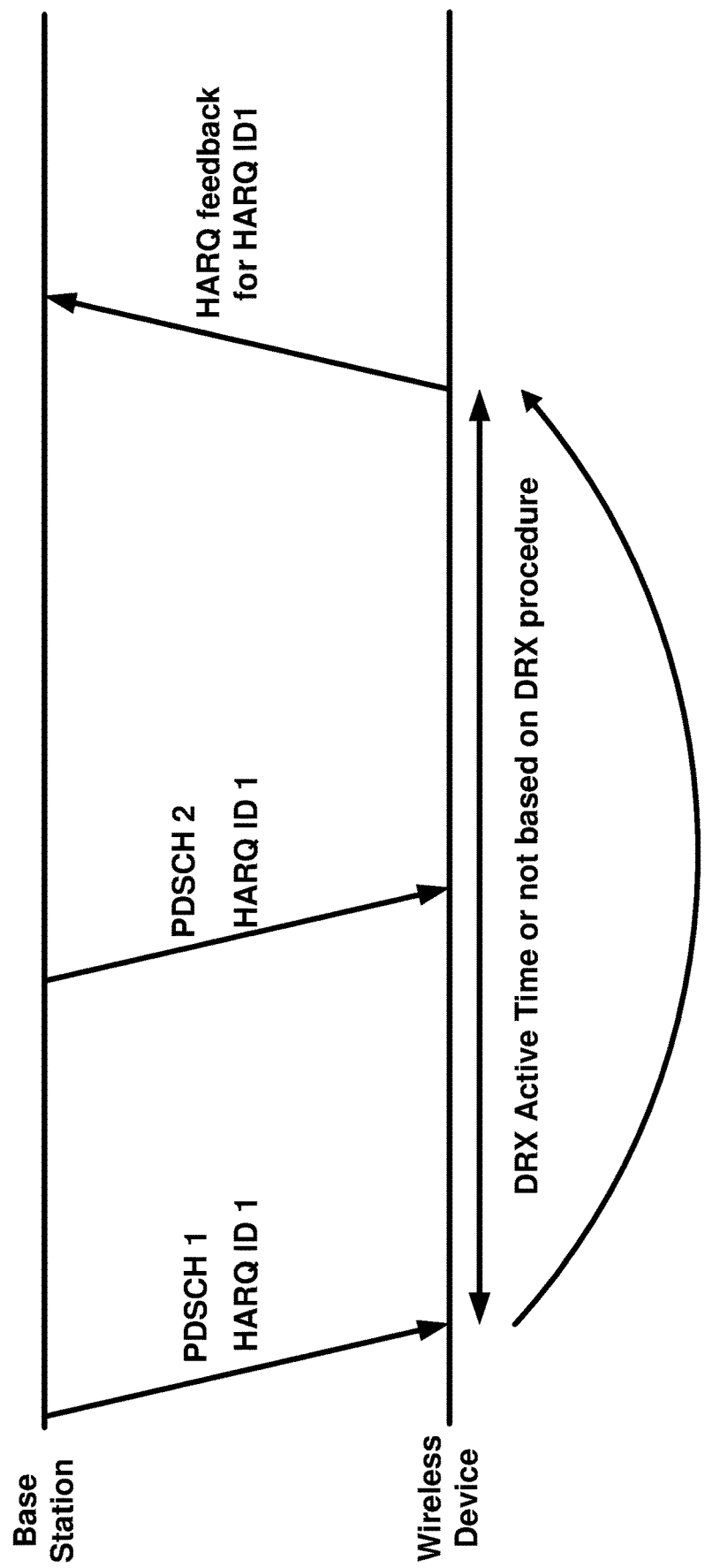
FIG. 27 is an example scheduling timeline as per an aspect of an embodiment of the present disclosure.

In an example as shown in FIG. 27, the reception of PDSCH 2 and/or a DCI scheduling the PDSCH2 with a same HARQ process as PDSCH 1 may be based on whether the wireless device is in DRX Active time or not. Based on the legacy DRX procedures, the wireless device may not be in a DRX Active time for reception of a DCI scheduling PDSCH 2. There is a need to enhance the legacy processes for control channel monitoring. Example embodiments enhance the legacy processes and enhance the downlink scheduling performance.

Figure 28:
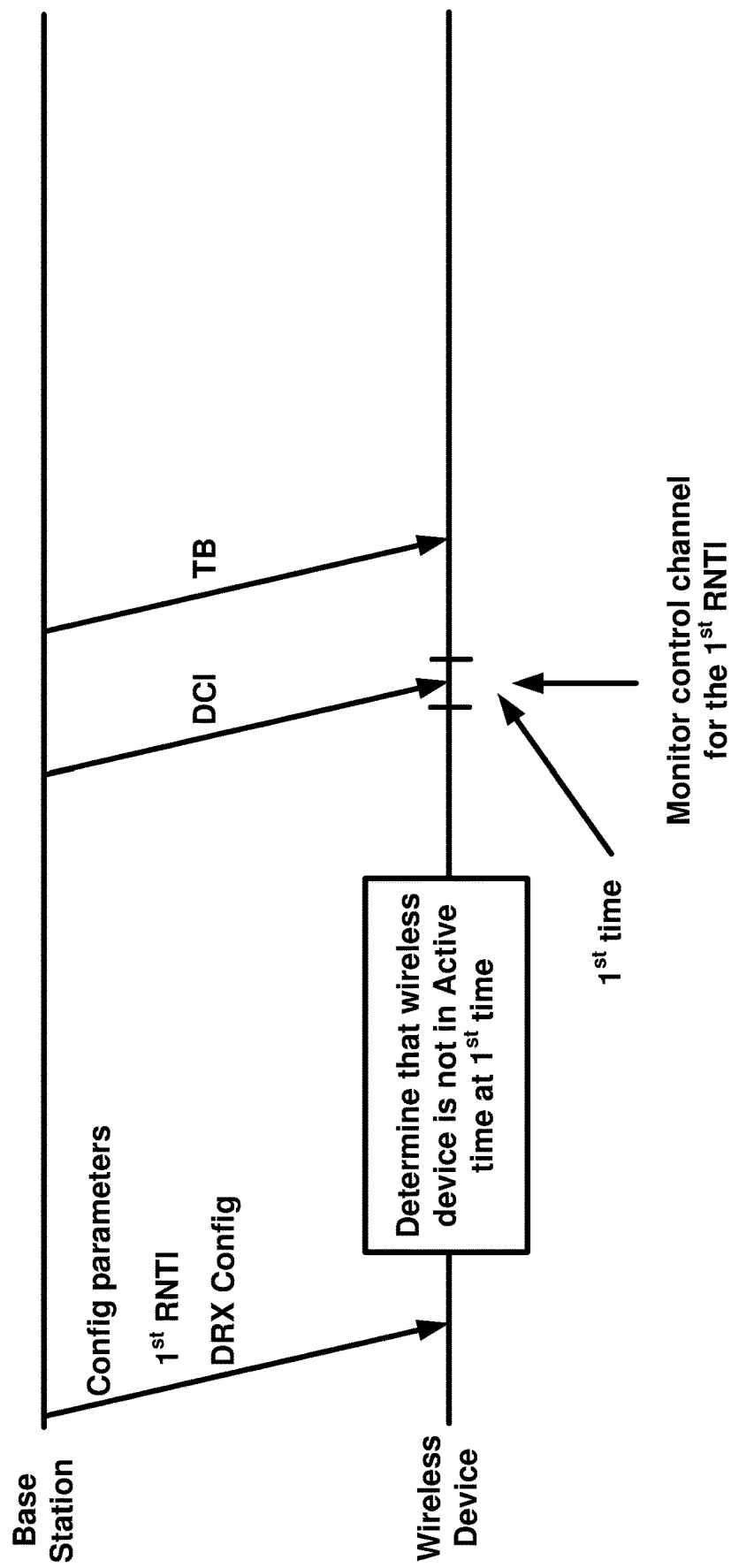
FIG. 28 is an example procedure as per an aspect of an embodiment of the present disclosure.

In an example embodiment as shown in FIG. 28, a wireless device may receive from a base station one or more messages comprising configuration parameters. The one or more messages may comprise configuration parameters of one or more cells. In an example, the one or more cells may comprise a primary cell. In an example, the one or more cells may comprise a primary cell and one or more secondary cells. In an example, the configuration parameters of the one or more cells may comprise physical uplink control channel configuration parameters of one or more first cells of the one or more cells. In an example, the one or more first cells may comprise the primary cell. In an example, the one or more first cells may comprise the primary cell and one or more secondary cells. The physical uplink control channel configuration parameters may indicate radio resources for transmission of uplink control information. The uplink control information may comprise HARQ feedback.

In an example, the configuration parameters may comprise discontinuous reception (DRX) configuration parameters. The DRX configuration parameters may comprise a drx-HARQ-RTT-TimerDL. In an example, a value of the drx-HARQ-RTT-TimerDL may be in number of symbols of the BWP where the transport block was received. The DRX configuration parameters may comprise a drx-HARQ-RTT-TimerUL. In an example, a value of the drx-HARQ-RTT-TimerUL may be in number of symbols of the BWP where the transport block was transmitted. The DRX configuration parameters may comprise a drx-InactivityTimer. In an example, a value of the drx-InactivityTimer may be in multiple integers of 1 ms. ms0 corresponds to 0, ms1 corresponds to 1 ms, ms2 corresponds to 2 ms, and so on. The DRX configuration parameters may comprise a drx-LongCycleStartOffset. In an example, drx-LongCycle may be in ms and drx-StartOffset may be in multiples of 1 ms. If drx-ShortCycle is configured, the value of drx-LongCycle may be a multiple of the drx-ShortCycle value. The DRX configuration parameters may comprise a drx-onDurationTimer. In an example, a value of the drx-onDurationTimer may be in multiples of 1/32 ms (subMilliSeconds) or in ms (milliSecond). For the latter, ms1 may correspond to 1 ms, ms2 corresponds to 2 ms, and so on. The DRX configuration parameters may comprise a drx-RetransmisisonTimerDL. In an example, a value of the drx-RetransmissionTimerDL may be in number of slot lengths of the BWP where the transport block was received. In an example, sl0 may correspond to 0 slots, sl1 may correspond to 1 slot, sl2 correspond to 2 slots, and so on. The DRX configuration parameters may comprise a drx-RetransmissionTimerUL. In an example, a value of the drx-RetransmissionTimerUL value may be in number of slot lengths of the BWP where the transport block was transmitted. sl0 corresponds to 0 slots, sl1 corresponds to 1 slot, sl2 corresponds to 2 slots, and so on. The DRX configuration parameters may comprise a drx-ShortCycleTimer. In an example, a value of the drx-ShortCycleTimer may be in multiples of drx-ShortCycle. A value of 1 corresponds to drx-ShortCycle, a value of 2 corresponds to 2*drx-ShortCycle and so on. The DRX configuration parameters may comprise drx-ShortCycle. In an example, a value of the drx-ShortCycle may be in ms. In an example, ms1 corresponds to 1 ms, ms2 corresponds to 2 ms, and so on. The DRX configuration parameters may comprise drx-SlotOffset. A value of the drx-SlotOffset may be 1/32 ms. Value 0 may correspond to 0 ms, value 1 may correspond to 1/32 ms, value 2 may correspond to 2/32 ms, and so on.

In an example, the configuration parameters may comprise one or more radio network temporary identifiers (RNTIs). The one or more RNTIs may comprise a first RNTI and a second RNTI. The first RNTI may correspond to a first service type. The first service type may comprise ultra-reliable low-latency communications (URLLC) service type. In an example, the base station may employ the first RNTI for scheduling downlink and/or uplink resources for reception and transmission of data of the first service type. In an example, the first RNTI may be employed for coding (e.g., scrambling CRC) of the downlink control information scheduling downlink and/or uplink resources for reception and transmission of data of the first service type. In an example, the second RNTI may be employed by the base station for scheduling downlink and/or uplink resources for reception and transmission of data that is not of the first service type (e.g., eMBB, etc.). In an example, the second RNTI may be employed by the base station for scheduling downlink and/or uplink resources for reception and transmission of data that is or is not of the first service type (e.g., independent of service type, both URLLC and eMBB, etc.).

The wireless device may, based on the DRX configuration parameters and DRX procedures, determine that the wireless device is not in a DRX Active Time at a first time. The first time may be a first symbol/slot/subframe/time duration/period/unit of time for control channel monitoring. In an example, the wireless device may determine that the wireless device is not in Active Time in response to one or more conditions. The one or more conditions may comprise one or more timers (e.g., DRX inactivity timer, DRX retransmission timer, DRX On Duration timer, random access contention resolution timer, etc.) not being running and/or a scheduling request not being pending after transmission on PUCCH and/or a PDCCH indicating a new transmission addressed to the C-RNTI of the MAC entity not being received after successful reception of a Random Access Response for the Random Access Preamble not selected by the MAC entity among the contention-based Random Access Preamble. In an example, the one or more timer may be one or more DRX timers. The DRX configuration parameters may comprise one or more parameters of the one or more DRX timers.

In an example, the first time may be a monitoring occasion. In an example, the first time may be a monitoring occasion among a plurality of monitoring occasions. The wireless device may monitor a control channel in a monitoring occasion (e.g., subject to being in a DRX Active time if DRX is configured). In an example, a monitoring occasion may be a PDCCH occasion. A PDCCH occasion may be a time duration (e.g., one or a consecutive number of symbols) during which the MAC entity may be configured to monitor the PDCCH. In an example, wireless device may determine that the first time is a monitoring occasion based on the configuration parameters. In an example, wireless device may determine that the first time is a monitoring occasion based on a duration configuration parameter and/or a monitoringSlotPeriodicityAndOffset configuration parameter and/or a monitoringSymbolsWithinSlot configuration parameter.

The duration configuration parameter may indicate a number of consecutive slots that a SearchSpace lasts in an occasion, e.g., upon every period as given in a periodicityAndOffset parameter. If the field is absent, the UE may apply the value 1 slot, except for DCI format 2_0. The UE may ignore this field for DCI format 2_0. The maximum valid duration may be periodicity−1 (periodicity as given in the monitoringSlotPeriodicityAndOffset parameter).

The monitoringSlotPeriodicityAndOffset configuration parameter may indicate slots for PDCCH Monitoring configured as periodicity and offset. If UE is configured to monitor DCI format 2_1, the values 'sl1', 'sl2' or 'sl4' may be applicable. If UE is configured to monitor DCI format 2_0, the values 'sl1', 'sl2', 'sl4', 'sl5', 'sl8', 'sl10', 'sl16', and 'sl20' are applicable.

The monitoringSymbolsWithinSlot configuration parameter may indicate the first symbol(s) for PDCCH monitoring in the slots configured for PDCCH monitoring. The most significant (left) bit may represent the first OFDM in a slot, and the second most significant (left) bit may represent the second OFDM symbol in a slot and so on. The bit(s) set to one may identify the first OFDM symbol(s) of the control resource set within a slot. If the cyclic prefix of the BWP is set to extended CP, the last two bits within the bit string shall be ignored by the UE. For DCI format 2_0, the first one symbol may apply if the duration of CORESET (in an IE ControlResourceSet) identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

Figure 30:
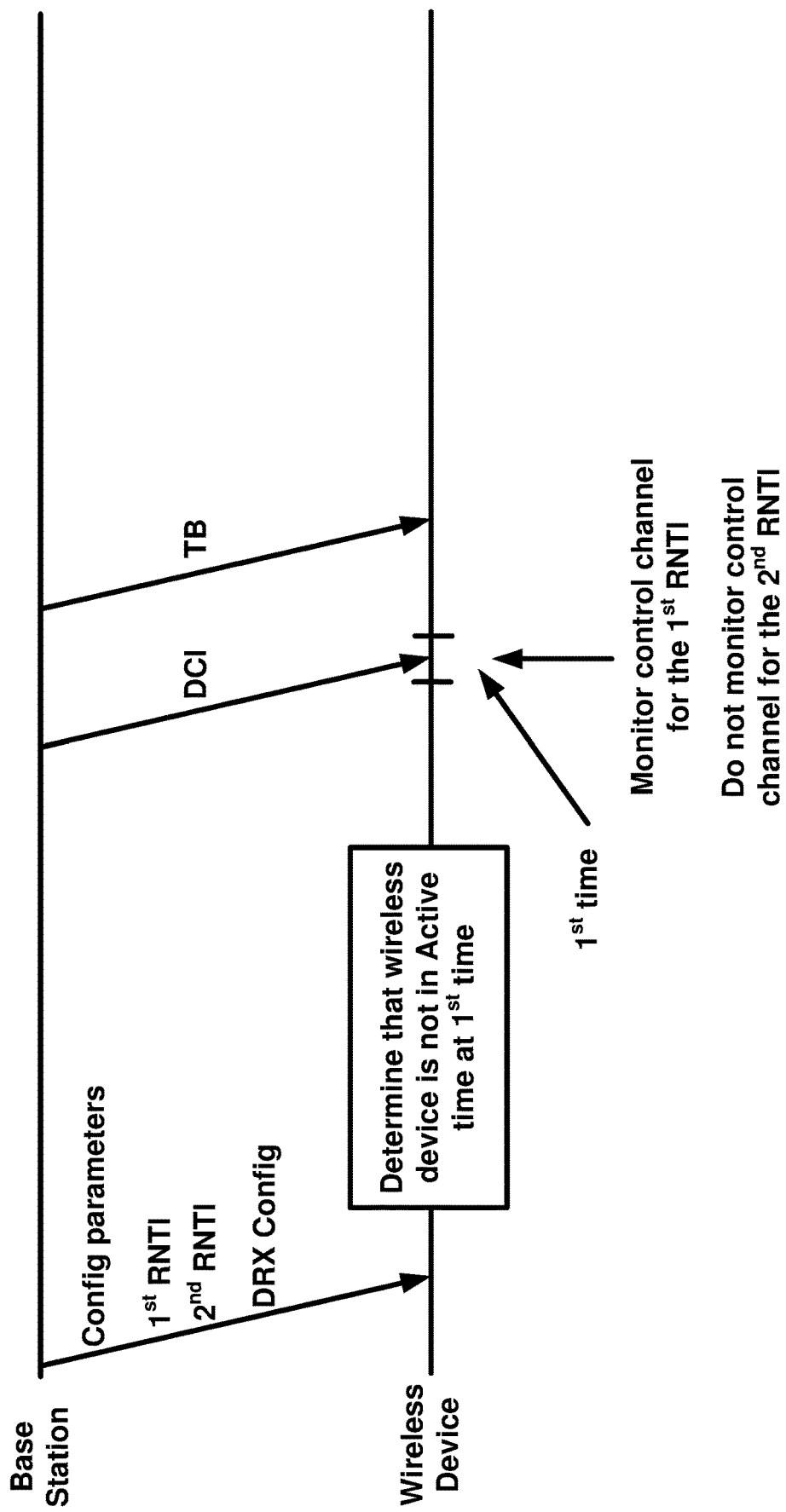
FIG. 30 is an example procedure as per an aspect of an embodiment of the present disclosure.

The wireless device may, based on the determining, monitor a control channel for the first RNTI at the first time. In an example, the monitoring the control channel may comprise blind detection of a set of PDCCH candidates in one or more CORESETs on the active DL BWP on each activated serving cell configured with PDCCH monitoring according to corresponding search space sets where monitoring implies decoding a PDCCH candidate according to the monitored DCI formats. In an example as shown in FIG. 30, the wireless device, based on the monitoring, may not monitor the downlink control channel for the second RNTI, different from the first RNTI, at the first time.

The wireless device may, based on the monitoring, receive a first downlink control information indicating first parameters of a first transport block. In an example, the first downlink control information may be a wireless device specific downlink control information. The wireless device may receive a wireless device specific downlink control information in a wireless device specific search space. In an example, the first downlink control information may be a group common downlink control information. The wireless device may receive a group common downlink control information in a group common specific search space.

The wireless device may receive the first transport block based on the parameters. The first parameters may comprise radio resources for reception of the first transport block. In an example, the first parameters of the first transport block may comprise a first HARQ process identifier identifying/associated with the first transport block. The first HARQ process may be a downlink HARQ process of the cell wherein the first transport block is received.

In an example, the wireless device may receive a second transport block identified by/associated with the first HARQ process. The first transport block may be identified by the first HARQ process. A HARQ process identifying/associated with the first transport block may be a same HARQ process identifying/associated with as the second transport block. The wireless device may receive a second downlink control information comprising second parameters for reception of the second transport block. The second parameters may indicate radio resources for reception of the second transport block. The second parameters may comprise an identifier of the first HARQ process. The second downlink control information may comprise a field indicating a value. A second time for transmission of HARQ feedback of the second transport block may be based on the value. In an example, a second time for transmission of HARQ feedback of the second transport block may be based on the configuration parameters. In an example, a second time for transmission of HARQ feedback of the second transport block may be based on the value and the configuration parameters. In an example, the second time may be before the first time (e.g., reception time of the first transport block). In an example, the first time may be within a duration that starts at the reception time of the second transport block and ends at the second time (e.g., a time for transmission of HARQ feedback of the second packet).

In an example embodiment, a wireless device may receive configuration parameters of one or more cells, the configuration parameters comprising: a first radio network temporary identifier (RNTI) corresponding to a first service type; and one or more discontinuous reception (DRX) configuration parameters. The wireless device may determine, based on the one or more DRX configuration parameters, that the wireless device is not in a DRX Active Time at a first time. The wireless device may monitor, based on the determining, a control channel for the first RNTI at the first time. The wireless device may receive, based on the monitoring, a first downlink control information indicating first parameters of a first transport block. The wireless device may receive the first transport block based on the first parameters.

In an example embodiment, a wireless device may receive configuration parameters of one or more cells, the configuration parameters comprising: a first radio network temporary identifier (RNTI) corresponding to a first service type; and one or more discontinuous reception (DRX) configuration parameters. The wireless device may receive, a first downlink control information indicating first parameters of a first transport block during a period of time wherein: the wireless device is not in a DRX Active Time; and the DCI corresponds to the first RNTI.

Figure 29:
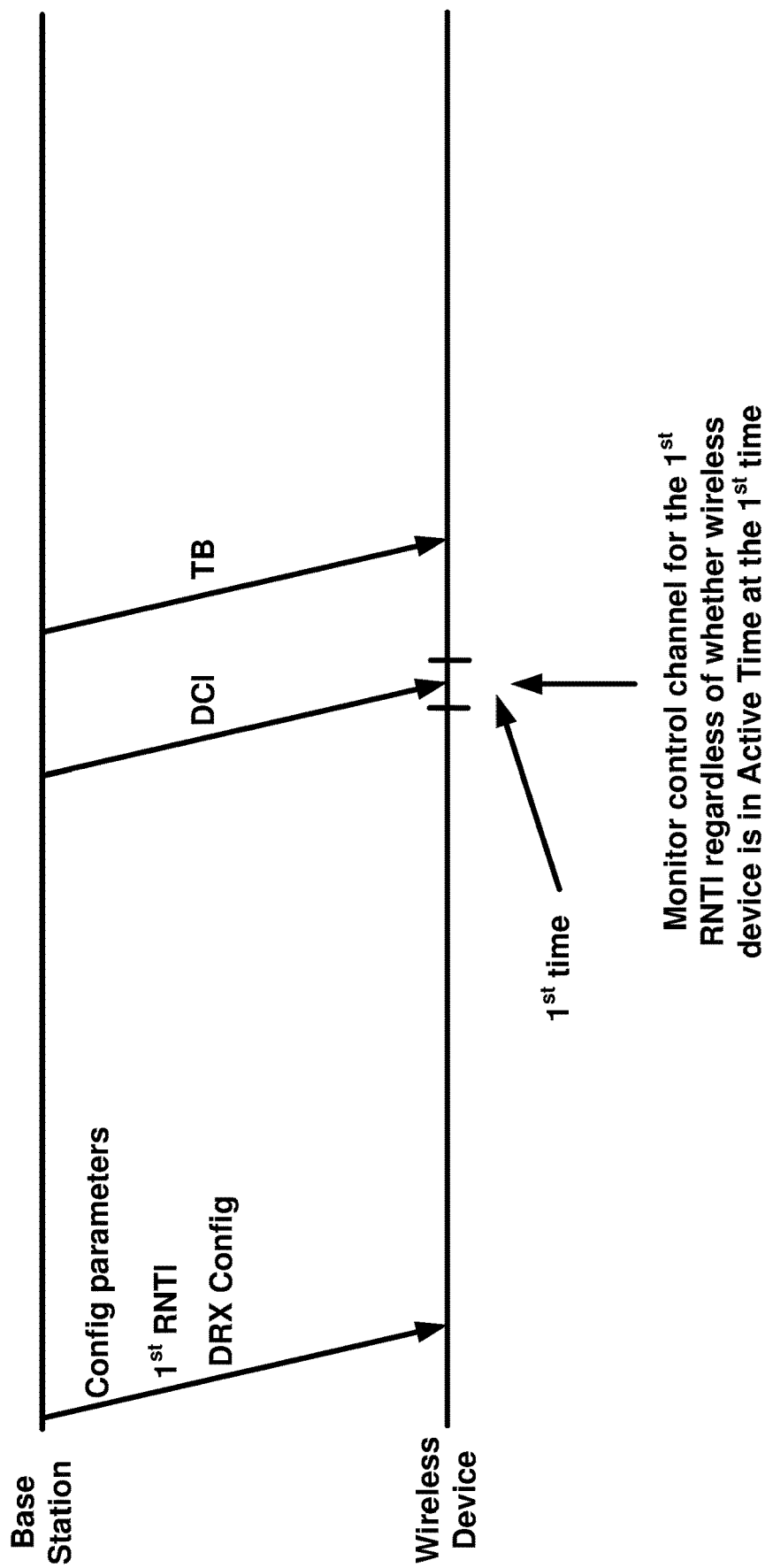
FIG. 29 is an example procedure as per an aspect of an embodiment of the present disclosure.

In an example embodiment as shown in FIG. 29, a wireless device may receive configuration parameters of one or more cells, the configuration parameters comprising: a first radio network temporary identifier (RNTI) corresponding to a first service type; and one or more discontinuous reception (DRX) configuration parameters. The wireless device may monitor, a control channel for the first RNTI at a first time regardless of whether the wireless device is in an DRX Active Time at the first time. The wireless device may receive, based on the monitoring, a first downlink control information indicating first parameters of a first transport block. The wireless device may receive the first transport block based on the parameters.

Figure 31:
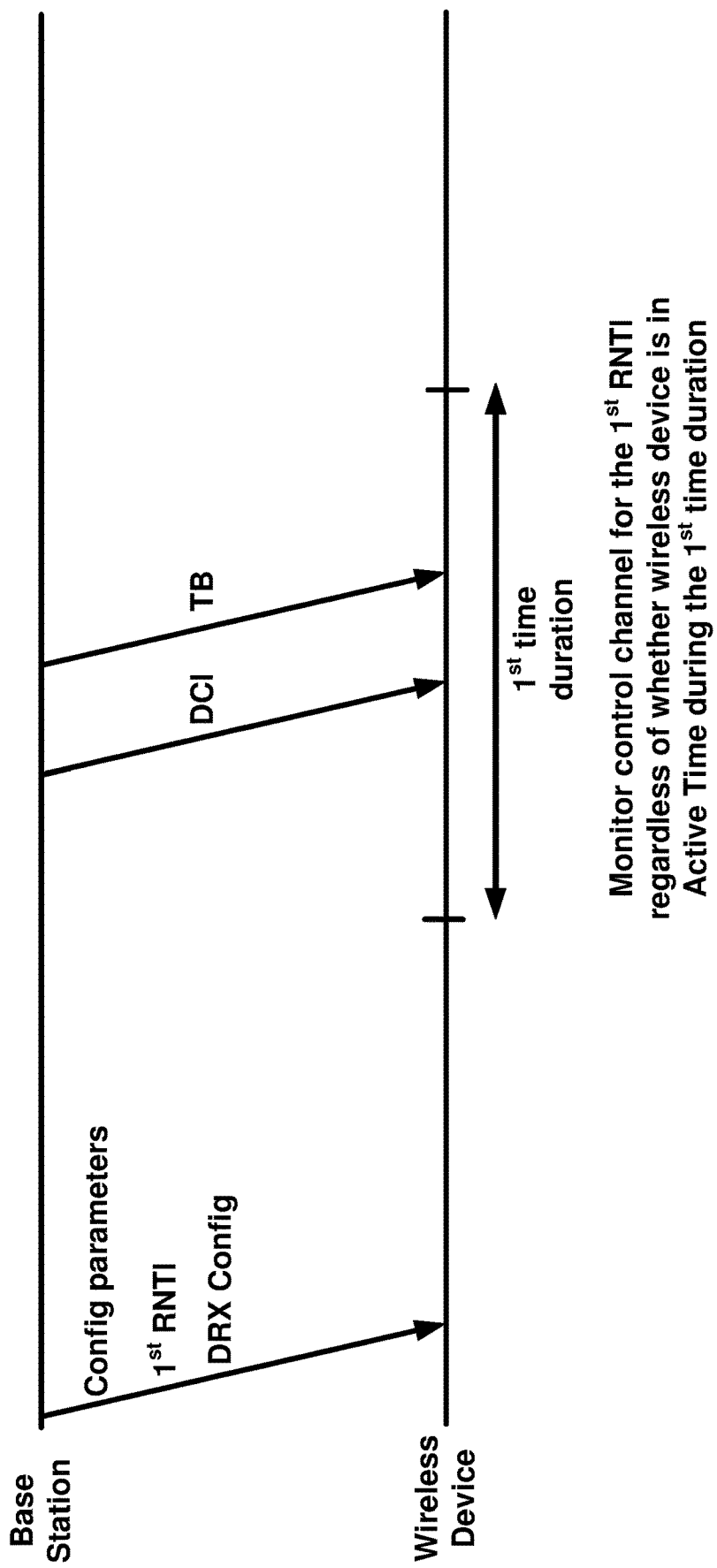
FIG. 31 is an example procedure as per an aspect of an embodiment of the present disclosure.

In an example embodiment as shown in FIG. 31, the wireless device may monitor a control channel for the first RNTI during a first time duration, regardless of whether the wireless device is in a DRX Active time during the first time duration. In an example, the wireless device may monitor the control channel for the first RNTI during the first time duration, regardless of whether the wireless device is in a DRX Active time or not during one or more second time durations of the first time duration. In an example, the first RNTI may correspond to a first service type comprising URLLC service type.

Figure 32:
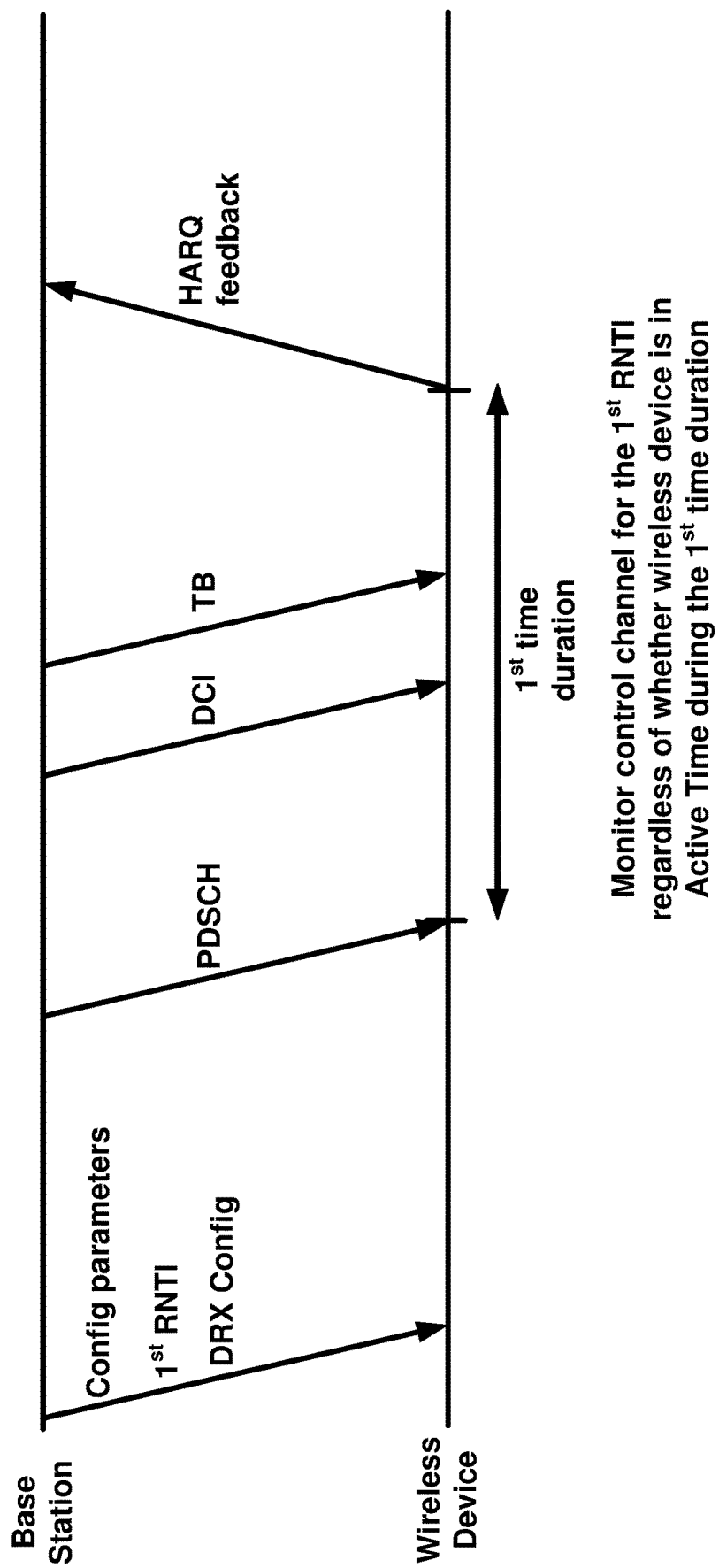
FIG. 32 is an example procedure as per an aspect of an embodiment of the present disclosure.
Figure 33:
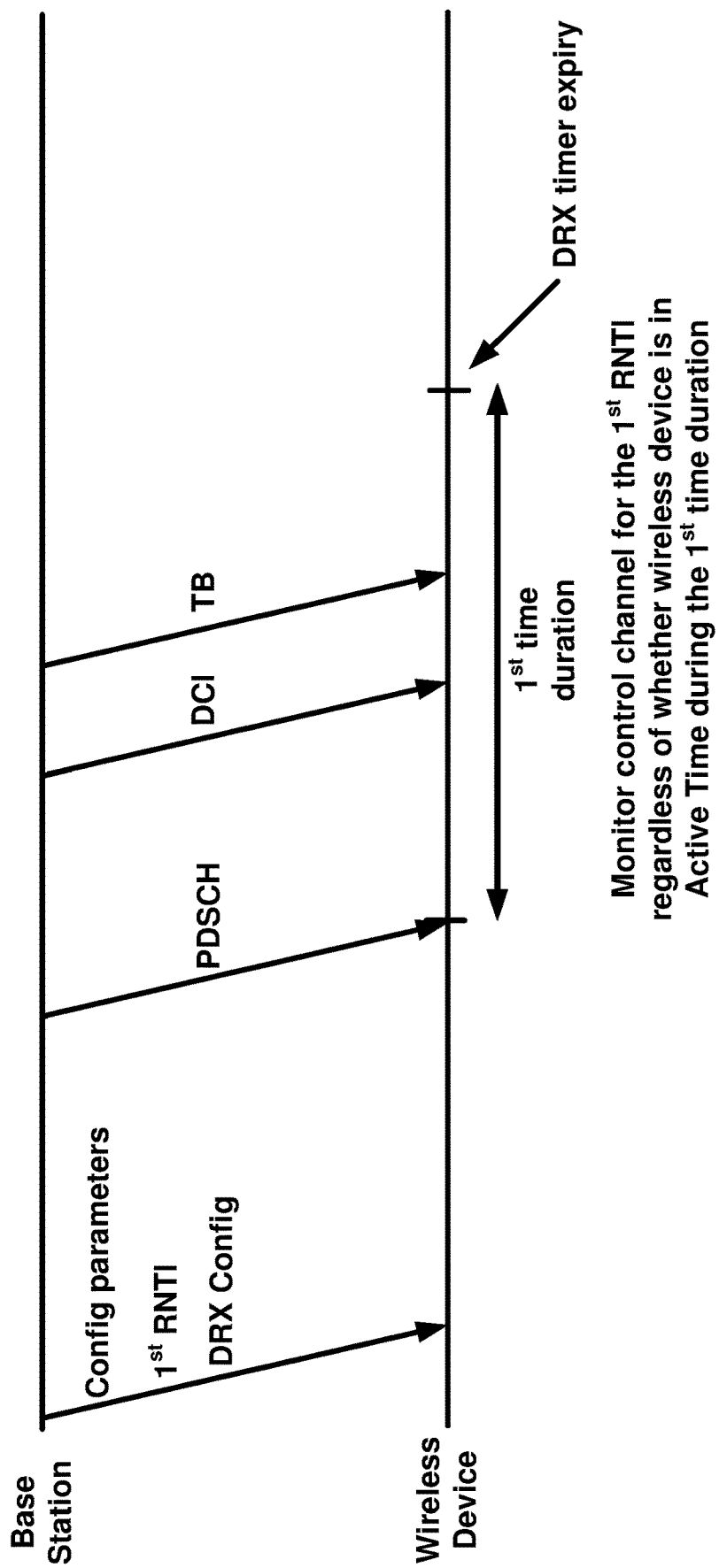
FIG. 33 is an example procedure as per an aspect of an embodiment of the present disclosure.

In an example, as shown in FIG. 32 and FIG. 33, the first time duration may have a start time based on reception of a PDSCH (e.g., a reception time of the PDSCH). In an example, the first time duration may have a start time that is in response to the reception of the PDSCH (e.g., a reception time of the PDSCH). In an example, the PDSCH may correspond to a URLLC service type. In an example, an RNTI associated with a PDCCH scheduling the PDSCH may indicate that the PDSCH corresponds to a URLLC service type.

In an example, as shown in FIG. 32, the first time duration may have an end time based on transmission of HARQ feedback for the PDSCH (e.g., a transmission time of the HARQ feedback for the PDSCH). In an example, the end time may be in response to transmission of the HARQ feedback for the PDSCH (e.g., transmission time of the HARQ feedback). In an example, as shown in FIG. 33, the end time may be based on expiry of a DRX timer (e.g., expiration time of the DRX timer). In an example, the end time may be in response to the expiry of the DRX timer (e.g., expiration time of the DRX timer). In an example, the DRX timer may be a DRX HARQ RTT timer. In an example, the DRX timer may start in response to transmission of the HARQ feedback for the PDSCH. The DRX configuration parameters may indicate a value of the DRX timer.

Figure 34:
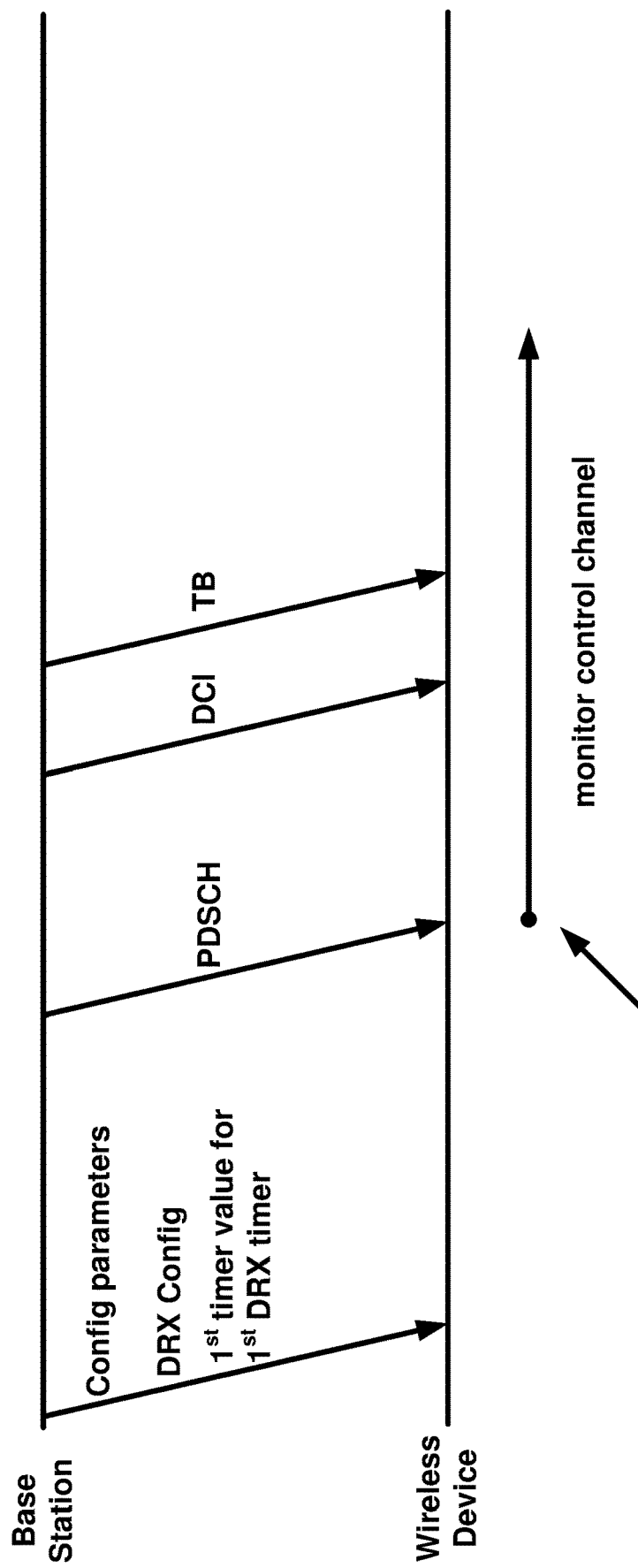
FIG. 34 is an example procedure as per an aspect of an embodiment of the present disclosure.

In an example embodiment as shown in FIG. 34, a wireless device may receive from a base station one or more messages comprising configuration parameters. The configuration parameters may comprise DRX configuration parameters. The DRX configuration parameters may comprise a first value for a first DRX timer. In an example, the first timer may be a retransmission timer. In an example, the first timer may be independent of a traffic type (e.g., URLLC, eMBB, etc.). In an example, the first timer may be associated with a first traffic type (e.g., URLLC traffic). In an example, the first timer may be a retransmission timer for the first traffic type. In an example, the retransmission timer for the first traffic type may be started in response to receiving data of the first traffic type. In an example, the wireless device may determine receiving the data of the first traffic type based on RNTI associated with a DCI scheduling a PDSCH of the first traffic type. In an example, the wireless device may determine receiving data of the first traffic type based on a MAC header of a MAC PDU received via the PDSCH. The MAC header may comprise LCIDs of one or more logical channels indicating data of the first traffic type.

The wireless device may receive a transport block via a downlink data channel (e.g., PDSCH). In an example, the wireless device may receive the downlink data in response to a dynamic downlink grant. In an example, the wireless device may receive the downlink data in response to a semi-persistent downlink grant. The wireless device may start the first DRX timer with the first value based on the receiving the downlink data channel. In an example, the wireless device may start the first DRX timer with the first value in response to the receiving the downlink data channel.

The wireless device may monitor a control channel while the first DRX timer is running. In an example, the wireless device may be in a DRX Active time in response to the first DRX timer running. In an example, the wireless device may monitor a control channel when the wireless device is in a DRX Active time.

The wireless device may, in response to the monitoring the control channel, receive a downlink control information indicating one or more reception parameters of a transport block. In an example, the transport block may be a URRLC transport block. The wireless device may receive the transport block based on the reception parameters. In an example, the reception parameters may indicate radio resources for reception of the transport block. In an example, the reception parameters may indicate HARQ parameters (HARQ_ID, NDI, RV, etc.) and/or power control parameters, etc.

In an example embodiment, a wireless device may receive one or more messages comprising discontinuous reception (DRX) configuration parameters comprising a first value for a first DRX timer. The wireless device may receive a transport block via a downlink data channel. The wireless device may start the first DRX timer with the first value in response to receiving the downlink data channel. The wireless device may monitor a control channel while the first DRX timer is running. The wireless device may receive, in response to the monitoring, a downlink control information indicating reception parameters. The wireless device may receive the transport block based on the reception parameters.

In an example embodiment, a wireless device may receive one or more messages comprising discontinuous reception (DRX) configuration parameters comprising a first value for a first period of time. The wireless device may receive a transport block via a downlink data channel. The wireless device may monitor a control channel, in response to receiving the downlink data channel, for a first period of time. The wireless device may receive, in response to the monitoring, a downlink control information indicating reception parameters. The wireless device may receive the transport block based on the reception parameters.

Figure 35:
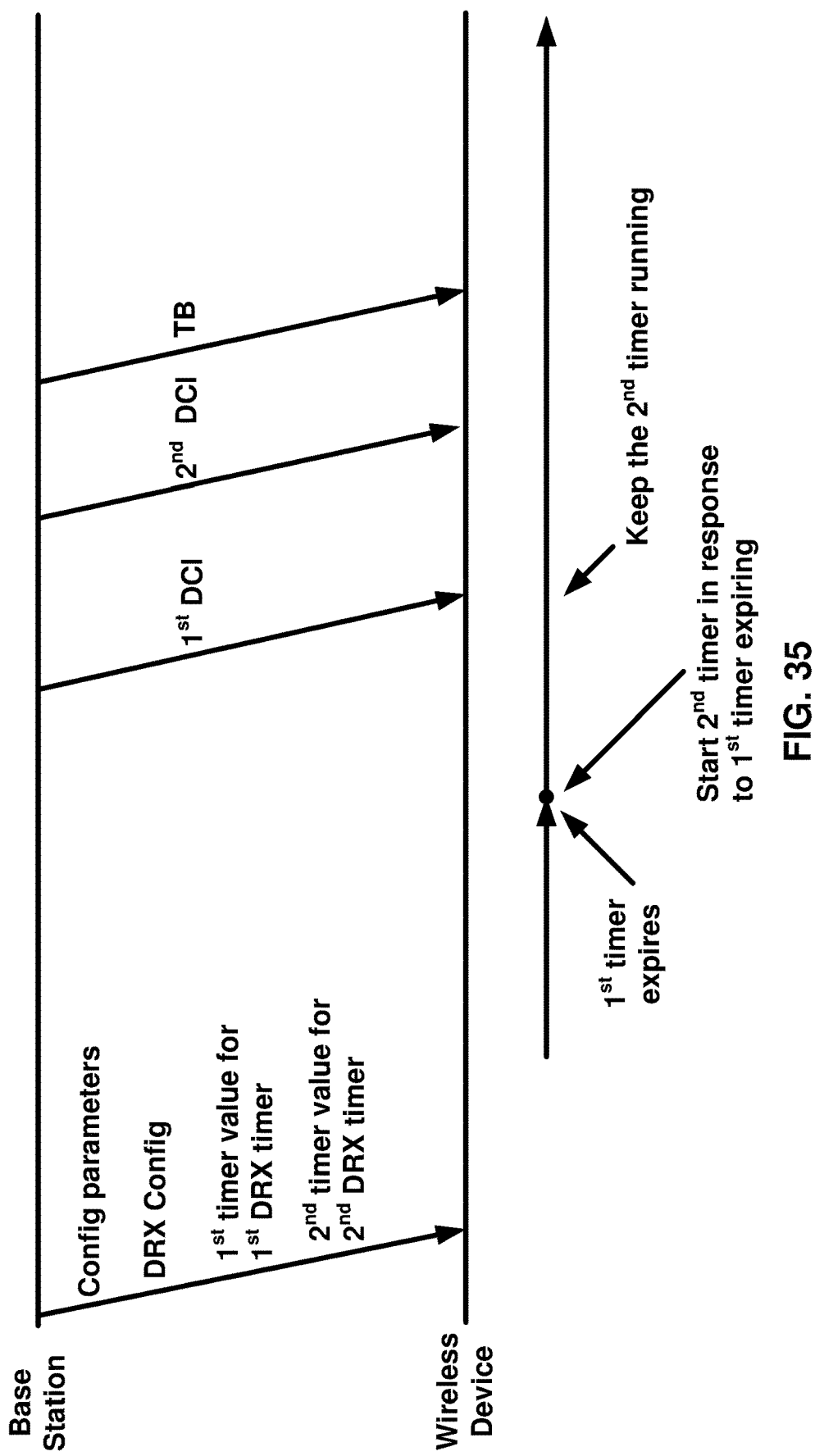
FIG. 35 is an example procedure as per an aspect of an embodiment of the present disclosure.

In an example embodiment as shown in FIG. 35, a wireless device may receive one or more messages comprising configuration parameters. The configuration parameters may comprise DRX configuration parameters. The DRX configuration parameters may comprise a first value for a first DRX timer and a second value for a second DRX timer. In an example, the first timer may be a DRX HARQ RTT timer. The wireless device may start the first DRX timer with the first value in response to transmission of HARQ feedback for a PDSCH. The second DRX timer may be a DRX retransmission timer. The wireless device may start the second DRX timer with the second value in response to an expiry of the first DRX timer.

The wireless device may receive a first downlink control information indicating a downlink transmission. In an example, the first downlink control information may correspond to a first RNTI wherein the first RNTI may correspond to a first service type (e.g., URLLC). In an example, the first downlink control information may be independent of service type (URLLC, eMBB, etc.). In an example, the wireless device may keep the second DRX timer running (e.g., not stop). In an example, the wireless device may keep the second DRX timer running (e.g., not stop) in response to the receiving the first downlink control information. In an example, the wireless device may keep the second DRX timer running (e.g., not stop) in response to the receiving a downlink control information corresponding to the first RNTI/service type and may stop the second DRX timer in response to the receiving a downlink control information corresponding to a second RNTI. The configuration parameters may indicate the second RNTI. The second RNTI may correspond to a second service type or may be independent of service type (e.g., may correspond to URLLC, eMBB, etc.)

The wireless device may determine that the wireless device is in a DRX Active time. The wireless device may determine that the wireless device is in a DRX Active time in response to the second DRX timer running. The wireless device may be a in a DRX Active time in response to one or more conditions comprising the second DRX timer running. The wireless device may monitor a control channel in response to being in a DRX Active time. The wireless device may receive a second downlink control information indicating reception parameters of a transport block. The wireless device may receive the transport block based on the reception parameters.

In an example embodiment, a wireless device may receive one or more messages comprising discontinuous reception (DRX) configuration parameters comprising a first value for a first DRX timer and a second value for a second DRX timer. The wireless device may start the second DRX timer with the second value in response to the first DRX timer expiring. The wireless device may receive a first downlink control information indicating a downlink transmission. The wireless device may keep/maintain the second DRX timer running in response to the receiving the downlink control information. The wireless device may determine that the wireless device is in DRX Active Time in response to the second DRX timer running. The wireless device may receive a second downlink control information indicating reception parameters of a transport block. The wireless device may receive the transport block based on the reception parameters.

The wireless device may receive a first PDSCH with a first HARQ process. Before transmission of HARQ feedback for the first PDSCH, the wireless device may receive a second PDSCH with the same first HARQ process. The legacy processes for transmitting HARQ feedback degrade the scheduling performance and lead to degraded network performance. There is a need to enhance legacy processes for transmitting HARQ feedback for the first PDSCH and/or the second PDSCH. Example, embodiments enhance the HARQ feedback performance.

Figure 36:
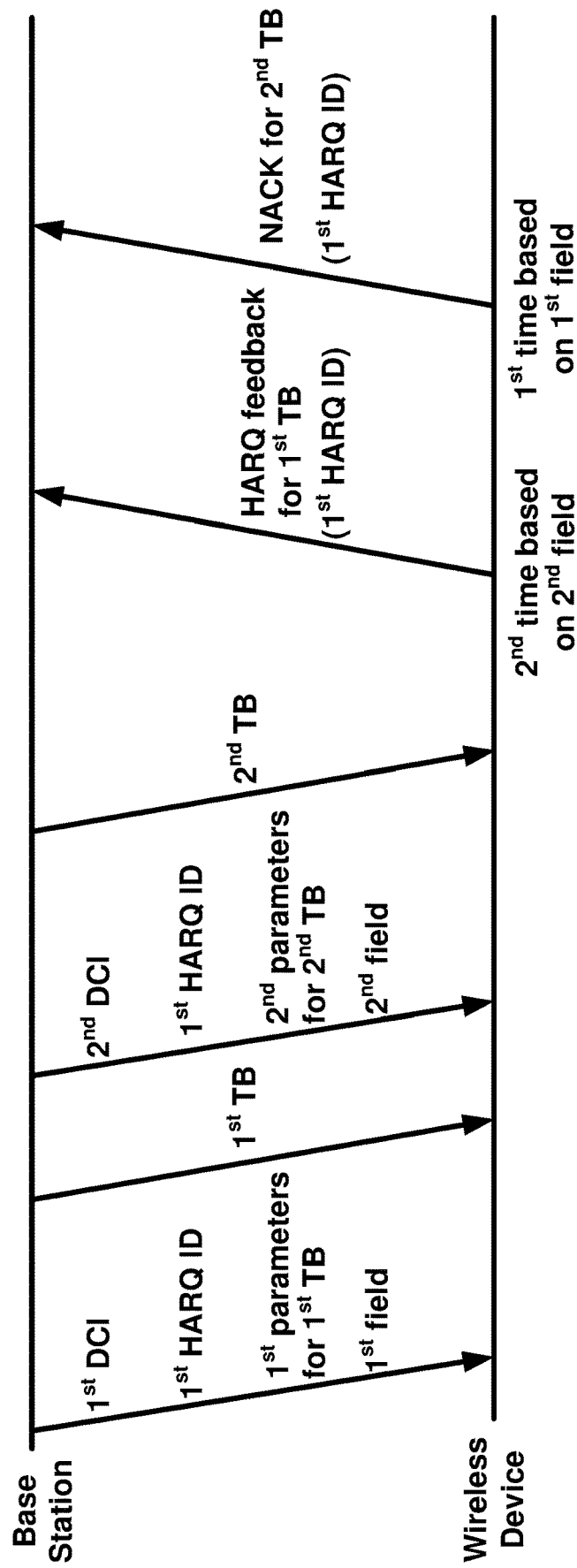
FIG. 36 is an example procedure as per an aspect of an embodiment of the present disclosure.

In an example embodiment as shown in FIG. 36, a wireless device may receive a first DCI. The first DCI may comprise first parameters for reception of a first transport block. The first transport block may be identified by/correspond to a first HARQ process. The first HARQ process may be a downlink HARQ process of a cell that the first transport block is received. The first parameters may comprise an identifier of the first HARQ process. The DCI may comprise a first field indicating a first time for a first transmission of a first HARQ feedback of the first transport block. The first time may indicate symbol(s)/slot(s)/mini-slot(s)/PUCCH duration(s)/subframe(s) that the first HARQ feedback of the first transport block is transmitted. The first time may be based on the first field and one or more configuration parameters. The wireless device may receive the configuration parameters via one or more messages (e.g., RRC messages). The first HARQ feedback may indicate a positive or negative acknowledgement.

The wireless device may receive a second DCI. The second DCI may comprise second parameters for reception of a second transport block. The second transport block may be identified by/correspond to the first HARQ process (e.g., HARQ process of the first transport block). In an example, the second transport block may be a retransmission of the first transport block (e.g., a different RV). The second parameters may comprise an identifier of the second HARQ process. The second parameters may indicate a time (e.g., symbol(s)/slot(s)/mini-slot(s), etc.) for reception of the second transport block. The time for reception of the second transport block may be before/earlier than the first time (e.g., time for transmission of HARQ feedback of the first transport block). The second DCI may comprise a second field indicating a second time for a second transmission of second HARQ feedback corresponding to the second transport block. The second time may be based on the second field and one or more configuration parameters. The wireless device may receive the configuration parameters via one or more messages (e.g., RRC messages).

The wireless device may transmit the second HARQ feedback at the second time. In an example, the second transport block may correspond to a URLLC traffic type. In an example, an RNTI corresponding to the second DCI may indicate that the second transport block is associated with URLLC traffic.

Figure 37:
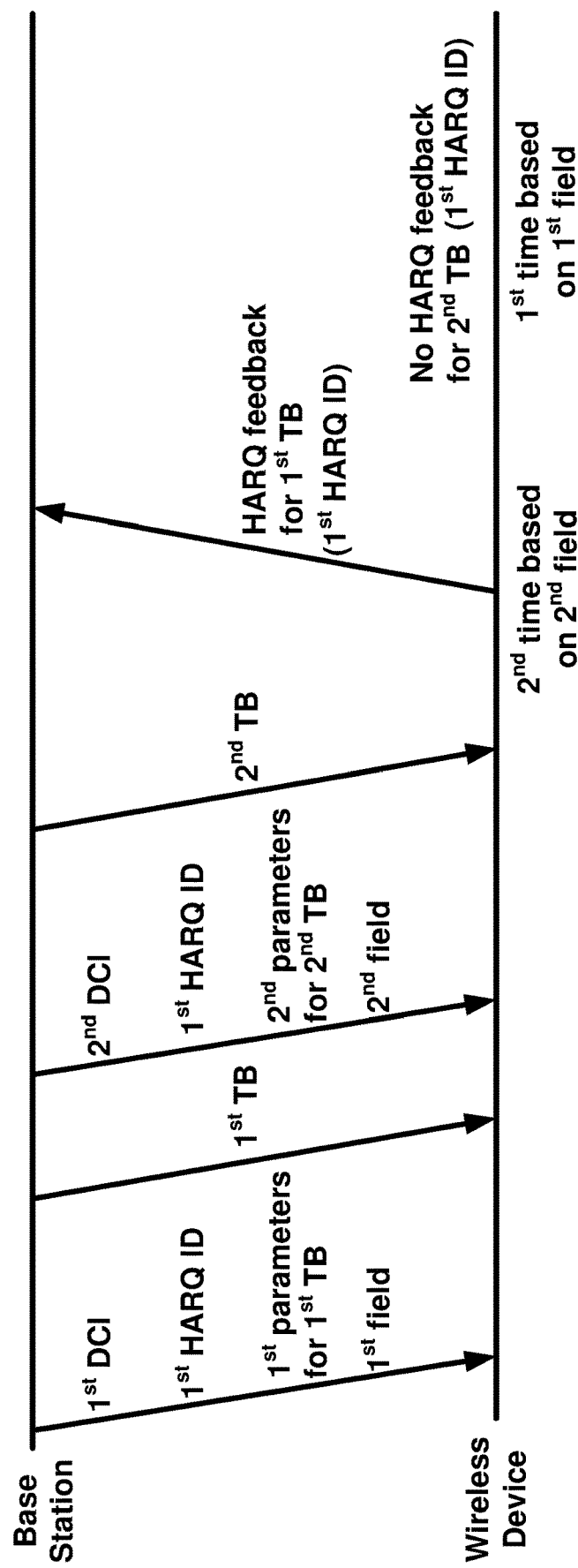
FIG. 37 is an example procedure as per an aspect of an embodiment of the present disclosure.

In an example, as shown in FIG. 36, the wireless device may transmit a negative acknowledgement (NACK) for the first transport block. In an example as shown in FIG. 37, the wireless device may not transmit the first HARQ feedback for the first transport block. In an example, the wireless device may not transmit the first HARQ feedback for the first transport block in response to the wireless device transmitting HARQ feedback based on a first type of HARQ feedback codebook. In an example, the wireless device may not transmit the first HARQ feedback for the first transport block in response to the wireless device transmitting HARQ feedback based on a first type of HARQ feedback codebook and may transmit the first HARQ feedback (e.g., NACK) for the first transport block in response to the wireless device transmitting HARQ feedback based on a second type of HARQ feedback codebook. In an example, the first type of the HARQ feedback codebook may be a dynamic type and a second type of HARQ feedback codebook may be a semi-static type.

In an example, the first transmission of the first HARQ feedback may be based on a dynamic codebook. In an example, the first transmission of the first HARQ feedback may be based on a semi-static codebook. In an example, the second transmission of the second HARQ feedback may be based on a dynamic codebook. In an example, the second transmission of the second HARQ feedback may be based on a dynamic codebook.

In an example, the first time and the second time may be in a same slot/subframe. In an example, the first time may be in a first slot and the second time may be in the first slot. In an example, the first field of the first DCI may indicate transmission of the HARQ feedback in the first slot and the second field of the second DCI may indicate transmission of the second HARQ feedback in the first slot. In an example, a field of the first DCI may indicate transmission of the HARQ feedback via a first PUCCH in the first slot and a field of the second DCI may indicate transmission of the second HARQ feedback via a second PUCCH in the first slot.

In an example, the first field of the first DCI may indicate transmission of the HARQ feedback in the first slot and the second field of the second DCI may indicate transmission of the second HARQ feedback in a second slot.

In an example embodiment, a wireless device may receive a first DCI comprising: first parameters for reception of a first transport block identified by a first HARQ process; and a first field indicating a first time for a first transmission of first HARQ feedback of the first transport block. The wireless device may receive a second DCI comprising: second parameters for reception of a second transport block identified by the first HARQ process at a time before the first time; and a second field indicating a second time for a second transmission of second HARQ feedback corresponding to the second transport block. The wireless device may transmit the second HARQ feedback at the second time. In an example, the wireless device may transmit, at the first time, a negative acknowledgement for the first HARQ feedback. In an example, the wireless device may not transmit the first HARQ feedback.

Figure 38:
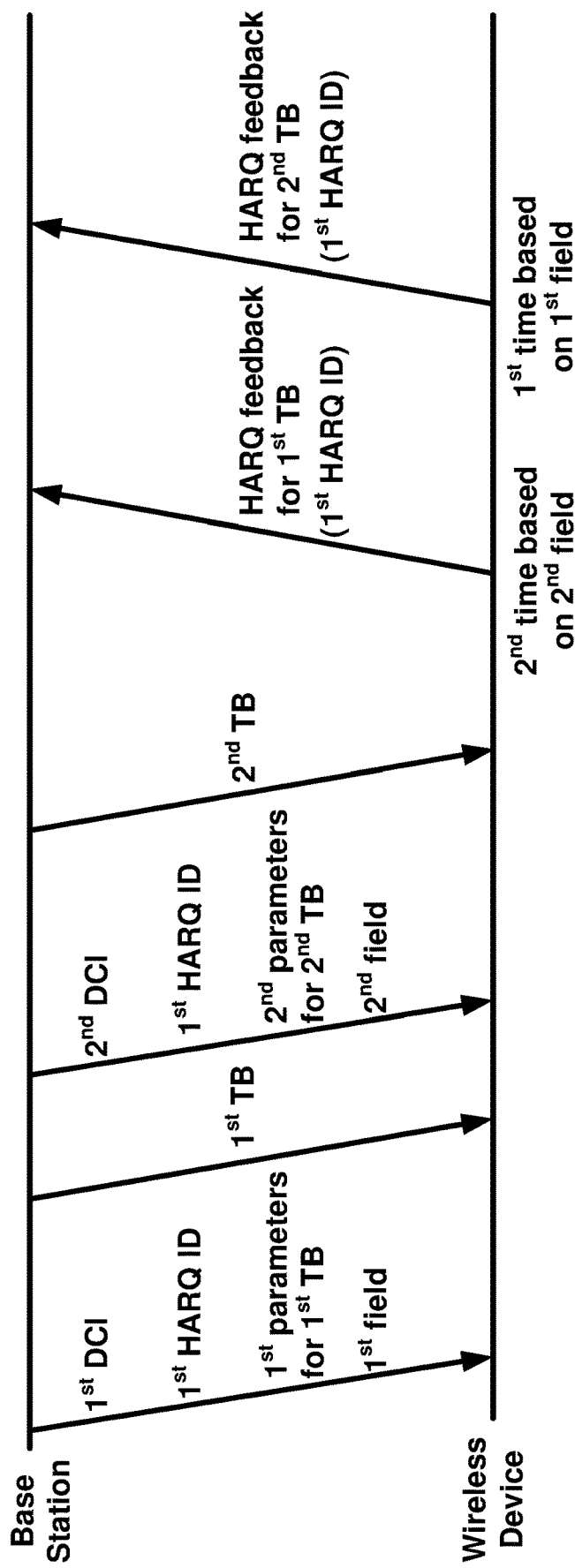
FIG. 38 is an example procedure as per an aspect of an embodiment of the present disclosure.

In an example embodiment as shown in FIG. 38, a wireless device may receive a first DCI. The first DCI may comprise first parameters for reception of a first transport block. The first transport block may be identified by/correspond to a first HARQ process. The first HARQ process may be a downlink HARQ process of a cell that the first transport block is received. The first parameters may comprise an identifier of the first HARQ process. The DCI may comprise a first field indicating a first time for a first transmission of a first HARQ feedback of the first transport block. The first time may indicate symbol(s)/slot(s)/mini-slot(s)/PUCCH duration(s)/subframe(s) that the first HARQ feedback of the first transport block is transmitted. The first time may be based on the first field and one or more configuration parameters. The wireless device may receive the configuration parameters via one or more messages (e.g., RRC messages). The first HARQ feedback may indicate a positive or negative acknowledgement.

The wireless device may receive a second DCI. The second DCI may comprise second parameters for reception of a second transport block. The second transport block may be identified by/correspond to the first HARQ process (e.g., HARQ process of the first transport block). In an example, the second transport block may be a retransmission of the first transport block (e.g., a different RV). The second parameters may comprise an identifier of the second HARQ process. The second parameters may indicate a time (e.g., symbol(s)/slot(s)/mini-slot(s), etc.) for reception of the second transport block. The time for reception of the second transport block may be before/earlier than the first time (e.g., time for transmission of HARQ feedback of the first transport block). The second DCI may comprise a second field indicating a second time for a second transmission of second HARQ feedback corresponding to the second transport block. The second time may be based on the second field and one or more configuration parameters. The wireless device may receive the configuration parameters via one or more messages (e.g., RRC messages).

The wireless device may receive the first transport block based on the first parameters. The wireless device may receive the first transport block via radio resources indicated by the first parameters. The wireless device may receive the second transport block. The wireless device may receive the second transport block via radio resources indicated by the second parameters.

Figure 39:
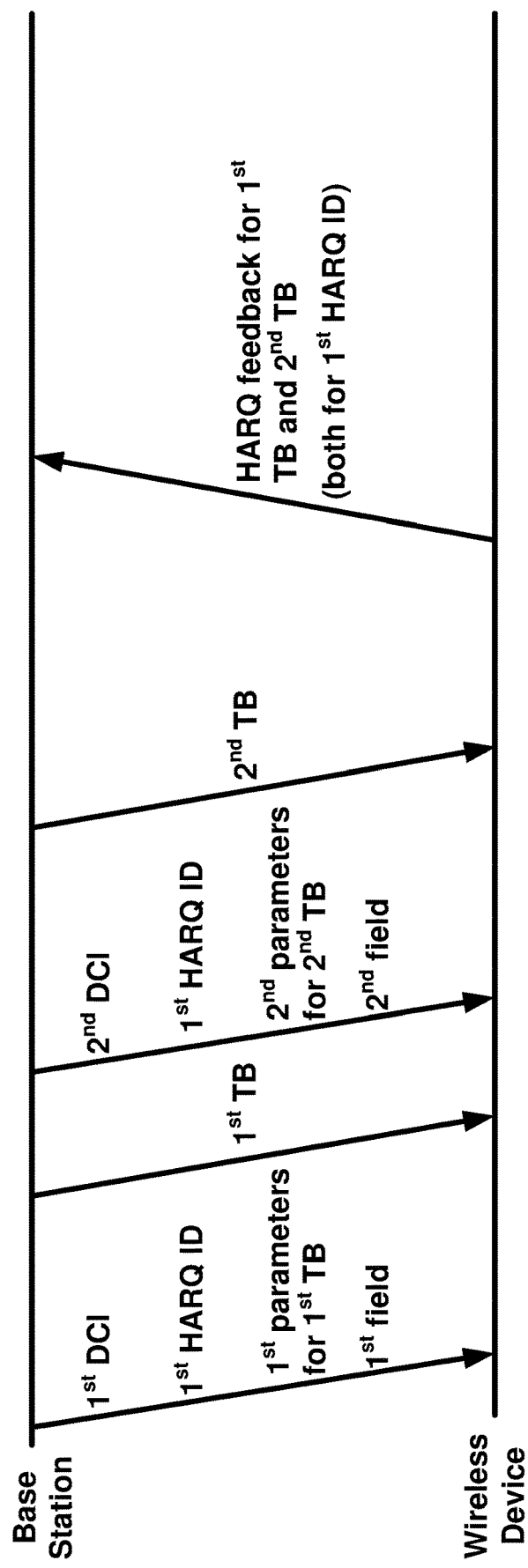
FIG. 39 is an example procedure as per an aspect of an embodiment of the present disclosure.

The wireless device may transmit the first HARQ feedback of the first transport block at the first time. The wireless device may transmit the HARQ feedback of the second transport block at the second time. In an example, as shown in FIG. 38, the first time may be in a first slot/min-slot/PUCCH duration and the second time may be in a second slot/mini-slot/PUCCH duration. In an example, the first time and the second time may be in a same slot and may be transmitted via different PUCCHs (e.g., short PUCCHs) configured at the slot. In an example as shown in FIG. 39, the first time and the second time may coincide (e.g., same slot/mini-slot). In an example, PUCCH resources for transmission of the first HARQ feedback may be via a first PUCCH and PUCCH resources of the second HARQ feedback may be via a second PUCCH (e.g., in a same slot). In an example, the first HARQ feedback and the second HARQ feedback may be transmitted via a same PUCCH channel. A mechanism may be employed to distinguish the first HARQ feedback and the second HARQ feedback. In an example, the first HARQ feedback and the second HARQ feedback may be distinguished by using different DAI fields in the DCIs scheduling the first transport block and the second transport block and employing dynamic HARQ feedback codebook.

Figure 40:
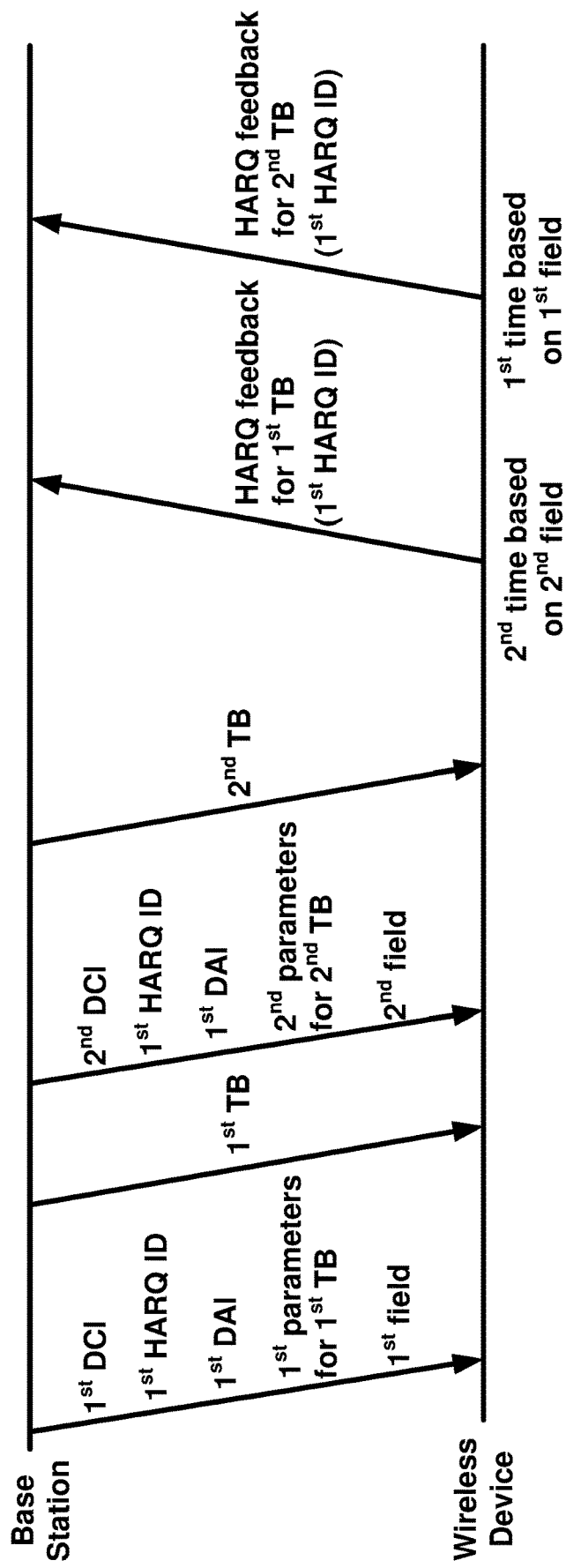
FIG. 40 is an example procedure as per an aspect of an embodiment of the present disclosure.
Figure 41:
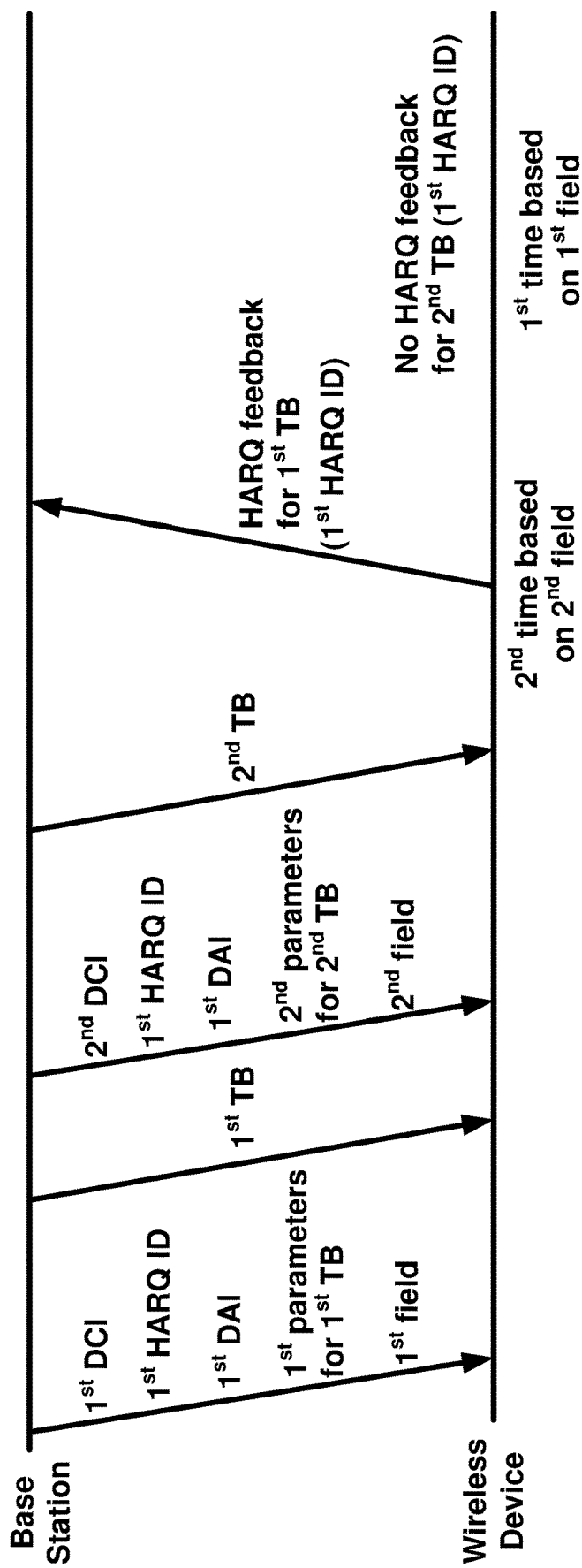
FIG. 41 is an example procedure as per an aspect of an embodiment of the present disclosure.

In an example embodiment as shown in FIG. 40, the base station may employ a first DAI (downlink assignment index) for the first DCI scheduling the first transport block. The base station may employ the first DAI (e.g., same as that used in the first DCI) in the second DCI scheduling the second transport block. The wireless device may determine that the second DCI is for scheduling a second transport block with a same HARQ process as the first transport block. In an example, as shown in FIG. 40, the wireless device may transit HARQ feedback for the first transport block at the first time and HARQ feedback for the second transport block at the second time. In an example as shown in FIG. 41, the wireless device may transmit HARQ feedback for the for the first transport block at the first time and may not transmit HARQ feedback for the second transport block at the second time.

Figure 42:
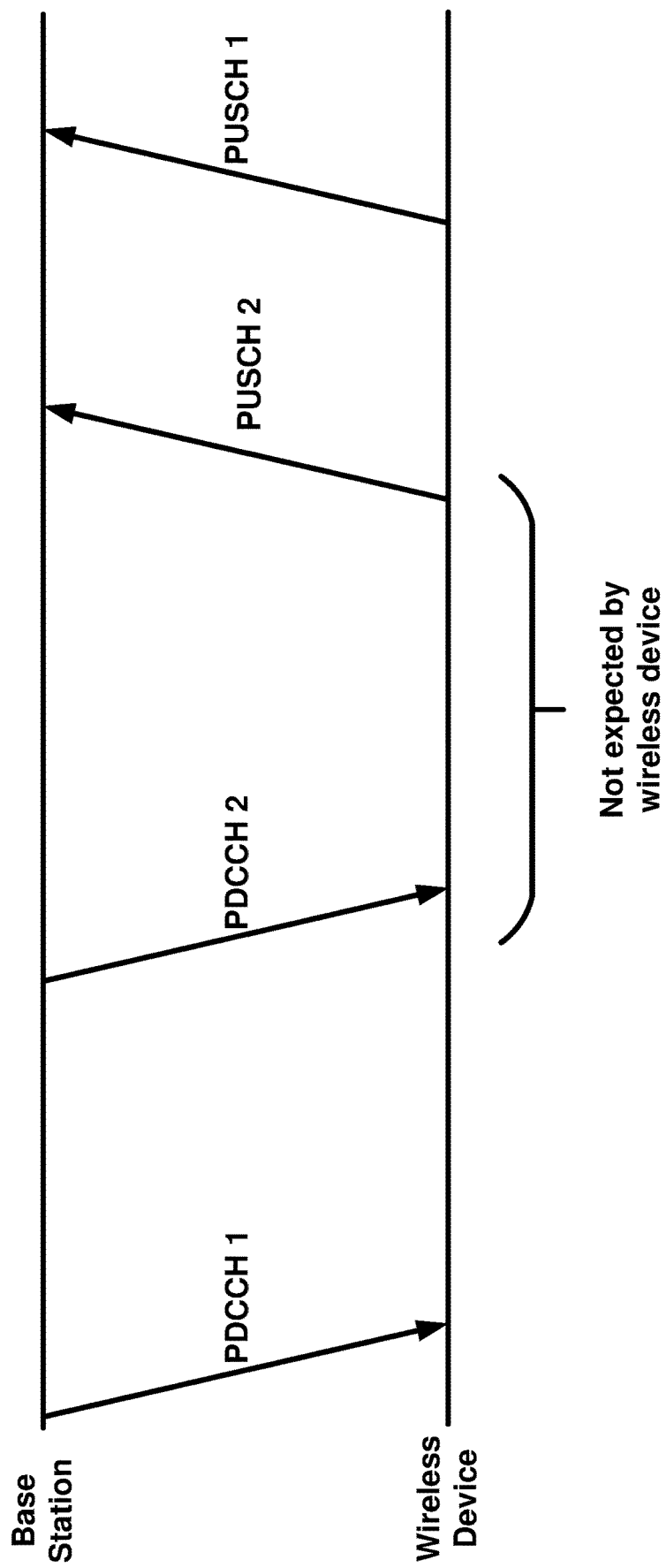
FIG. 42 is an example legacy scheduling as per an aspect of an embodiment of the present disclosure.

In an example as shown in FIG. 42, in legacy processes, for any two HARQ process IDs in a given cell, if the wireless device may be scheduled to start a PUSCH transmission in symbol j by a PDCCH in symbol i, the wireless device may not be expected to be scheduled to transmit a PUSCH starting earlier than symbol j by a PDCCH starting later than symbol i. In an example, for any two HARQ process IDs in a given cell, if the wireless device is scheduled to start receiving a PDSCH in symbol j by a PDCCH starting in symbol i, the wireless device may not be expected to be scheduled to receive a PDSCH starting earlier than symbol j with a PDCCH starting later than symbol i.

In an example, once mixed with URLLC, for PUSCH scheduling, a more urgent URLLC data may be scheduled in the middle of the preparation for PUSCH1 and thus out of order PUSCH scheduling may be supported.

In an example, a wireless device may prepare/decode PUSCH2/PDSCH2 and may stop preparing/decoding PUSCH1/PDSCH1. In an example, PUSCH1 may not be transmitted and wireless device may feedback NACK for PDSCH 1.

In an example, a wireless device may prepare/decode PUSCH2/PDSCH2 and may stop preparing/decoding PUSCH1/PDSCH1. In an example, after preparing/decoding PUSCH2/PDSCH2, the wireless device may resume preparing/decoding PUSCH1/PDSCH1. If the wireless device is not able to prepare PUSCH1 in time, PUSCH1 may not be transmitted. If a wireless device is not able to decode PDSCH1 in time, the wireless device may feed back NACK for PDSCH1.

In an example, the wireless device may prepare/decode PUSCH1 and PUSCH2/PDSCH1 and PDSCH2 in parallel. The wireless device may transmit both PUSCH1 and PUSCH2. The wireless device may feed back HARQ-ACKs for both PDSCH1 and PDSCH2.

In an example, the legacy logical channel prioritization when a PUSCH1 and PUSCH2 and corresponding transport blocks (e.g., MAC PDUs) are prepared simultaneously may lead to inefficient network performance. There is a need to enhance the legacy data multiplexing/logical channel prioritization procedures. Example embodiments enhance the legacy data multiplexing/logical channel prioritization procedures.

Figure 43:
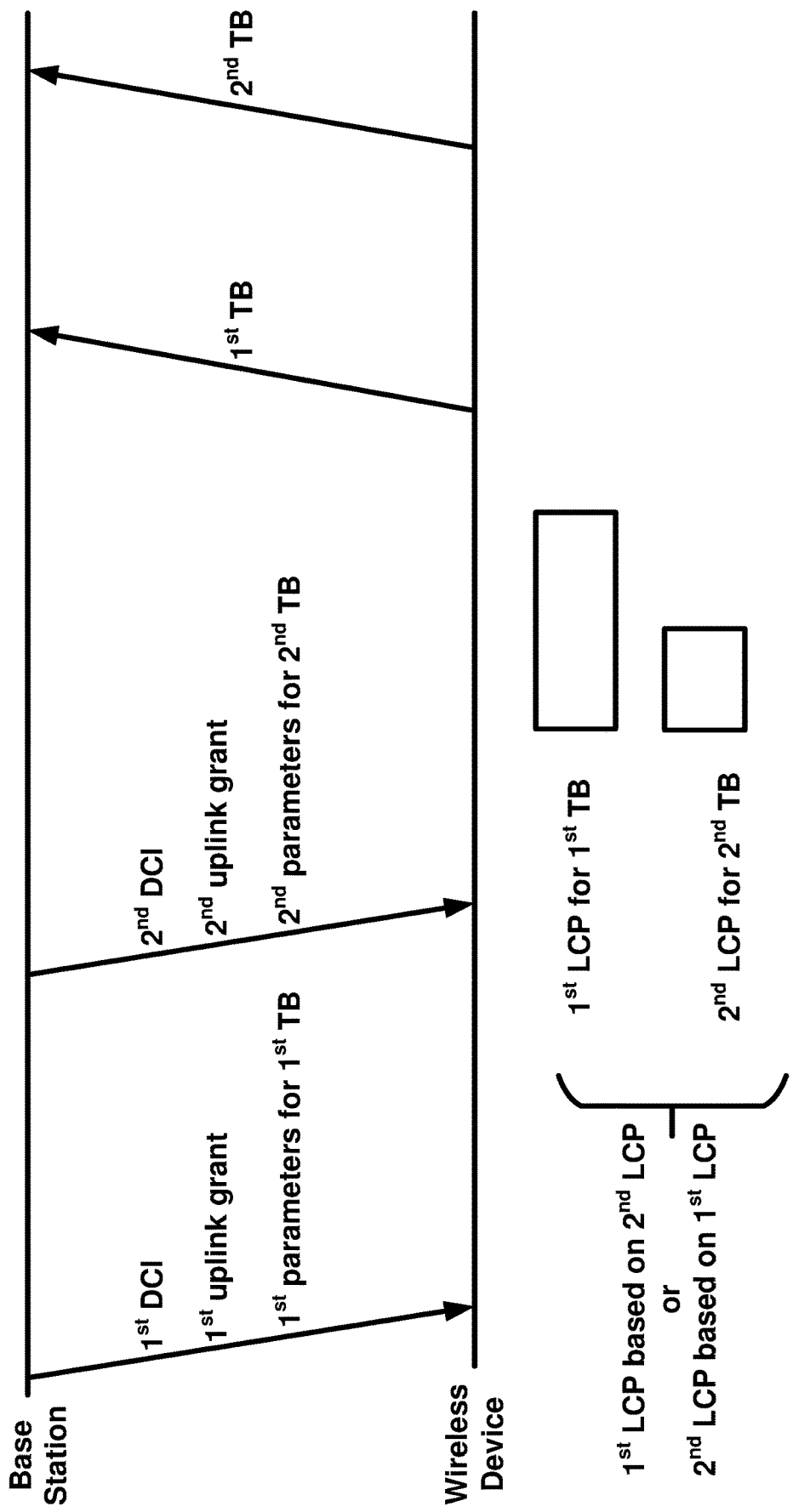
FIG. 43 is an example procedure as per an aspect of an embodiment of the present disclosure.

In an example embodiment as shown in FIG. 43, a wireless device may receive, at a first time, a first downlink control information. The first time may be a slot/mini-slot/duration that the wireless device is configured to monitor control channel and receive PDCCH. The first DCI may comprise a first uplink grant. The first uplink grant may indicate transmission parameters of a first transport block via first radio resources. The first transmission parameters may indicate the first radio resources for transmission of the first transport block. The first radio resources may be at a second time (e.g., slot/mini-slot/duration).

The wireless device may receive, at a third time that is later than the first time and is before the second time, a second downlink control information comprising a second uplink grant. The third time may be a slot/mini-slot/duration that the wireless device is configured to monitor control channel and receive PDCCH. The second DCI may comprise a second uplink grant. The second uplink grant may indicate transmission parameters of a second transport block via second radio resources. The second transmission parameters may indicate the second radio resources for transmission of the second transport block. The second radio resources may be at a fourth time (e.g., slot/mini-slot/duration). The fourth time may be before/earlier than the second time.

The wireless device may, in response to receiving the second uplink grant, create the second transport block based on a second logical channel prioritization. The wireless device may create the first transport block based on the second logical cannel prioritization and a first logical channel prioritization. In an example, in response to one or more first logical channels being served (e.g., as much their corresponding prioritized bit rate (PBR)) based on the second logical channel prioritization procedure, the wireless device may prioritize one or more second logical channels different from the one or more first second logical channels in the first logical channel prioritization procedure. In an example, in response to one or more first logical channels being served based on the second logical channel prioritization procedure (e.g., as much their corresponding prioritized bit rate (PBR)), the wireless device may skip the one or more first logical channels in the first logical channel prioritization.

In example embodiment, a wireless device may receive, at a first time, a first downlink control information comprising a first uplink grant indicating first transmission of a first transport block via first radio resources at a second time. The wireless device may receive, at a third time later than the first time and before the second time, a second downlink control information comprising a second uplink grant indicating second transmission of a second transport block at a fourth time before the second time. The wireless device may create the second transport block based on a second logical channel prioritization procedure. The wireless device may create the first transport block based on a first logical channel prioritization procedure and the second logical channel prioritization procedure.

Figure 44:
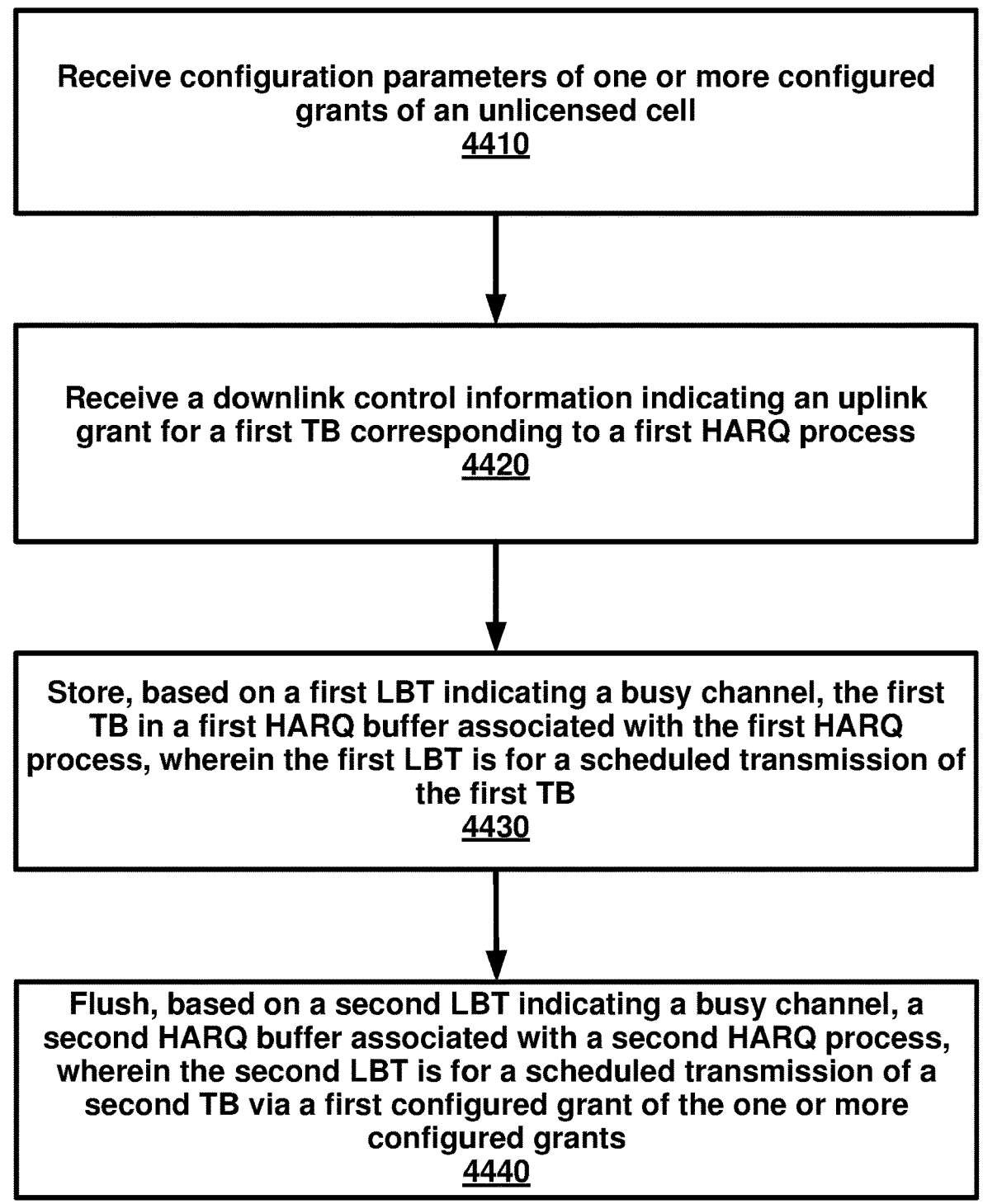
FIG. 44 is an example flow chart of HARQ process as per an aspect of an embodiment of the present disclosure.

FIG. 44 is a flow diagram as per an aspect of an example embodiment of the present disclosure. At 4410, a wireless device may receive configuration parameter(s) of one or more configured grants of an unlicensed cell. At 4420, the wireless device may receive a downlink control information indicating an uplink grant for a first TB corresponding to a first HARQ process. At 4430, the wireless device may store, based on a first LBT procedure indicating a busy channel, the first TB in a first HARQ buffer associated with the first HARQ process. The first LBT may be for a scheduled transmission of the first TB. At 4440, the wireless device may flush, based on a second LBT procedure indicating a busy channel, a second HARQ buffer associated with a second HARQ process. The second LBT procedure may be for a scheduled transmission of a second TB via a first configured grant of the one or more configured grants.

Figure 45:
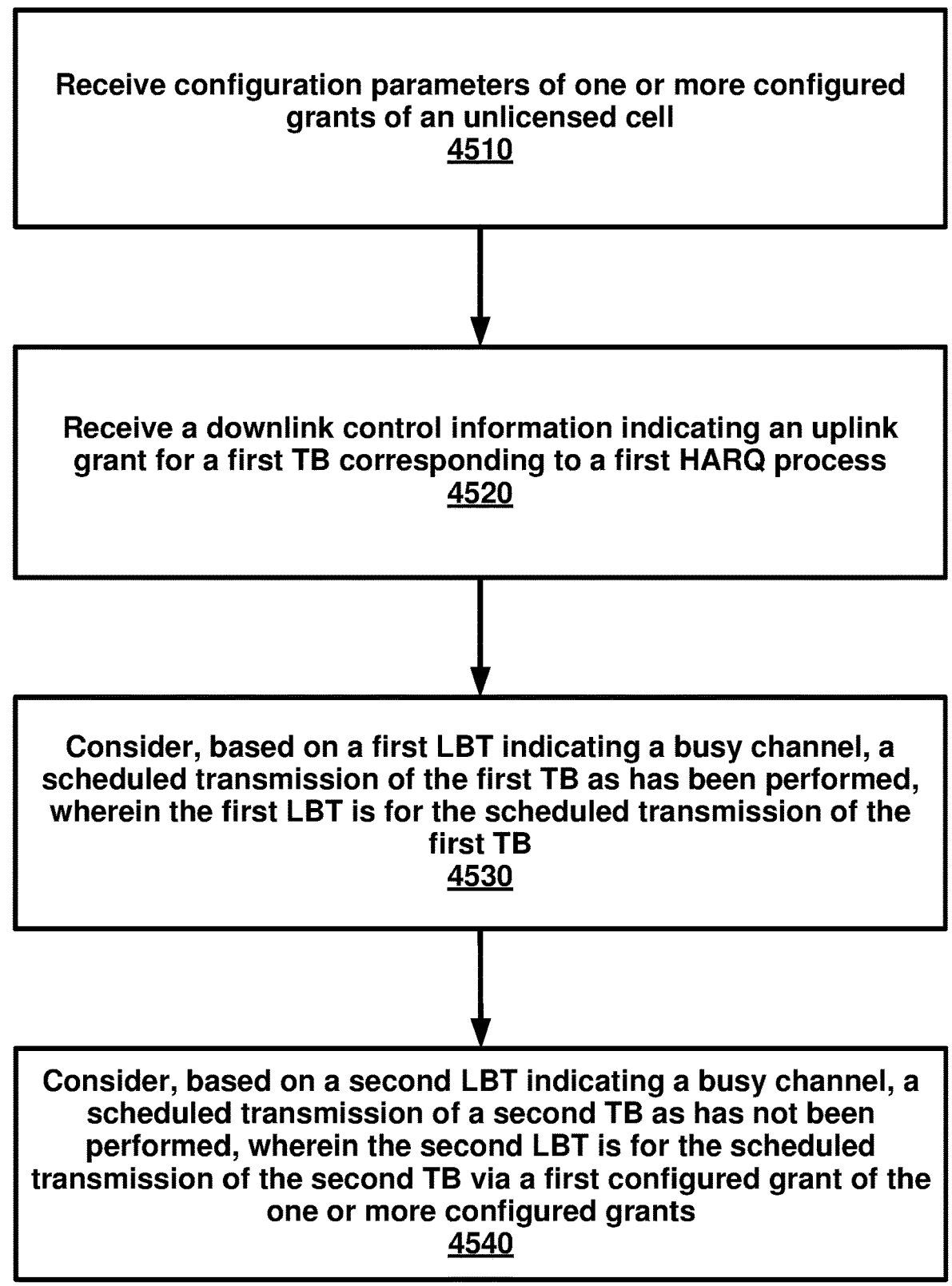
FIG. 45 is an example flow chart of HARQ process as per an aspect of an embodiment of the present disclosure.

FIG. 45 is a flow diagram as per an aspect of an example embodiment of the present disclosure. At 4510, a wireless device may receive configuration parameter(s) of one or more configured grants of an unlicensed cell. At 4520, the wireless device may receive a downlink control information indicating an uplink grant for a first TB corresponding to a first HARQ process. At 4530, the wireless device may consider, based on a first LBT procedure indicating a busy channel, a scheduled transmission of the first TB as has been performed. The first LBT may be for a scheduled transmission of the first TB. At 4540, the wireless device may consider, based on a second LBT procedure indicating a busy channel, a scheduled transmission of a second TB as has not been performed. The second LBT procedure may be for the scheduled transmission of a second TB via a first configured grant of the one or more configured grants.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a wireless device, configuration parameters of one or more configured grants on an unlicensed cell;
receiving a downlink control information indicating an uplink grant for a first transport block (TB) corresponding to a first hybrid automatic repeat request (HARQ) process;
storing, based on a first listen before talk (LBT) process indicating a busy channel, the first TB in a first HARQ buffer associated with the first HARQ process, wherein the first LBT process is for a scheduled transmission of the first TB; and
flushing, based on a second LBT process indicating a busy channel, a second HARQ buffer associated with a second HARQ process, wherein the second LBT process is for a scheduled transmission of a second TB via a first configured grant of the one or more configured grants.

2. The method of claim 1, wherein:
the first HARQ process is identified with a first HARQ process identifier; and
the first TB is associated with the first HARQ process.

3. The method of claim 1, wherein the second HARQ process and the first HARQ process are each identified with a same HARQ process identifier.

4. The method of claim 1, further comprising selecting the second HARQ process for the second TB based on the first configured grant.

5. The method of claim 1, further comprising receiving a second downlink control information indicating activation of at least one of the one or more configured grants on the unlicensed cell, wherein the at least one of the one or more configured grants comprises the first configured grant.

6. The method of claim 1, further comprising:
creating the first TB based on the uplink grant; and
creating the second TB for the scheduled transmission via the first configured grant.

7. The method of claim 1, further comprising determining, in response to flushing the second HARQ buffer, that the second HARQ process is an available HARQ process with an empty corresponding HARQ buffer.

8. The method of claim 1, further comprising triggering a transmission of one or more medium access control control elements (MAC CEs) in response to flushing the second HARQ buffer, wherein the one or more MAC CEs comprise at least one of:
   a buffer status report MAC CE; or
   a power headroom report MAC CE.

9. The method of claim 1, further comprising transmitting the second TB via a second configured grant of the one or more configured grants, in response to a third LBT procedure indicating a clear channel.

10. The method of claim 9, further comprising selecting a third HARQ process for the second TB based on the second configured grant.

11. A wireless device comprising:
   one or more processors; and
   memory storing instructions that, when executed by the one or more processors, cause the wireless device to:
      receive configuration parameters of one or more configured grants on an unlicensed cell;
      receive a downlink control information indicating an uplink grant for a first transport block (TB) corresponding to a first hybrid automatic repeat request (HARQ) process;
      store, based on a first LBT process indicating a busy channel, the first TB in a first HARQ buffer associated with the first HARQ process, wherein the first process is for a scheduled transmission of the first TB; and
      flush, based on a second LBT process indicating a busy channel, a second HARQ buffer associated with a second HARQ process, wherein the second LBT process is for a scheduled transmission of a second TB via a first configured grant of the one or more configured grants.

12. The wireless device of claim 11, wherein:
   the first HARQ process is identified with a first HARQ process identifier; and
   the first TB is associated with the first HARQ process.

13. The wireless device of claim 11, wherein the second HARQ process and the first HARQ process are each identified with a same HARQ process identifier.

14. The wireless device of claim 11, wherein the instructions, when executed by the one or more processors, further cause the wireless device to select the second HARQ process for the second TB based on the first configured grant.

15. The wireless device of claim 11, wherein the instructions, when executed by the one or more processors, further cause the wireless device to receive a second downlink control information indicating activation of at least one of the one or more configured grants on the unlicensed cell, wherein the at least one of the one or more configured grants comprises the first configured grant.

16. The wireless device of claim 11, wherein the instructions, when executed by the one or more processors, further cause the wireless device to:
   create the first TB based on the uplink grant; and
   create the second TB for the scheduled transmission via the first configured grant.

17. The wireless device of claim 11, wherein the instructions, when executed by the one or more processors, further cause the wireless device to determine, in response to flushing the second HARQ buffer, that the second HARQ process is an available HARQ process with an empty corresponding HARQ buffer.

18. The wireless device of claim 11, wherein the instructions, when executed by the one or more processors, further cause the wireless device to trigger a transmission of one or more MAC CEs in response to flushing the second HARQ buffer, wherein the one or more MAC CEs comprise at least one of:
   a buffer status report MAC CE; or
   a power headroom report MAC CE.

19. The wireless device of claim 11, wherein the instructions, when executed by the one or more processors, further cause the wireless device to transmit the second TB via a second configured grant of the one or more configured grants in response to a third LBT procedure indicating a clear channel.

20. A system comprising:
   a wireless device comprising:
      one or more first processors; and
      first memory storing first instructions that, when executed by the one or more first processors, cause the wireless device to:
         receive configuration parameters of one or more configured grants on an unlicensed cell;
         receive a downlink control information indicating an uplink grant for a first TB corresponding to a first HARQ process;
         store, based on a first LBT process indicating a busy channel, the first TB in a first HARQ buffer associated with the first HARQ process, wherein the first LBT process is for a scheduled transmission of the first TB; and
         flush, based on a second LBT process indicating a busy channel, a second HARQ buffer associated with a second HARQ process, wherein the second LBT process is for a scheduled transmission of a second TB via a first configured grant of the one or more configured grants; and
   a base station comprising:
      one or more second processors; and
      second memory storing second instructions that, when executed by the one or more second processors, cause the base station to:
         transmit the configuration parameters to the wireless device; and
         transmit the downlink control information to the wireless device.

* * * * *